(12) United States Patent
Brace et al.

(10) Patent No.: US 9,760,385 B2
(45) Date of Patent: Sep. 12, 2017

(54) CONCURRENT EMULATION OF MULTIPLE DEVICES

(71) Applicant: INVODO, INC., Austin, TX (US)

(72) Inventors: Matthew C. Brace, Austin, TX (US); James D. Keeler, Austin, TX (US)

(73) Assignee: WebAd Campaign Analytics, Austin, TX (US)

( * ) Notice: Subject to any disclaimer, the term of this patent is extended or adjusted under 35 U.S.C. 154(b) by 42 days.

(21) Appl. No.: 14/546,931

(22) Filed: Nov. 18, 2014

(65) Prior Publication Data
US 2015/0143091 A1   May 21, 2015

Related U.S. Application Data

(60) Provisional application No. 61/905,608, filed on Nov. 18, 2013.

(51) Int. Cl.
*G06F 9/00* (2006.01)
*G06F 9/455* (2006.01)
*G06F 9/445* (2006.01)

(52) U.S. Cl.
CPC .......... *G06F 9/455* (2013.01); *G06F 9/44505* (2013.01)

(58) Field of Classification Search
CPC .............................. G06F 9/44505; G06F 9/455
USPC ............................................ 713/100; 703/13
See application file for complete search history.

(56) References Cited

U.S. PATENT DOCUMENTS

| | | | | |
|---|---|---|---|---|
| 7,813,910 B1* | 10/2010 | Poulin | ................. | G06F 11/3457 703/13 |
| 8,538,402 B2* | 9/2013 | Vidal | ..................... | H04W 4/00 455/418 |
| 2007/0127426 A1* | 6/2007 | Watters | ................. | H04L 67/125 370/338 |
| 2009/0036111 A1* | 2/2009 | Danford | .............. | H04L 41/0893 455/419 |
| 2010/0333088 A1* | 12/2010 | Rogel | ................. | G06F 9/45533 718/1 |
| 2012/0245918 A1* | 9/2012 | Overton | ................ | G06F 9/4443 703/27 |
| 2012/0323553 A1* | 12/2012 | Aslam | ..................... | G06F 9/455 703/28 |
| 2013/0096906 A1* | 4/2013 | Niemeyer | ............... | G06F 9/455 703/23 |
| 2013/0297281 A1* | 11/2013 | Niemeyer | ........... | G06F 17/5009 703/20 |

(Continued)

*Primary Examiner* — Chun Cao
(74) *Attorney, Agent, or Firm* — Yudell Isidore PLLC

(57) ABSTRACT

In one or more embodiments, a system can configure a physical mobile device via configuring a configuration for an emulator of the physical mobile device. For example, a user (e.g., a customer) can request a physical mobile device, and a system can provide the user with an emulation of the physical mobile device, where the user can configure the emulation of the physical mobile device. In one or more embodiments, the user can be provided with the configuration via at least one of a network and a physical delivery of the physical mobile device, configured with the configuration. In one example, the user can execute an emulation of the physical mobile device configured with the configuration, received via the network. In another example, the physical mobile device can be configured with the configuration, and subsequently, the physical mobile device can be physically delivered to the user.

27 Claims, 45 Drawing Sheets

(56) References Cited

U.S. PATENT DOCUMENTS

2014/0032722 A1* 1/2014 Snow .................... G06F 9/4445
709/220
2016/0112875 A1* 4/2016 Kasravi .................. H04L 12/12
455/411

* cited by examiner

CONCURRENT EMULATION OF MULTIPLE DEVICES

PRIORITY CLAIM

This application claims priority to U.S. Provisional Application Ser. No. 61/905,608, filed 18 Nov. 2013, titled "METHODS AND SYSTEMS OF OPERATING COMPUTING DEVICE". Each of U.S. Provisional Application Ser. No. 61/905,608, filed 18 Nov. 2013, titled "METHODS AND SYSTEMS OF OPERATING COMPUTING DEVICE", U.S. application Ser. No. 13/601,537, filed 31 Aug. 2013, titled "Methods and Systems of Providing Items to a Customer Via a Network", U.S. application Ser. No. 13/428,128, filed 23 Mar. 2012, titled "Methods And Systems Of Providing Items To Customers Via a Network", and U.S. Provisional Application Ser. No. 61/627,349, filed 11 Oct. 2011, titled "Methods and Systems of Providing Items to Customers via a Network" is hereby incorporated by reference in its entirety as though fully and completely set forth herein.

CROSS-REFERENCE TO RELATED APPLICATION

The present application is related to the following commonly assigned, co-pending U.S. patent application(s) filed on even date herewith, with all content incorporated herein by reference:

U.S. patent application Ser. No. 14/5646,922, titled "Methods and Systems of Operating Computing Device."

BACKGROUND

1. Technical Field

This disclosure relates generally to the field of assisting users in configuring computing devices.

2. Description of the Related Art

In the past, users of computing devices read manuals, watched instructional videos, and/or received help from customer service representatives to learn how to configure their computing devices. In one example, these manuals and videos are often difficult for some, if not most, users to utilize in configuring their computing devices. In another example, help from customer service representatives often cannot be referred to at a later time (e.g., after receiving help from customer service representatives). This can pose issues of customer satisfaction and/or additional cost in providing customer service representatives.

Moreover, in the past, a user/customer could order a mobile device, such as a wireless telephone, and would have to wait until the mobile device was physically delivered to the user/customer before the user/customer could configure the mobile device. For example, the user/customer would have to wait until physical delivery of the mobile device before purchasing applications (APPs), arranging application (APP) icons to be displayed via the mobile device, configuring an address book APP, configuring a weather APP, and/or configuring an electronic mail APP, among others.

BRIEF DESCRIPTION OF THE DRAWINGS

The preferred embodiments will become apparent upon reading the following detailed description and upon reference to the accompanying drawings in which.

Figure 1:
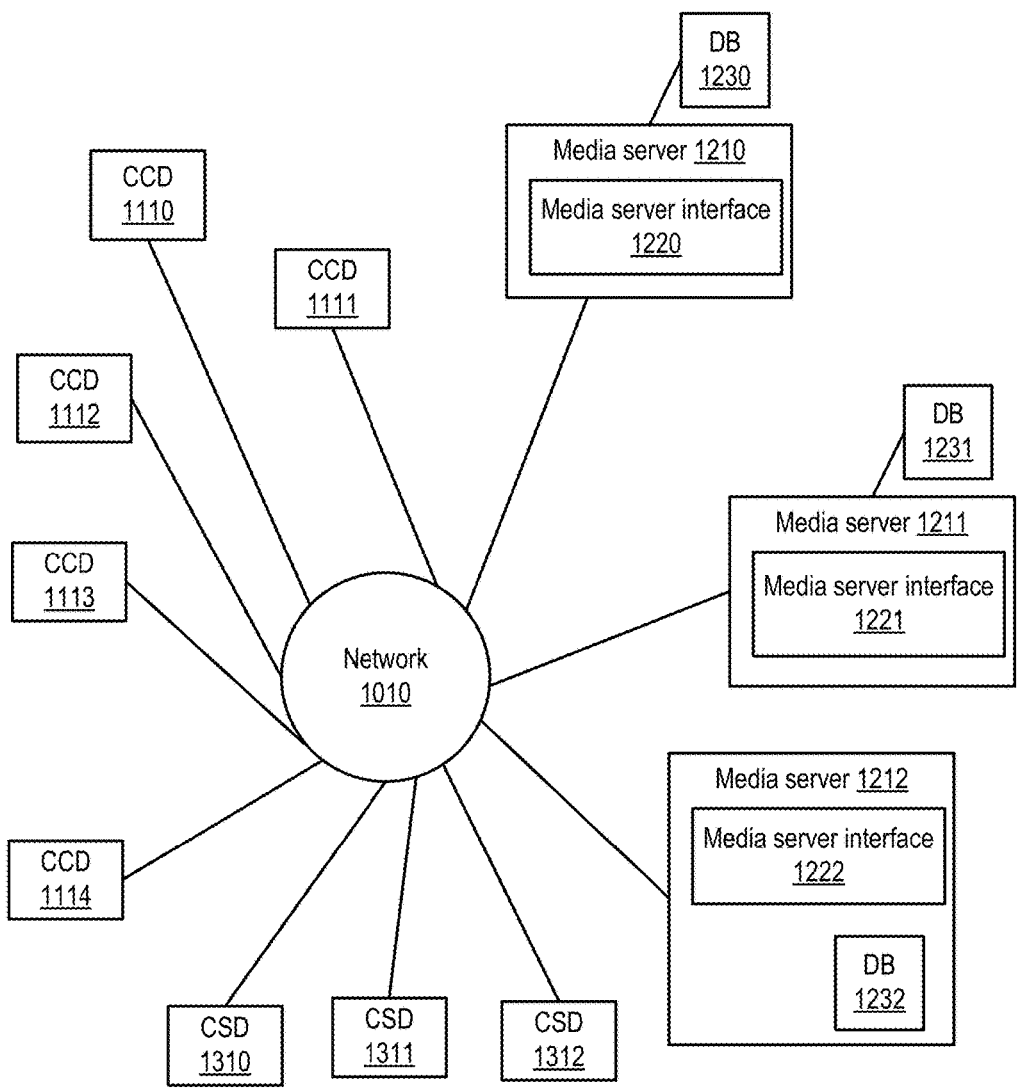
FIG. 1 provides an exemplary block diagram of a network communications system, according to one or more embodiments.

While one or more embodiments may be susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the spirit and scope of this disclosure.

DETAILED DESCRIPTION

In one or more embodiments, a system can configure a physical mobile device via configuring a configuration for an emulator of the physical mobile device. For example, a user (e.g., a customer) can request a physical mobile device, and a system can provide the user with an emulation of the physical mobile device, where the user can configure the emulation of the physical mobile device. In one or more embodiments, the user can be provided with the configuration via at least one of a network and a physical delivery of the physical mobile device, configured with the configuration. In one example, the user can execute an emulation of the physical mobile device configured with the configuration, received via the network. In another example, the physical mobile device can be configured with the configuration, and subsequently, the physical mobile device can be physically delivered to the user.

In one or more embodiments, a user/customer can utilize a first mobile device and shop for a second mobile device that will be utilized with the first mobile device. For example, the first mobile device can be or include one or more of a wireless telephone, a personal digital assistant, and a digital music player, among others, and the second mobile device can be or include a watch (e.g., a smart watch), among others. In one or more embodiments, the first and second physical mobile devices can be emulated. For example, the first and second physical mobile devices can be emulated to configure the second mobile device. In one instance, an emulated coupling of the first mobile device with the second mobile device can include a wireless emulated coupling. In another instance, an emulated coupling of the first mobile device with the second mobile device can include a wired emulated coupling. After the second mobile device is configured, a configuration of the second mobile device can be provided to the user via a network, and/or the second mobile device, configured with the configuration, can be provided to the user via a physical delivery service, according to one or more embodiments.

In one or more embodiments, a user can be provided with a walk-through and/or tutorial that can be utilized to configure a mobile device. For example, a first application can provide a walk-through and/or tutorial of a second application. In one or more embodiments, the first application can implement a conceptual transparent layer of a display of the mobile device, where the first application can provide messages and/or can indicate actions that could and/or should be taken by a user. In one example, the first application can provide messages to configure a mail application. In another example, the first application can provide an indication that a "swipe" can be performed with a second application. For instance, the swipe can reveal additional information provided by the second application and/or change displayed information.

Turning now to FIG. 1, a block diagram of a network communication system is illustrated, according to one or more embodiments. As illustrated, one or more customer computing devices (CCDs) 1110-1114 can be coupled to a network 1010. In one or more embodiments, network 1010 can include one or more of a wireless network and a wired network. Network 1010 can be coupled to one or more types of communications networks, such as one or more of a public switched telephone network (PSTN), a public wide area network (e.g., an Internet), a private wide area network, and a local area network, among others. In one example, network 1010 can be or include an Internet. In another example, network 1010 can form part of an Internet. In one or more embodiments, one or more of CCDs 1110-1114 can be coupled to network 1010 via a wired communication coupling and/or a wireless communication coupling. In one example, a customer computer device (CCD) can be coupled to network 1010 via wired Ethernet, a DSL (digital subscriber loop) modem, or a cable (television) modem, among others. In another example, a CCD can be coupled to network 1010 via wireless Ethernet (e.g., WiFi), a satellite communication coupling, a cellular telephone coupling, or WiMax, among others.

As shown, one or more media servers 1210-1212 can be coupled to network 1010, and media servers 1210-1212 can include media server interfaces 1220-1222, respectively. As illustrated, media servers 1210 and 1211 can be coupled to databases 1230 and 1231, and media server 1212 can include a database (DB) 1232. In one example, DB 1230 can be or include an Oracle database. In a second example, DB 1231 can be or include a Microsoft SQL Server database. In another example, DB 1232 can be or include a MySQL database or a PostgreSQL database.

In one or more embodiments, one or more of media server interfaces 1220-1222 can provide one or more computer system interfaces to one or more of CCDs 1110-1114. In one example, media server interface 1220 can include a web server. In another example, media server interface 1221 can include a server that interacts with a client application of a CCD. In one instance, the client application can include a "smart phone" application. In a second instance, the client application can include a tablet computing device application. In another instance, the client application can include a computing device application (e.g., an application for a desktop or laptop computing device).

As illustrated, one or more customer service devices (CSDs) 1310-1312 can be coupled to network 1010. In one or more embodiments, a service representative (e.g., a customer service representative of a retail establishment, a service representative of a service provider, etc.) can utilize a customer service device (CSD) to interact with a customer utilizing a CCD. For example, the service representative can utilize the CSD to provide information to the customer via the CCD. In one instance, the service representative can utilize the CSD to conduct one or more of a video chat, a text chat, and an audio chat. In a second instance, the service representative can utilize the CSD to illustrate and/or demonstrate one or more features and/or operations of an object for sale or of an object for which service is desired by the customer.

Figure 2A:
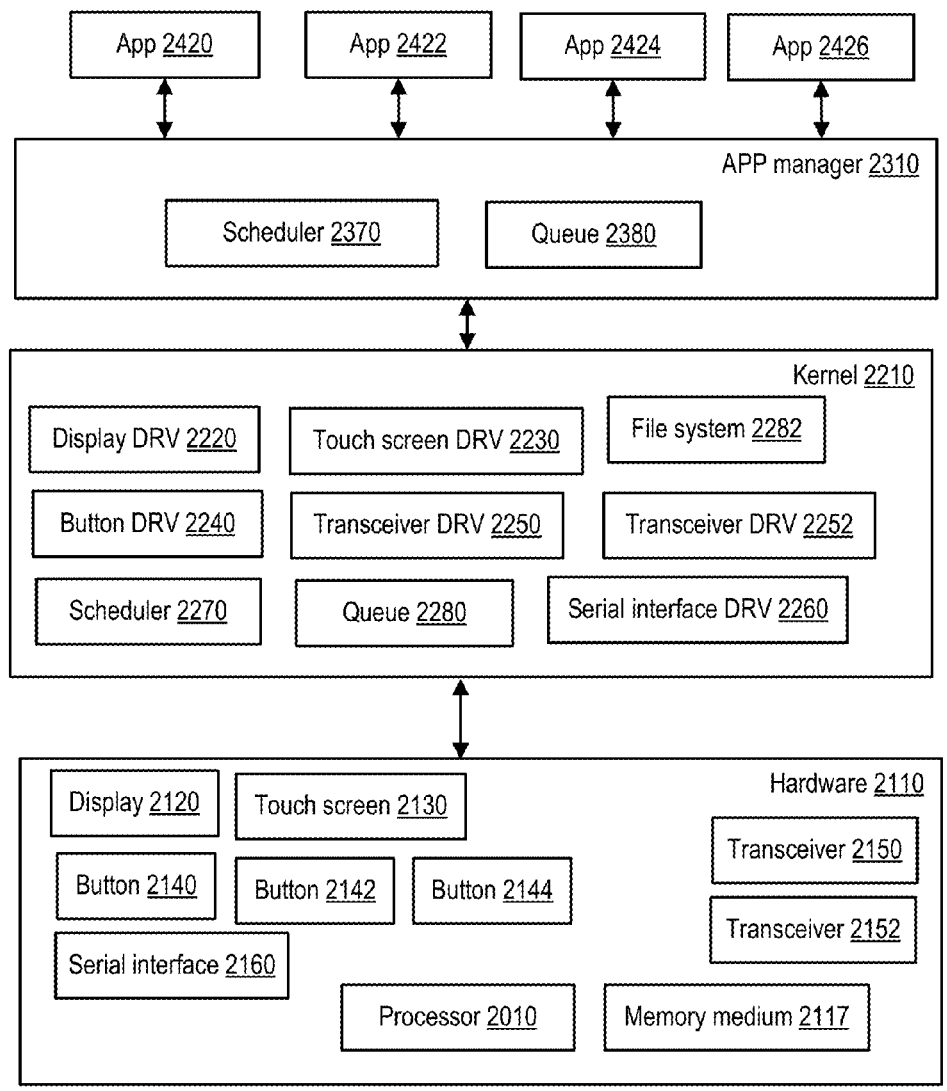
FIG. 2A provides an exemplary block diagram of a hardware and software stack of a computing device, according to one or more embodiments.

Turning now to FIG. 2A, an exemplary block diagram of a hardware and software stack of a computing device is illustrated, according to one or more embodiments. As shown, hardware 2110 can interface with a kernel 2210 that can interface with an application (APP) manager 2310. As illustrated, applications (APPs) can interface with APP manager 2310. In one or more embodiments, APP manager 2310 can include a window manager that can provide and/or implement an application programming interface (API) of and/or for a graphical user interface (GUI) framework.

As shown, hardware 2110 can include one or more of a processor 2010, a memory medium 2117, a display 2120, a touch screen 2130, a button 2140, a button 2142, a button 2144, a transceiver 2150 (e.g., a wireless Ethernet transceiver, a WiFi transceiver, etc.), a transceiver 2152 (e.g., a wireless telephone transceiver, a cellular telephone network transceiver, a satellite telephone network transceiver, etc.), and a serial interface 2160 (e.g., a universal serial bus (USB) interface, a FireWire interface, a wired Ethernet interface, a RS-232 interface, a Thunderbolt interface, etc.), among others. As illustrated, kernel 2210 can include one or more of a display driver (DRV) 2220, a touch screen DRV 2230, a button DRV 2240, a transceiver DRV 2250, a transceiver DRV 2252, a serial interface DRV 2260, a scheduler 2270, and a queue 2280, among others.

In one or more embodiments, a driver of kernel 2210 can include instructions executable by processor 2010 to interface with a hardware unit of hardware 2110. For example, drivers 2220-2260 can respectively include instructions executable by processor 2010 to interface with respective hardware units 2120-2160. In one or more embodiments, one or more of drivers 2220-2260 can provide data to queue 2280. In one example, touch screen DRV 2230 can provide data associated with one or more of coordinates, a hold, and a swipe, among others, of touch screen 2230 to queue 2280. In another example, button DRV 2240 can provide data associated with an actuation of one or more of buttons 2140-2144 to queue 2280. In one or more embodiments, queue 2280 can include one or more queues. For example, queue 2280 can include one or more of an event queue and a work queue, among others.

In one or more embodiments, scheduler 2270 can schedule time that processes and/or threads can utilize a processor unit. For example, scheduler 2270 can schedule time that one or more of kernel 2210, APP manager 2310, and APPs 2420-2426 can utilize processor 2010.

In one or more embodiments, scheduler 2270 can dequeue data from queue 2280 and provide the dequeued data to APP manager 2310. For example, the data dequeued from queue 2280 can be queued in queue 2380. In one instance, data associated with one or more of coordinates, a hold, and a swipe, among others, of touch screen 2230 can be queued in queue 2380. In another instance, data associated with an actuation of one or more of buttons 2140-2144 can be queued in queue 2380.

In one or more embodiments, scheduler 2270 can process work of a work queue of queue 2280. For example, a driver of kernel 2210 can queue work in queue 2280, and scheduler 2270 can process work queued in queue 2280. For instance, work in queue 2280 can include first data and a corresponding first function (e.g., a subroutine) that processes the first data.

In one or more embodiments, APP manager 2310 can provide data to one or more of APPs 2420-2426. For example, APP manager 2310 can provide event data to one or more of APPs 2420-2426. In one or more embodiments, APP manager 2310 can retrieve data from kernel 2210 via a file system 2280 of kernel 2210. For example, APP manager 2310 can access one or more pseudo files (e.g., "device files", files in /dev, files in /dev/input, files in /proc, etc.) to retrieve and/or obtain data that can be provided to one or more of APPs 2420-2426.

In one or more embodiments, APP manager 2310 can implement and/or maintain identifications (IDs) associated with respective APPs. In one example, APP manager 2310 can implement and/or maintain first data associated with a first APP via a first APP identification (ID). In another example, APP manager 2310 can implement and/or maintain second data associated with a second APP via a second APP ID.

In one or more embodiments, APP manager 2310 can implement and/or maintain callbacks associated with respective APPs. In one example, a first APP can register a first callback (e.g., instructions executable by processor 2010) with APP manager 2310, and APP manager 2310 can execute the first callback with first data, associated with the first APP, as parameter passed to the first callback. In a second example, a second APP can register a second callback (e.g., instructions executable by processor 2010) with APP manager 2310, and APP manager 2310 can execute the second callback with second data, associated with the second APP, as parameter passed to the second callback. In another example, data queued in queue 2380 can be provided to one or more APPs via one or more respective callbacks. In one instance, one or more of coordinates, a hold, and a swipe, among others, of touch screen 2230 can be provided to an APP via its callback(s). In another instance, data associated with an actuation of one or more of buttons 2140-2144 can be provided to an APP via its callback(s).

Figure 2B:
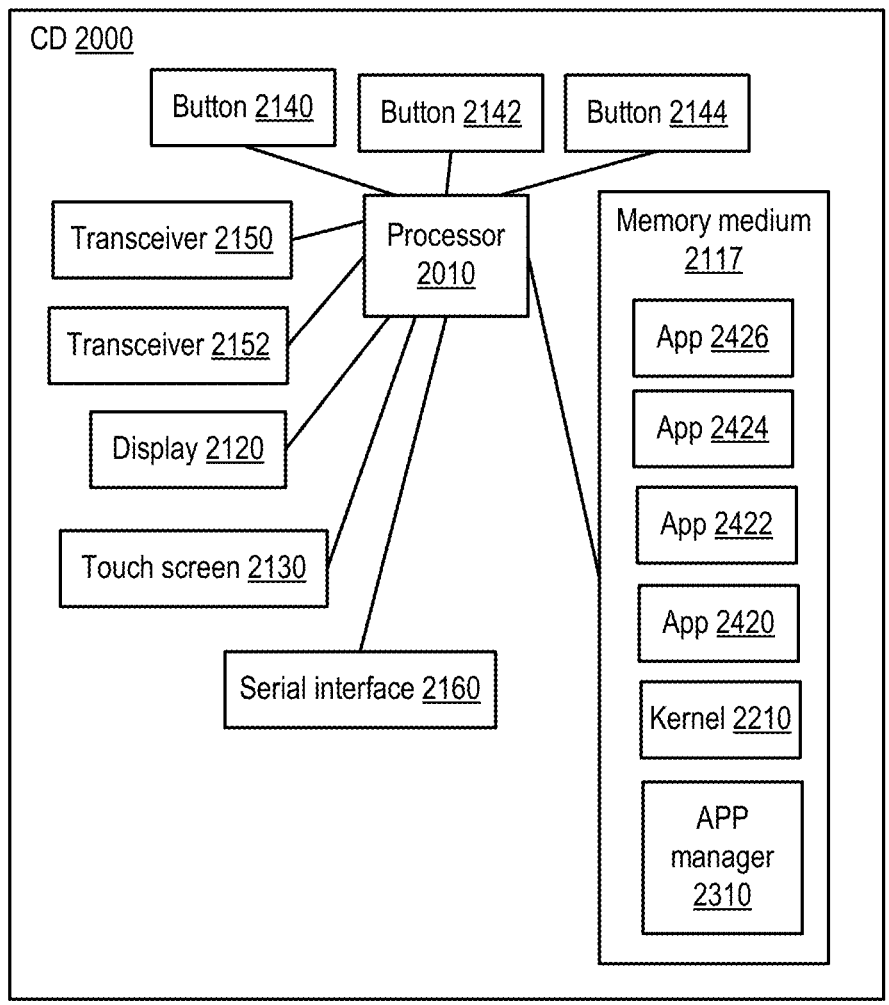
FIGS. 2B-2F provide exemplary block diagrams of a computing device, according to one or more embodiments.

Turning now to FIG. 2B, an exemplary computing device is illustrated, according to one or more embodiments. As shown, a computing device (CD) 2000 can include one or more of processor 2010 and one or more of memory medium 2117, display 2120, touch screen 2130, button 2140, button 2142, button 2146, transceiver 2150, transceiver 2152, and serial interface 2160, among others, coupled to processor 2010. As illustrated, memory medium 2117 can include and/or store one or more of kernel 2210, APP manager 2310, APP 2420, APP 2422, APP 2424, and APP 2426, among others, which can be executed by processor 2010. In one or more embodiments, computing device 2000 can be or include a computer, a computer system, a workstation, a mobile device, a mobile computing device, a hand-held computing device, a personal digital assistant (PDA), a cellular telephone, a tablet computing device, a digital music player device, a wireless telephone, a satellite telephone, a virtual computing device (e.g., a virtual machine), an in-vehicle computing device (e.g., an in-vehicle entertainment system, an in-vehicle navigation system, an in-vehicle configuration and/or status system), and an automotive computing device, among others. In one or more embodiments, CD 2000 illustrated in FIGS. 2B-2F can be utilized to implement a CCD and/or a CSD.

Figure 2C:
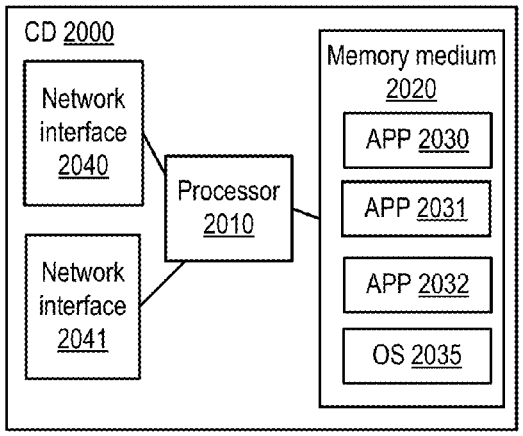

Turning now to FIG. 2C, a computing device is illustrated, according to one or more embodiments. As shown, CD 2000 can include processor 2010 coupled to a memory medium 2020. In one or more embodiments, memory medium 2020 can store data and/or instructions that can be executed by processor 2010. For example, memory medium 2020 can store one or more APPs 2030-2032 and/or an operation system (OS) 2035. For instance, one or more APPs 2030-2032 and/or an OS 2035 can include instructions of an instruction set architecture (ISA) associated with processor 2010. In one or more embodiments, CD 2000 can be coupled to and/or include one or more of a display, a keyboard, and a pointing device (e.g., a mouse, a track ball, a track pad, a stylus, etc.). In one or more embodiments, a touch screen can function as a pointing device. In one example, the touch screen can determine a position via one or more pressure sensors. In another example, the touch screen can determine a position via one or more capacitive sensors.

As illustrated, CD 2000 can include one or more network interfaces 2040 and 2041. In one example, network interface 2040 can interface with a wired network coupling, such as a wired Ethernet, a T-1, a DSL modem, a PSTN, or a cable modem, among others. In another example, network interface 2041 can interface with a wireless network coupling, such as a satellite telephone system, a cellular telephone system, WiMax, WiFi, or wireless Ethernet, among others.

In one or more embodiments, CD 2000 can be any of various types of devices, including a computer system, a server computer system, a laptop computer system, a notebook computing device, a portable computer, a PDA, a handheld mobile computing device, a mobile wireless telephone (e.g., a satellite telephone, a cellular telephone, etc.), an Internet appliance, a television device, a DVD (digital video disc player) device, a Blu-Ray disc player device, a DVR (digital video recorder) device, a wearable computing device, or other wireless or wired device that includes a processor that executes instructions from a memory medium. In one or more embodiments, processor 2010 can include one or more cores. For example, each core of processor 2010 can implement an ISA. In one instance, two or more cores of processor 2010 can implement a same ISA. In another instance, two or more cores of processor 2010 can implement different instruction set architectures (ISAs). In one or more embodiments, one or more of CCDs 1110-1114, media servers 1210-1212, databases 1230 and 1231, and CSDs 1310-1312 can include one or more same or similar structures and/or functionalities described with reference to CD 2000.

Figure 2D:
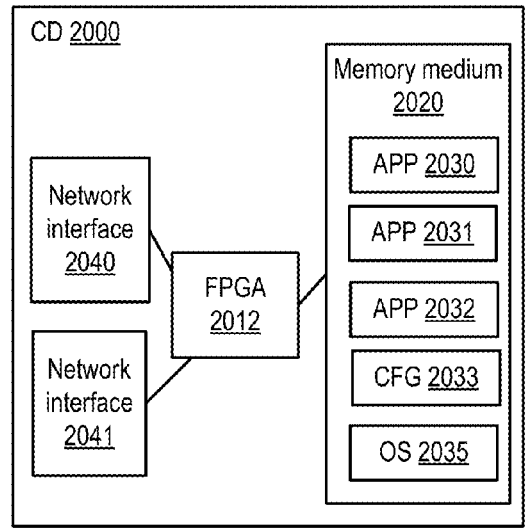

Turning now to FIG. 2D, a computing device is illustrated, according to one or more embodiments. As shown, CD 2000 can include a field programmable gate array (FPGA) 2012 coupled to memory medium 2020. In one or more embodiments, memory medium 2020 can store data and/or configuration information that can be utilized by FPGA 2012 in implementing one or more systems, methods, and/or processes described herein. For example, memory medium 2020 can store a configuration (CFG) 2033, and CFG 2033 can include configuration information and/or one or more instructions that can be utilized by FPGA 2012 to implement one or more systems, methods, and/or processes described herein. For instance, the configuration information and/or the one or more instructions, of CFG 2033, can include a hardware description language and/or a schematic design that can be utilized by FPGA 2012 to implement one or more systems, methods, and/or processes described herein. In one or more embodiments, FPGA 2012 can include multiple programmable logic components that can be configured and coupled to one another in implementing one or more systems, methods, and/or processes described herein.

In one or more embodiments, memory medium 2020 can store data and/or instructions that can be executed by FPGA 2012. For example, memory medium 2020 can store one or more APPs 2030-2032 and/or an OS 2035. For instance, one or more APPs 2030-2032 and/or an OS 2035 can include instructions of an ISA associated with FPGA 2012. In one or more embodiments, CD 2000 can be coupled to and/or include one or more of a display, a keyboard, and a pointing device (e.g., a mouse, a track ball, a track pad, a stylus, etc.). In one or more embodiments, a touch screen can function as a pointing device. In one example, the touch screen can determine a position via one or more pressure sensors. In another example, the touch screen can determine a position via one or more capacitive sensors.

As illustrated, CD 2000 can include one or more network interfaces 2040 and 2041. In one example, network interface 2040 can interface with a wired network coupling, such as a wired Ethernet, a T-1, a DSL modem, a PSTN, or a cable modem, among others. In another example, network interface 2041 can interface with a wireless network coupling, such as a satellite telephone system, a cellular telephone system, WiMax, WiFi, or wireless Ethernet, among others.

In one or more embodiments, CD 2000 can be any of various types of devices, including a computer system, a server computer system, a laptop computer system, a notebook computing device, a portable computer, a PDA, a handheld mobile computing device, a mobile wireless telephone (e.g., a satellite telephone, a cellular telephone, etc.), an Internet appliance, a television device, a DVD device, a Blu-Ray disc player device, a DVR device, a wearable computing device, or other wireless or wired device that includes a FPGA that processes data according to one or more methods and/or processes described herein. In one or more embodiments, one or more of CCDs 1110-1114, media servers 1210-1212, databases 1230 and 1231, and CSDs 1310-1312 can include one or more same or similar structures and/or functionalities described with reference to CD 2000.

Figure 2E:
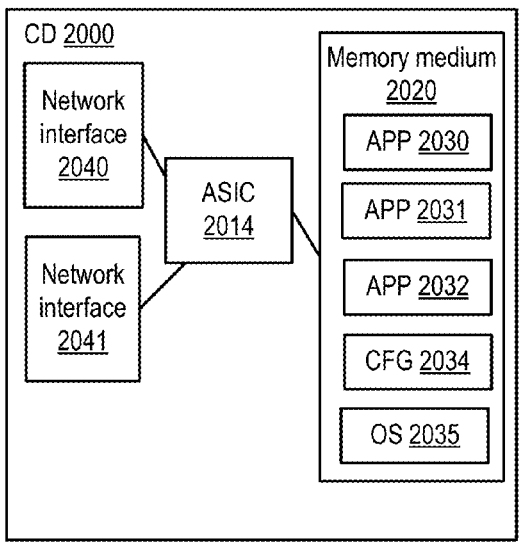

Turning now to FIG. 2E, a computing device is illustrated, according to one or more embodiments. As shown, CD 2000 can include an application specific processor (ASIC) 2014 coupled to memory medium 2020. In one or more embodiments, memory medium 2020 can store data and/or configuration information that can be utilized by ASIC 2014 in implementing one or more systems, methods, and/or processes described herein. For example, memory medium 2020 can store a CFG 2034, and CFG 2034 can include configuration information and/or one or more instructions that can be utilized by ASIC 2014 to implement one or more systems, methods, and/or processes described herein.

In one or more embodiments, memory medium 2020 can store data and/or instructions that can be executed by ASIC 2014. For example, memory medium 2020 can store one or more APPs 2030-2032 and/or an OS 2035. For instance, one or more APPs 2030-2032 and/or an OS 2035 can include instructions of an ISA associated with ASIC 2014. In one or more embodiments, CD 2000 can be coupled to and/or include one or more of a display, a keyboard, and a pointing device (e.g., a mouse, a track ball, a track pad, a stylus, etc.). In one or more embodiments, a touch screen can function as a pointing device. In one example, the touch screen can determine a position via one or more pressure sensors. In another example, the touch screen can determine a position via one or more capacitive sensors.

As illustrated, CD 2000 can include one or more network interfaces 2040 and 2041. In one example, network interface 2040 can interface with a wired network coupling, such as a wired Ethernet, a T-1, a DSL modem, a PSTN, or a cable modem, among others. In another example, network interface 2041 can interface with a wireless network coupling, such as a satellite telephone system, a cellular telephone system, WiMax, WiFi, or wireless Ethernet, among others.

In one or more embodiments, CD 2000 can be any of various types of devices, including a computer system, a server computer system, a laptop computer system, a notebook computing device, a portable computer, a PDA, a handheld mobile computing device, a mobile wireless telephone (e.g., a satellite telephone, a cellular telephone, etc.), an Internet appliance, a television device, a DVD device, a Blu-Ray disc player device, a DVR device, a wearable computing device, or other wireless or wired device that includes ASIC that processes data according to one or more methods and/or processes described herein. In one or more embodiments, one or more of CCDs 1110-1114, media servers 1210-1212, databases 1230 and 1231, and CSDs 1310-1312 can include one or more same or similar structures and/or functionalities described with reference to CD 2000.

Figure 2F:
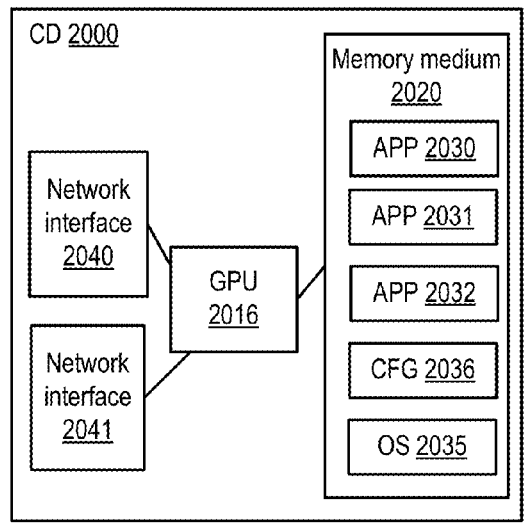

Turning now to FIG. 2F, a computing device is illustrated, according to one or more embodiments. As shown, CD 2000 can include graphics processing unit (GPU) 2016 coupled to memory medium 2020. For example, GPU 2016 can be or include a general purpose graphics processing unit (GPGPU). In one or more embodiments, memory medium 2020 can store data and/or configuration information that can be utilized by GPU 2016 in implementing one or more systems, methods, and/or processes described herein. For example, memory medium 2020 can store a CFG 2036, and CFG 2036 can include configuration information and/or one or more instructions that can be utilized by GPU 2016 to implement one or more systems, methods, and/or processes described herein.

In one or more embodiments, memory medium 2020 can store data and/or instructions that can be executed by GPU 2016. For example, memory medium 2020 can store one or more APPs 2030-2032 and/or an OS 2035. For instance, one or more APPs 2030-2032 and/or an OS 2035 can include instructions of an ISA associated with GPU 2016. In one or more embodiments, CD 2000 can be coupled to and/or include one or more of a display, a keyboard, and a pointing device (e.g., a mouse, a track ball, a track pad, a stylus, etc.). In one or more embodiments, a touch screen can function as a pointing device. In one example, the touch screen can determine a position via one or more pressure sensors. In another example, the touch screen can determine a position via one or more capacitive sensors.

As illustrated, CD 2000 can include one or more network interfaces 2040 and 2041. In one example, network interface 2040 can interface with a wired network coupling, such as a wired Ethernet, a T-1, a DSL modem, a PSTN, or a cable modem, among others. In another example, network interface 2041 can interface with a wireless network coupling, such as a satellite telephone system, a cellular telephone system, WiMax, WiFi, or wireless Ethernet, among others.

In one or more embodiments, CD 2000 can be any of various types of devices, including a computer system, a server computer system, a laptop computer system, a notebook computing device, a portable computer, a PDA, a handheld mobile computing device, a mobile wireless telephone (e.g., a satellite telephone, a cellular telephone, etc.), an Internet appliance, a television device, a DVD device, a Blu-Ray disc player device, a DVR device, a wearable computing device, or other wireless or wired device that includes a GPU that processes data according to one or more methods and/or processes described herein. In one or more embodiments, one or more of CCDs 1110-1114, media servers 1210-1212, databases 1230 and 1231, and CSDs 1310-1312 can include one or more same or similar structures and/or functionalities described with reference to CD 2000.

Figure 3A:
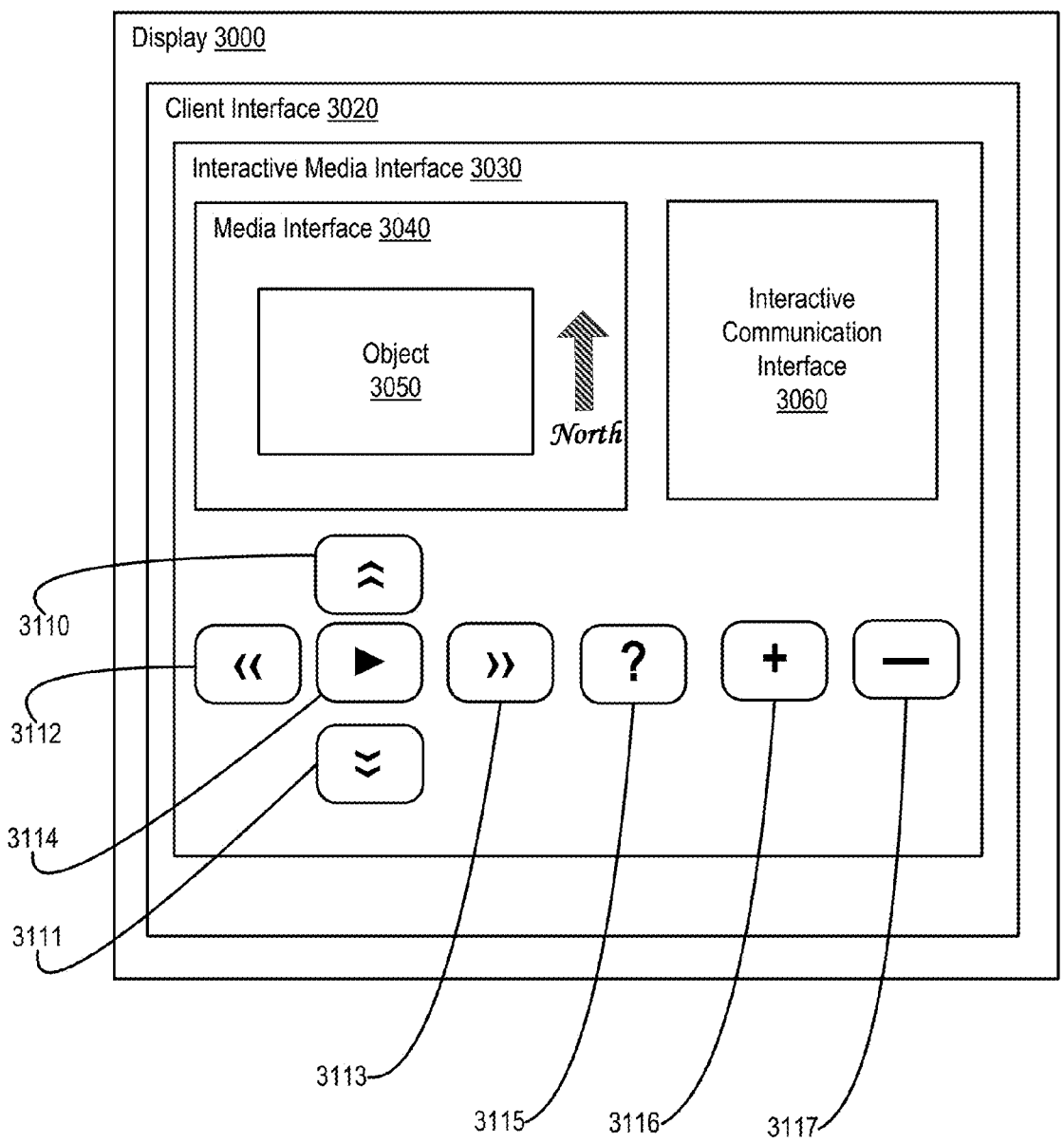
FIG. 3A illustrates an exemplary client interface, according to one or more embodiments.

Turning now to FIG. 3A, an exemplary client interface is illustrated, according to one or more embodiments. As shown, a display 3000 can display a client interface 3020. In one or more embodiments, display 3000 can be coupled to or included in a computing device. In one example, display 3000 can be coupled to CCD 1111. In another example, display 3000 can be included in CCD 1112. In one or more embodiments, client interface 3020 can be or include a web browser (e.g., Microsoft Internet Explorer, Safari, Firefox, Chrome, Opera, etc.), a window of an application, a full screen display area of display 3000, or a partial screen display area of display 3000. For example, client interface 3020 can be utilized by APP 2030 to provide information to and/or receive user input from a user. In one or more embodiments, an APP (e.g., an APP of APPs 2030-2032) can receive information from a media server (e.g., a media server of media servers 1210-1212) via a network (e.g., network 1010) and can provide the information to a user via client interface 3020.

In one or more embodiments, the APP (e.g., the APP of APPs 2030-2032) can be or include a plug-in to another application (e.g., a web browser) and/or can receive configuration information from a media server. In one example, the plug-in can include a Flash Player (available from Adobe Systems), and the plug-in can interface with the customer via client interface 3030. In another example, the plug-in can include a Java virtual machine, and the plug-in can interface with the customer via client interface 3030. In one or more embodiments, client interface 3030 can be implemented via one or more of JavaScript, EMCAScript, Java, an extensible markup language (XML), and a hypertext markup language (HTML) (e.g., HTML version four (4), HTML version five (5), etc.). For example, the APP (e.g., the APP of APPs 2030-2032) can be or include a web browser, and the web browser can receive information, from a media server, that includes one or more of JavaScript, EMCAScript, Java (e.g., Java byte code), XML, and HTML version 5, and the web browser can implement client interface 3020 based on the received information that includes one or more of JavaScript, EMCAScript, Java, XML, and HTML version 5.

As illustrated, client interface 3020 can include an interactive media interface 3030 that can provide information to a customer (e.g., a user of a CCD) and/or receive information from a customer. In one example, interactive media interface 3030 can include a media interface 3040 that can display one or more pictures, one or more videos (e.g., motion pictures), one or more graphics, and/or text associated with an object 3050. In one instance, object 3050 can represent and/or include a simulation of an object for sale by a retail establishment. In a second instance, object 3050 can provide and/or implement an emulation of an object (e.g., an emulation of a physical mobile device, a physical computing device, etc.). In another instance, object 3050 can represent and/or include a simulation of an object that can be serviced and/or for which service can be provided. In a second example, interactive media interface 3030 can include an interactive communication interface 3060 that can be utilized by one or more of the customer and another user (e.g., a sales representative, a service representing, a representative of a retail establishment, a representative of a service provider, an artificial intelligence system, a neural network system, etc.).

In another example, interactive media interface 3030 can include one or more icons or button 3110-3117 that can be provided to receive user input. In one or more embodiments, object 3050 can include a representation of and/or a simulation of a device, a computer, a cellular telephone, a tablet computing device, a digital music player device, a satellite telephone, a dress, a pair of jeans, a bathing suit, a shoe, lingerie, underwear, a helmet, a sock, stockings, a watch, a necklace, a bracelet, a television, software (e.g., a drawing program, a word processing program, a music player program, a compiler, a computer operating system, a video editing program, etc.), a printer device, a tire, a rim, an automobile part, an automobile, a piece of furniture, or a stapler, among others.

In one or more embodiments, one or more of icons 3110-3113 can be selected by the customer to change a viewing angle of object 3050. In one example, icon 3110 can be selected to rotate object 3050 about a first axis by a number of degrees in a first direction of rotation with respect to the first axis. In a second example, icon 3111 can be selected to rotate object 3050 about the first axis by a number of degrees in a second direction of rotation with respect to the first axis. For instance, the second direction of rotation can be opposite to the first direction of rotation. In a third example, icon 3112 can be selected to rotate object 3050 about a second axis by a number of degrees in a third direction of rotation with respect to the second axis. In another example, icon 3113 can be selected to rotate object 3050 about the second axis by a number of degrees in a fourth direction of rotation with respect to the second axis. For instance, the fourth direction of rotation can be opposite to the third direction of rotation. In one or more embodiments, a pointer can be dragged across media interface 3040 to rotate object 3050 in a direction about an axis.

In one or more embodiments, icon 3114 can be selected to display a video that includes and/or is associated with object 3050. For example, icon 3114 can be selected to display an interactive video that includes and/or is associated with object 3050. For instance, media interface 3040 can display a simulation that includes and/or is associated with object 3050. In one or more embodiments, icon 3115 can be selected to receive information about and/or associated with object 3050. In one example, interactive communication interface 3060 can provide the customer with information when icon 3115 is actuated or selected. In one instance, an avatar (e.g., a graphical approximation and/or rendering of an actual person or a simulated person) can be displayed, via interactive communication interface 3060, that can provide the customer with information. In another instance, interactive communication interface 3060 can provide the customer with a video of a service representative. For example, a customer service representative can interact with the customer directly via text chat and/or video chat via interactive communication interface 3060.

In one or more embodiments, a customer service representative can interact with a customer directly by controlling media interface 3040 via a media server (e.g., a media server of media servers 1210-1212). For example, the customer service representative can, via a media server, rotate object 3050 about an axis, zoom in-on at least a portion of object 3050, zoom out-from object 3050, start a simulation of or associated with object 3050, or start a video of or associated with object 3050, among others. For instance, media server 1210 can receive control information from the customer service representative, via a CSD, and can provide the control information to APP 2030 via network 1010, and APP 2030 can perform, via interactive media interface 3030 and/or media interface 3040, one or more functions associated with the control information.

In one or more embodiments, audio information (e.g., speech, music, etc.) can be provided to the customer via a sound output device included in or coupled to a computing device utilized by the customer. In one example, CCD 1110 can include a speaker, and speech from a customer service representative can be provided to the customer via the speaker. In a second example, CCD 1110 can include a speaker, and speech associated with object 3050 can be provided to the customer via the speaker. In another example, CCD 1110 can include a speaker, and music associated with object 3050 can be provided to the customer via the speaker.

In one or more embodiments, icons 3116 and 3117 can be selected to adjust a size of object 3050. In one example, icon 3116 can be selected to increase a size of object 3050. For instance, increasing a size of object 3050 can include zooming in-on object 3050 and/or magnifying at least a portion of object 3050. In another example, icon 3117 can be selected to decrease a size of object 3050. For instance, decreasing a size of object 3050 can include zooming out-from object 3050.

Figure 4A:
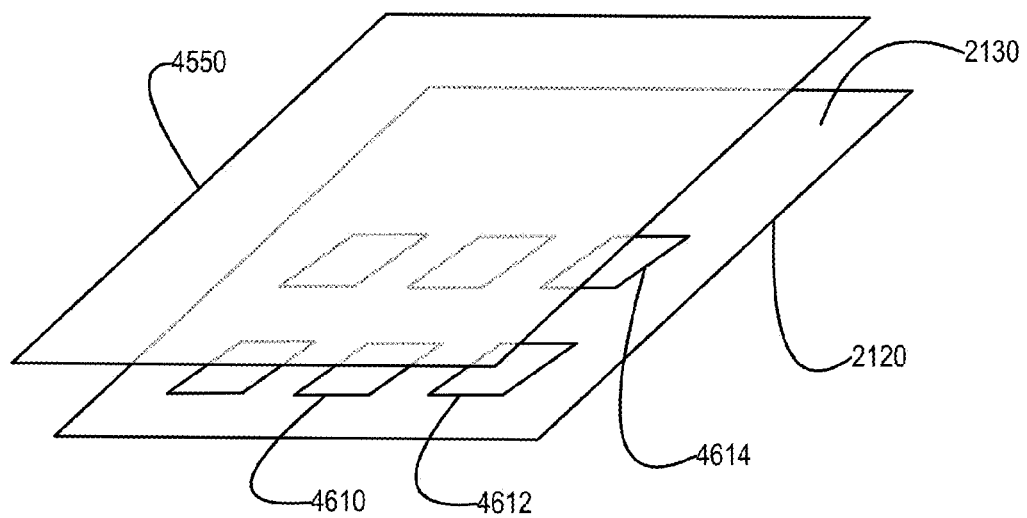
FIG. 4A provides a conceptual illustration of a transparent layer over a user interface, according to one or more embodiments.
Figure 4B:
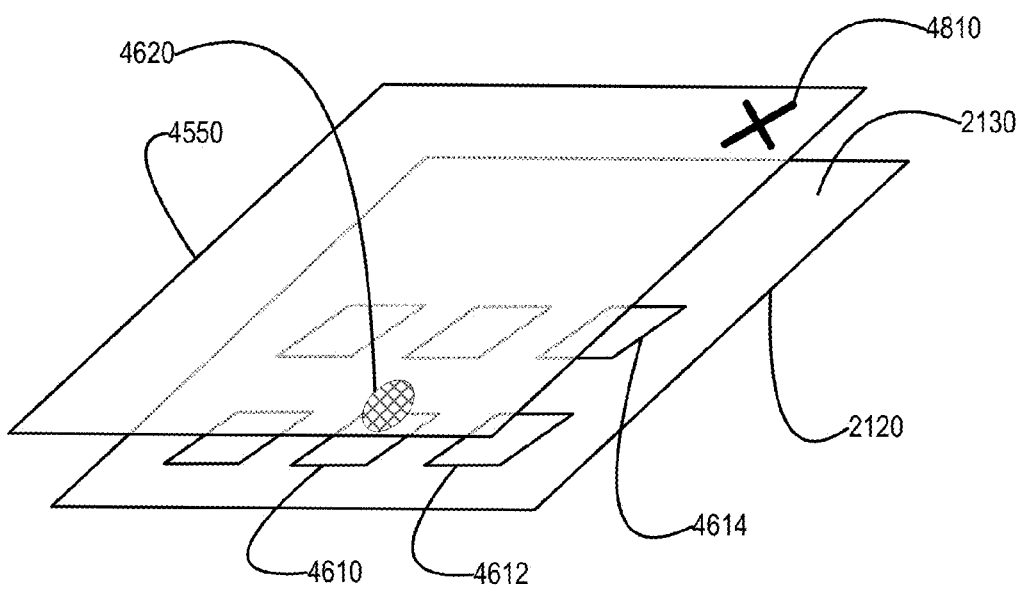
FIGS. 4B and 4C provide conceptual illustrations of a transparent layer with a beacon over a user interface, according to one or more embodiments.

In one or more embodiments, a first APP can provide an application-based tutorial that can walk a user through steps to use a second APP of a computing device (e.g., CD 2000). For example, the first APP can utilize one or more beacons as a transparent-layer APP to highlight intended action and/or motion of the user interaction with the computing device, and when the user interacts with the computing device (either a physical implementation or a virtual implementation, such as a virtual machine implementation), the user action (e.g., user input) is provided to the first APP via a transparent layer and then to an interface manager (e.g., a window manager, an APP manager, etc.) and/or the second APP. In one instance, the user action (e.g., user input) can be provided to the first APP via a transparent layer 4550 (illustrated in FIG. 4A), and the first APP can provide the user action a window manager and/or the second APP. In another instance, the first APP can utilize a visual beacon 4620 (illustrated in FIG. 4B) within transparent layer 4550 to highlight and/or signal an intended action and/or a motion of the user interaction with the computing device.

In one or more embodiments, if the user moves a location of an APP icon such that a beacon would be in an incorrect location, the first APP can be configured to attain and/or procure coordinates of APP icons such that one or more beacons can be provided at respective appropriate one or more areas within a transparent layer. For example, the first APP can attain and/or procure coordinates of APP icons 4610-4614 (illustrated in FIG. 4A) such that one or more beacons (e.g., one or more visual signals) can be provided at respective appropriate one or more areas within transparent layer 4550. For instance, the first APP can attain and/or procure coordinates of APP icons 4610-4614 during an initialization phase and/or a start-up sequence of its execution.

Figure 3B:
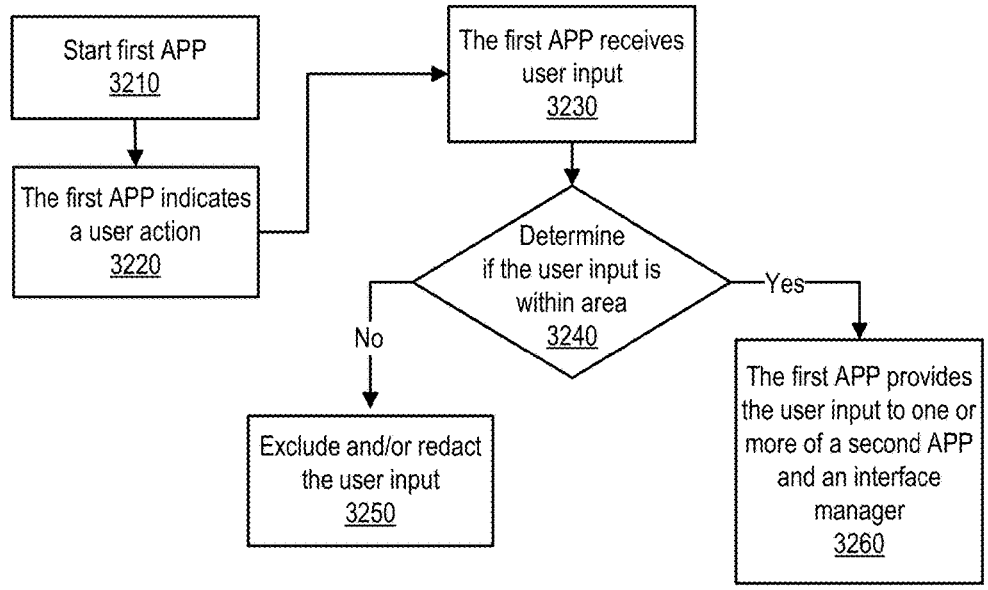
FIG. 3B provides an exemplary method of an application walk-through, according to one or more embodiments.

Turning now to FIG. 3B, an exemplary method of an application walk-through is illustrated, according to one or more embodiments. At 3210, a first APP can start. In starting the first APP, the first APP can attain and/or procure coordinates of APP icons during an initialization phase and/or a start-up sequence of its execution, according to one or more embodiments. At 3220, the first APP can indicate a user action. In one example, the first APP can indicate a user action via a beacon (e.g., a visual signal), such as a beacon 4620 (illustrated in FIG. 4B). For instance, beacon 4620 can indicate that the user action should include selecting APP icon 4610. In another example, the first APP can indicate via a swipe indicator 4424 (illustrated in FIG. 4J) that the user should and/or could swipe the display.

Figure 4C:
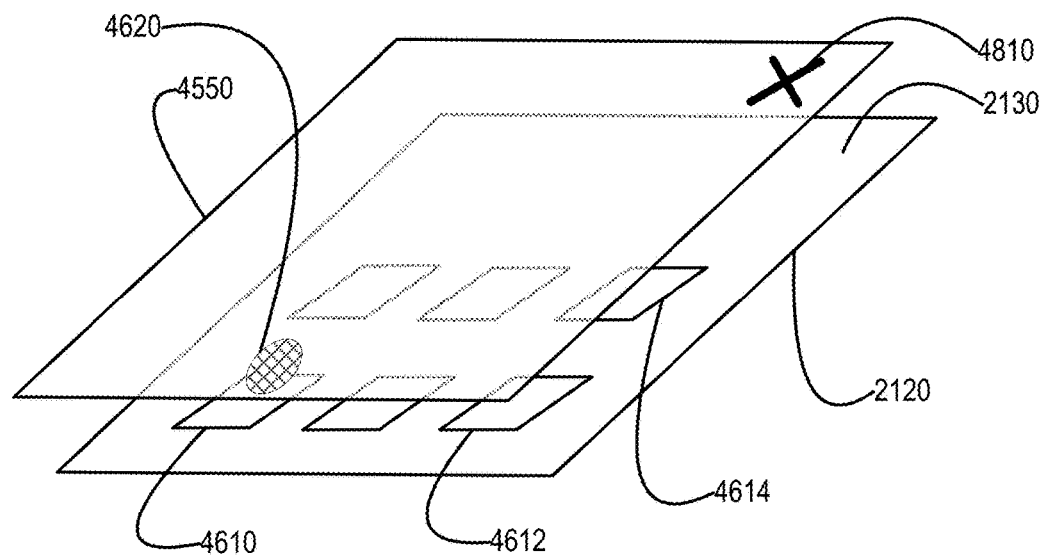

In one or more embodiments, an APP icon can be moved during use of a computing device. For example, APP icon 4610 could have been moved from a first location to a second location during use of the computing device (illustrated in FIGS. 4B and 4C), and the first APP can indicate a user action via beacon 4620 (illustrated in FIG. 4C). In one instance, the first APP can attain and/or procure, via a data structure stored in the computing device, coordinates of APP icon 4610 during an initialization phase and/or a start-up sequence of its execution. In another instance, the first APP can attain and/or procure, via a data structure stored in the computing device, coordinates of APP icon 4610 prior to indicating the user action via beacon 4610.

Figure 4E:
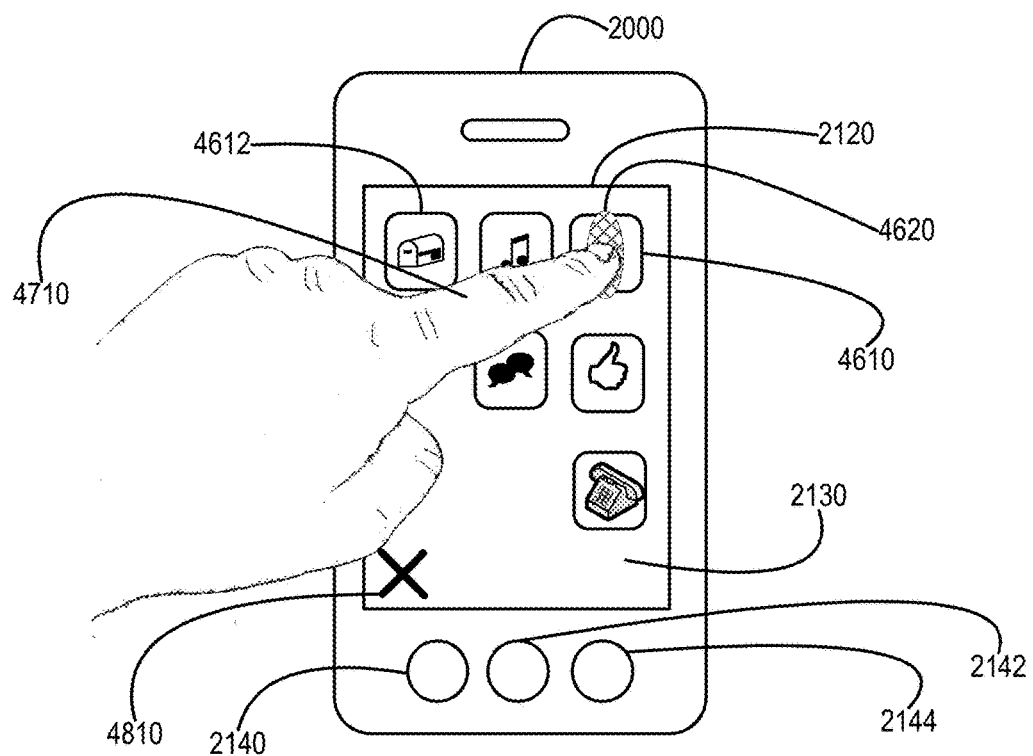
FIG. 4E provides an illustration of a computing device with a user selecting an area of a user interface indicated by a beacon, according to one or more embodiments.
Figure 4D:
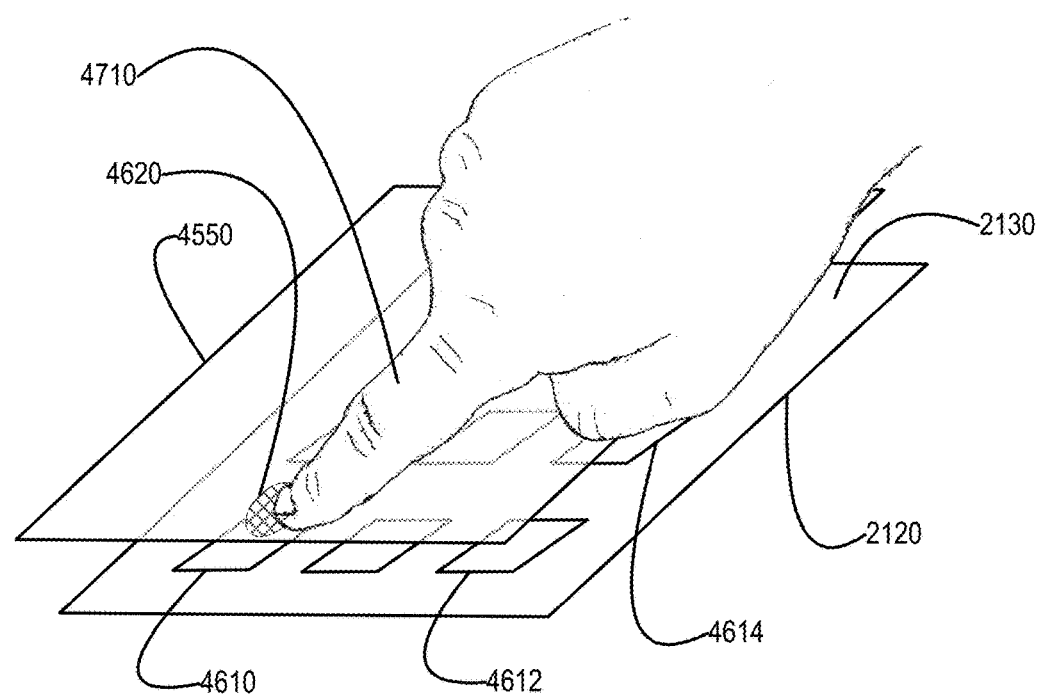
FIG. 4D provides a conceptual illustration of a transparent layer with a user selecting an area of a user interface indicated by a beacon, according to one or more embodiments.

At 3230, the first APP can receive user input. For example, the first APP can receive the user input via transparent layer 4550, as illustrated in FIG. 4D. For instance, transparent layer 4550 can be a conceptual transparent layer its purposes and/or functionality described herein. In one or more embodiments, the first APP can receive the user input via a portion of the user and/or a pointing device. In one example, the first APP can receive the user input via a portion of the user, such as a digit. For instance, the first APP can receive the user input via a finger 4710, as illustrated in FIGS. 4D and 4E. In another example, the first APP can receive the user input via one or more of a mouse, a stylus, a trackball, and a touchpad, among others. For instance, CD 2000 can be or include a virtual machine, and the user can interface with CD 2000 via a media interface 6542 (e.g., a web browser), illustrated in FIG. 4F, where the user can utilize one or more of a mouse, a stylus, a trackball, and a touchpad, among others, to position a pointer 4752 to select APP icon 4610, indicated via beacon 4620. In one or more embodiments, media interface 6542 can include one or more functionalities and/or structures as media interface 3040.

In one or more embodiments, the first APP can filter user input. For example, the first APP can receive user input via a portion of transparent layer 4550 that includes (a) beacon 4620 and/or (b) an area that includes beacon 4620 and an area around beacon 4620, and the first APP can exclude and/or redact user input outside and/or not included in those areas. At 3240, the first APP can determine if the user input is within an area that includes (a) beacon 4620 and/or (b) an area that includes beacon 4620 and an area around beacon 4620.

If the user input is not within the area that includes (a) beacon 4620 and/or (b) the area that includes beacon 4620 and the area around beacon 4620, the user input can be excluded and/or redacted, at 3250. In one or more embodiments, excluding and/or redacting the user input can include discarding the user input.

If the user input is within the area that includes (a) beacon 4620 and/or (b) the area that includes beacon 4620 and the area around beacon 4620, the first APP can provide the user input to one or more of a second APP and an interface manager, among others, at 3260. In one example, the first APP can provide the user input to an interface manager (e.g., a window manager, an APP manager, etc.). For instance, the user input provided to the interface manager can select APP icon 4610. In another example, the first APP can provide the user input to a second APP. For instance, after an APP icon is selected, a second APP can execute, and the first APP can provide the user input to the second APP.

Figure 3C:
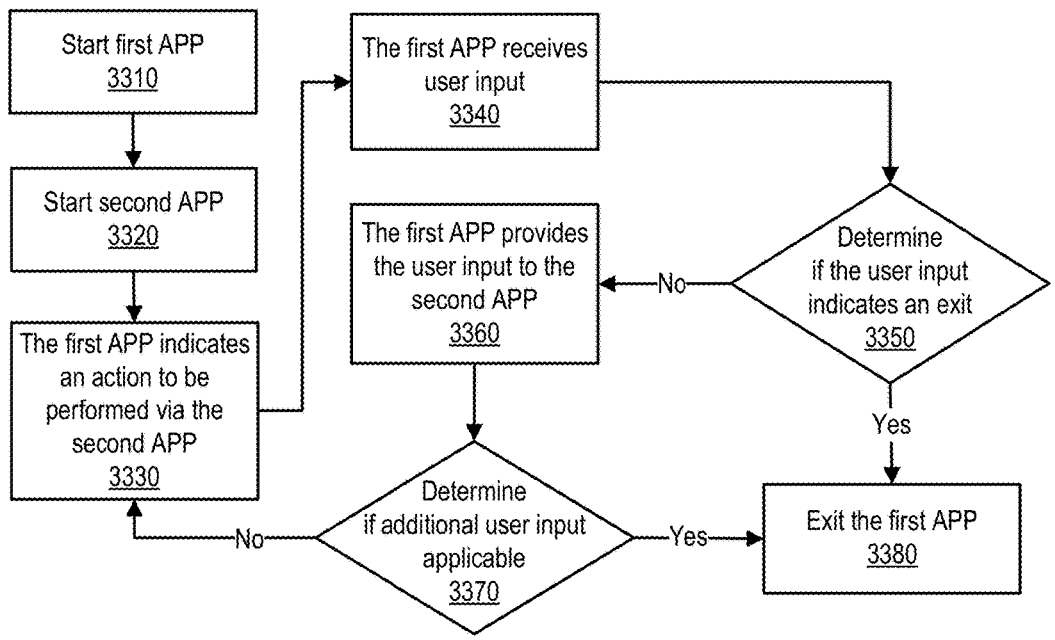
FIG. 3C provides another exemplary method of an application walk-through, according to one or more embodiments.

Turning now to FIG. 3C, another exemplary method of an application walk-through is illustrated, according to one or more embodiments. At 3310, a first APP can be started. For example, the first APP can be APP 2426, and APP 2426 can be started. At 3320, a second APP can be started. For example, the second APP can be an APP of APPs 2420-2424, and the APP of APPs 2420-2424 can be started. In one or more embodiments, the first APP can start the second APP.

Figure 4F:
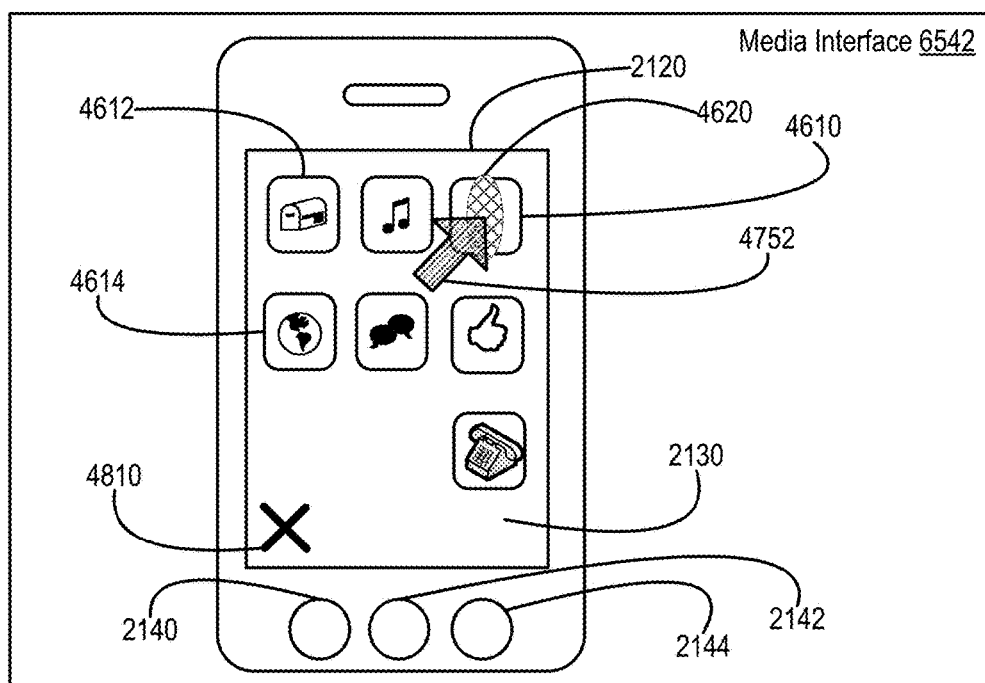
FIG. 4F provides an illustration of a media interface with a pointing device selecting an area of a user interface indicated by a beacon, according to one or more embodiments.

At 3330, the first APP can indicate an action to be performed via the second APP. In one example, the first APP can indicate an action to be performed via the second APP via a message 4410, as illustrated in FIG. 4G. For instance, the second APP can be or include an electronic mail (email) client, and the first APP can indicate to enter an email login via input area 4210 of email APP interface 4220, as illustrated in FIG. 4G. In another example, the first APP can indicate an action to be performed via the second APP via indicator 4424, as illustrated in FIG. 4J. For instance, indicator 4424 can indicate that the user should and/or could swipe the display. For example, additional forecast days can be displayed via a weather application interface 4422 when the user swipes in the direction indicated via indicator 4424. In one or more embodiments, indicator 4424 can be animated. For example, indicator 4424 can be animated to indicate that the user should and/or could swipe the display.

Figure 4G:
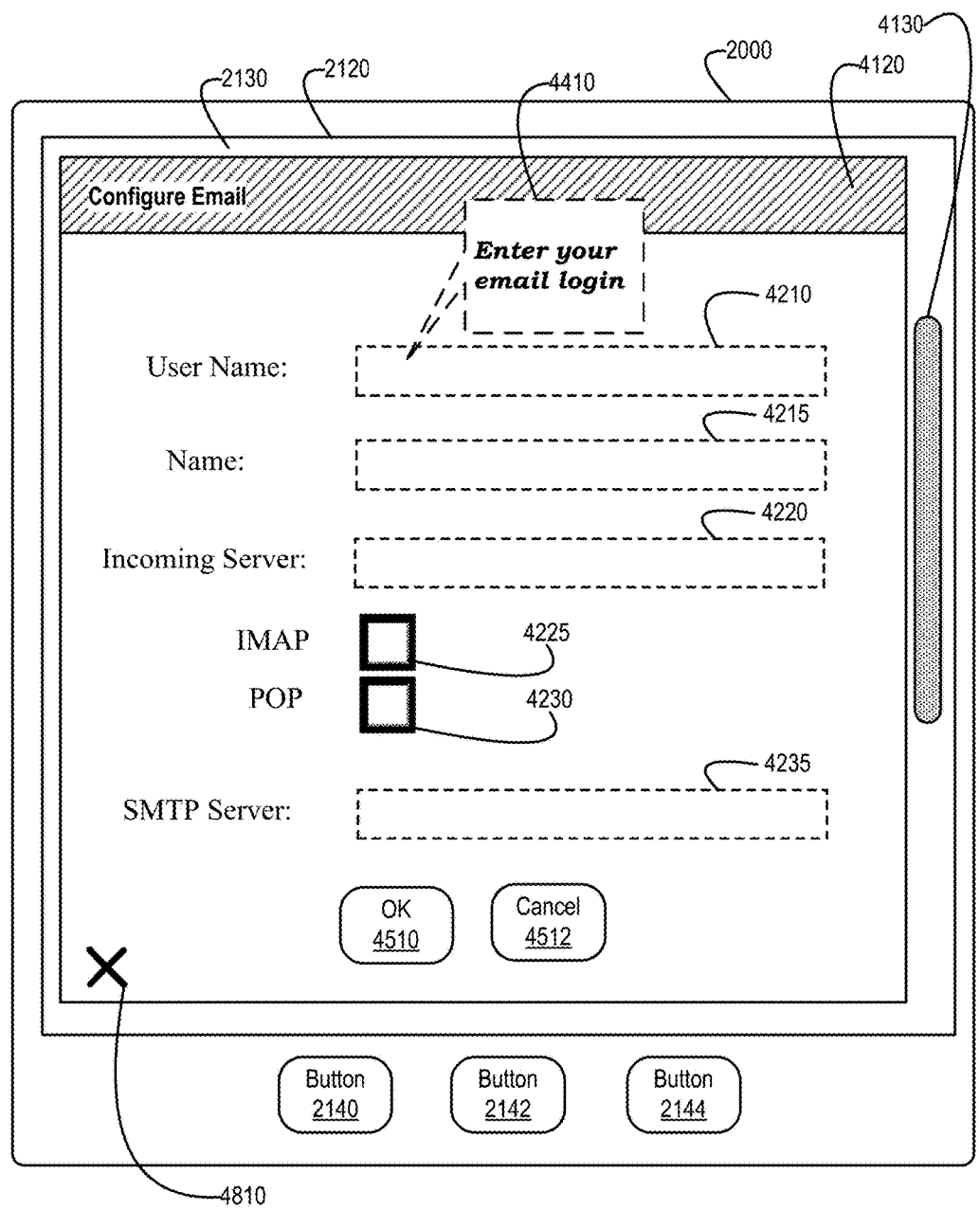
FIG. 4G provides an illustration of a first application that indicates an action to be performed via a second application, according to one or more embodiments.
Figure 4H:
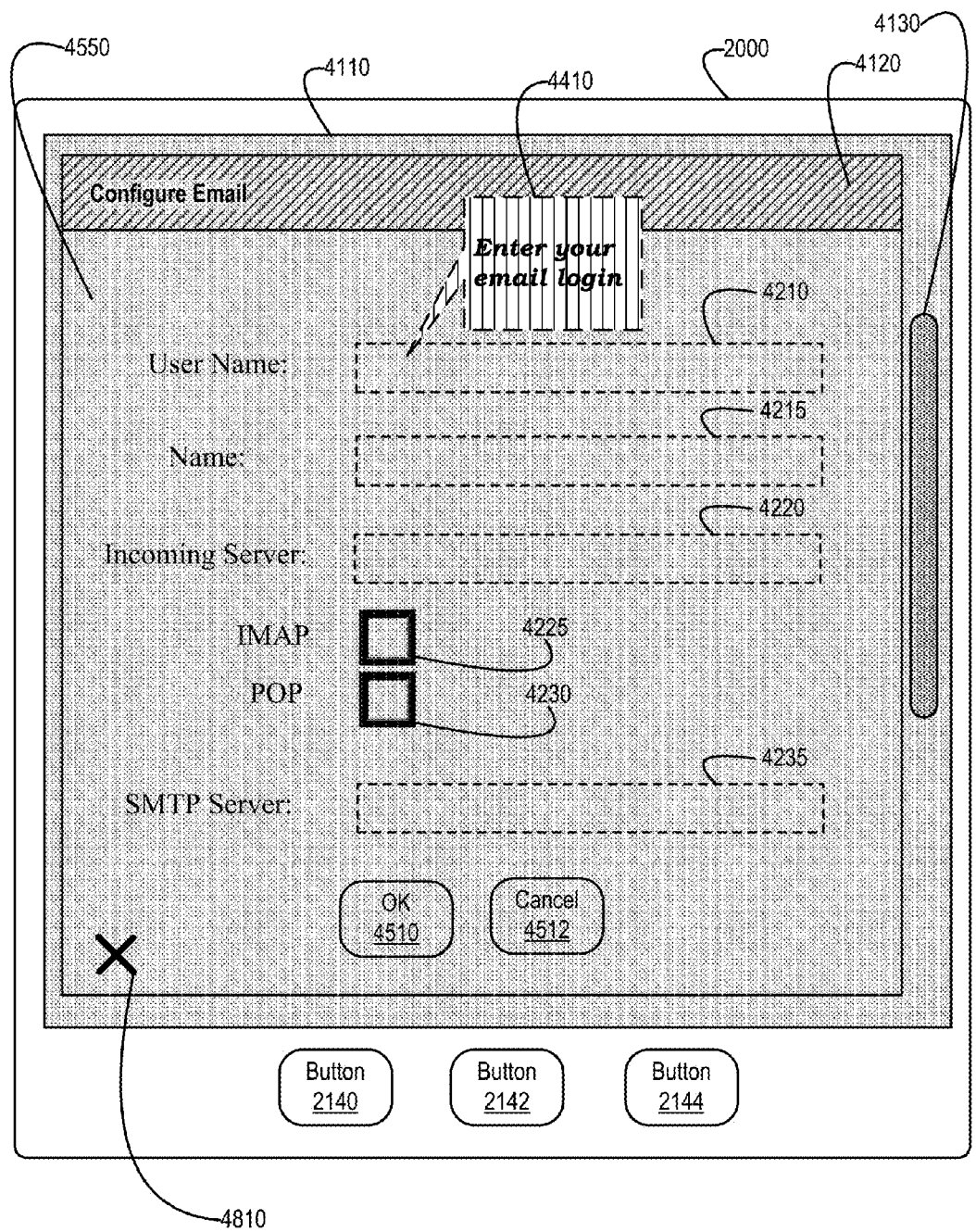
FIG. 4H provides a conceptual illustration of a transparent layer of a first application that indicates an action to be performed via a second application, according to one or more embodiments.
Figure 4I:
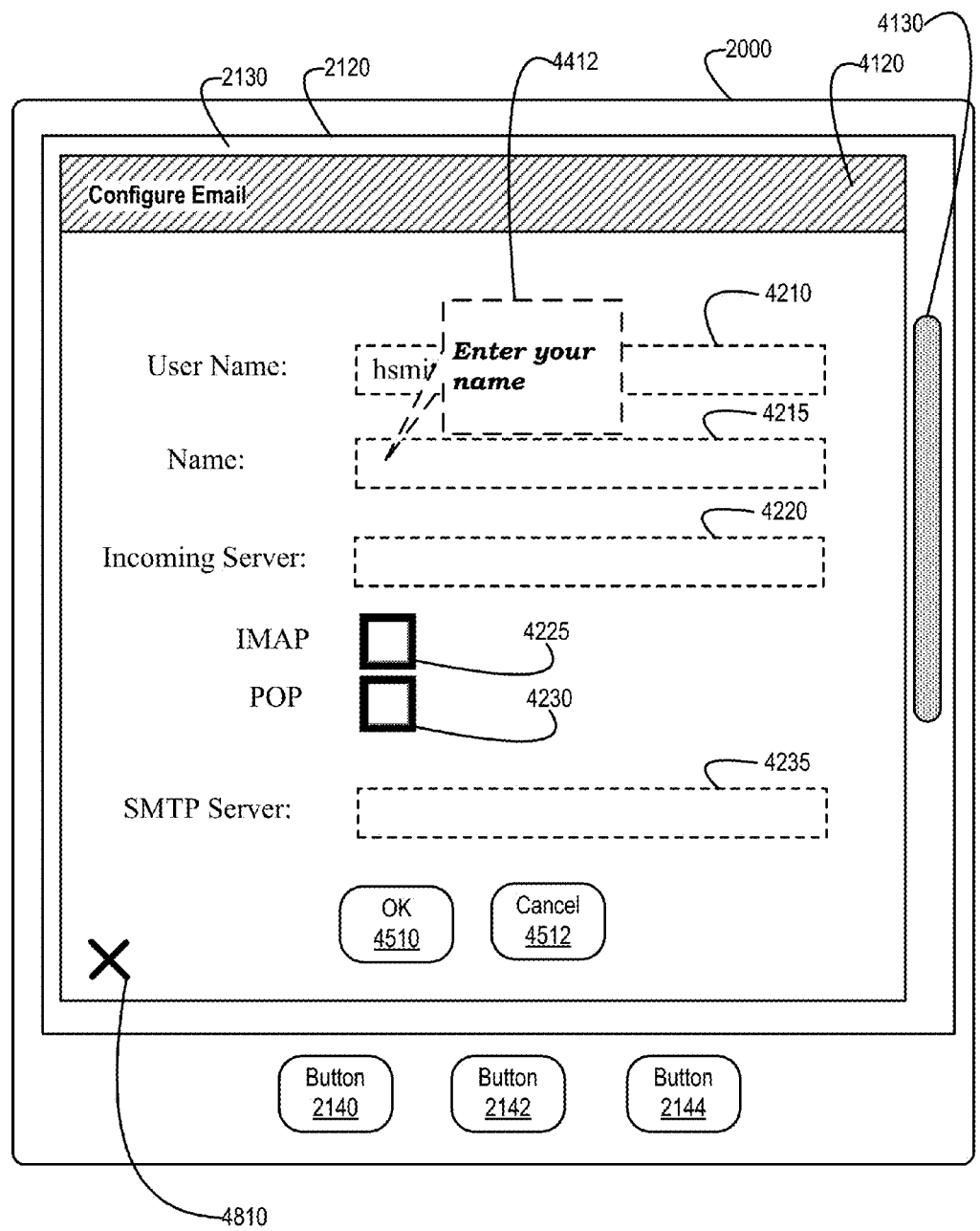
FIG. 4I provides another illustration of a first application that indicates an action to be performed via a second application, according to one or more embodiments.
Figure 4J:
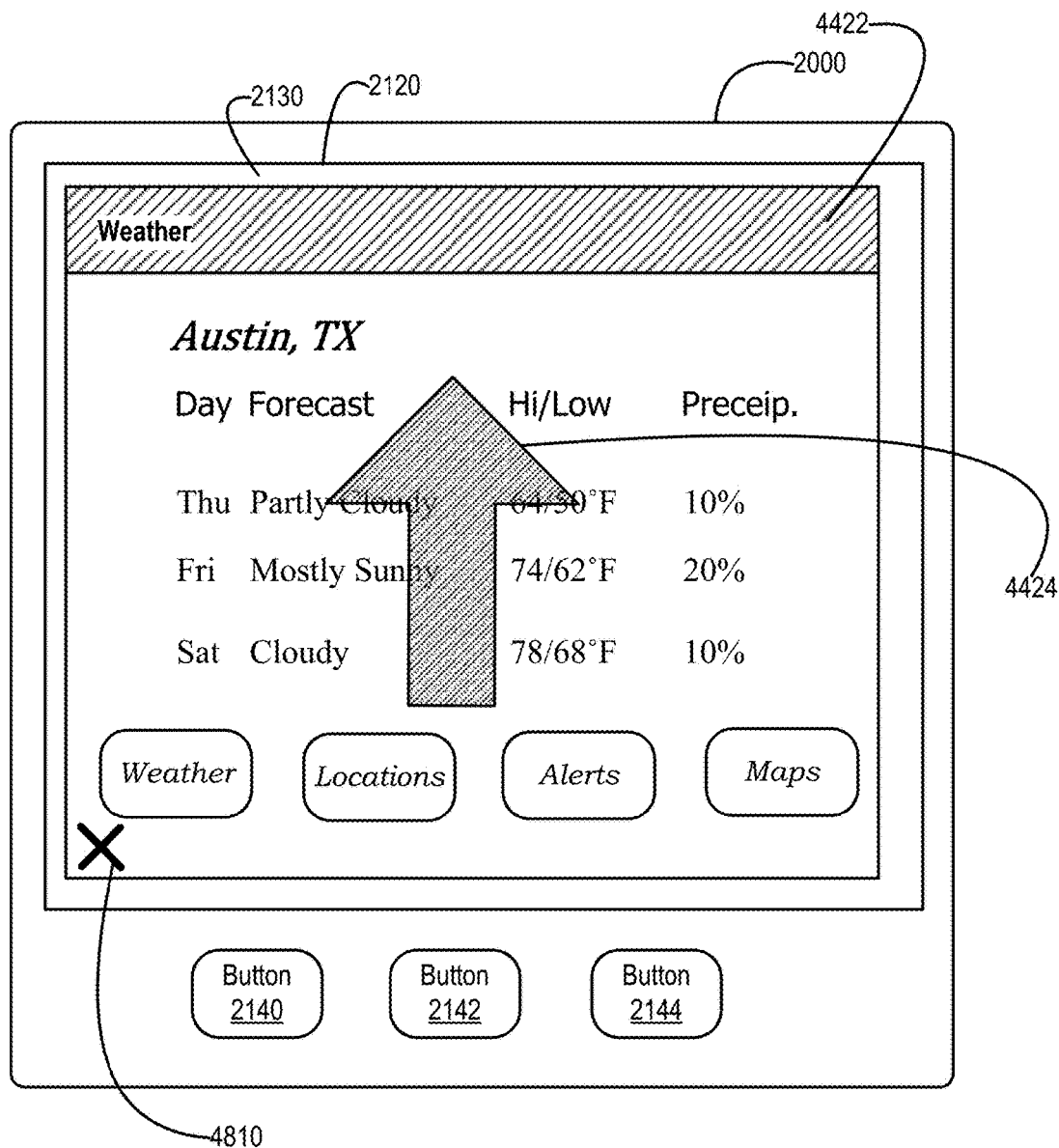
FIG. 4J provides an illustration of a first application that indicates a swipe action to be performed via a second application, according to one or more embodiments.

As illustrated in FIGS. 4G-4I, display 2120 can display email APP interface 4120 and a scroll bar 4130, among others. As shown, email APP interface 4120 can display text input areas 4210-4220 and 4235, check boxes 4225 and 4230, and buttons and/or icons 4510 and 4512. As illustrated FIG. 4G, the first APP can display message 4410 via display 2120.

With reference again to the method of FIG. 3C, the first APP can receive user input, at 3340. For example, the first APP can receive user input via touch screen 2130, illustrated in FIGS. 4G, 4I, and 4J. In one instance, the user input can include one or more alpha numeric characters. In another instance, the user input can a swipe.

In one or more embodiments, the first APP can receive the user input via touch screen 2130. As illustrated in FIG. 4H, the first APP can receive the user input via shaded area 4550 of touch screen 2130, for example. Shaded area 4550 is for illustrative purposes, and the first APP can receive the user input via an area, corresponding to shaded area 4550, that can be transparent.

With reference again to the method of FIG. 3C, the first APP can determine if the user input indicates an exit and/or conclusion of the first APP, at 3350. For example, the first APP can determine if the user input indicates an exit and/or conclusion of the first APP (e.g., an exit and/or conclusion of the walk-through) if the user input indicates a selection of an exit and/or conclusion icon. For instance, the user input can indicate a selection of an exit and/or conclusion icon 4810, illustrated in FIGS. 4B, 4C, and 4E-4J.

If the user input indicates an exit and/or conclusion of the first APP, the first APP can exit and/or conclude at 3380. If the user input does not indicate an exit and/or conclusion of the first APP, the first APP can provide the user input to the second APP, at 3360. In one example, the first APP can provide the user input to the second APP via APP manager 2310. For instance, the first APP can provide the user input to queue 2380, and APP manager 2310 can provide the user input to the second APP. In another example, the first APP can provide the user input to the second APP via kernel 2210. For instance, the first APP can provide the user input to queue 2280, and the user input stored in queue 2280 can be provided to the second APP via at least one method, system, and process described herein.

At 3370, the first APP can determine if addition user input is applicable. For example, the first APP can be configured for a number of scenarios of the second APP. For instance, the first APP can be configured to additionally aid a user with configuring one or more of text input areas 4215, 4220, and 4235 and selecting between check boxes 4225 and 4230. If the first APP determines that addition user input is applicable, the method can proceed to 3330, where the first APP can indicate an action to be performed via the second APP. For example, the first APP can indicate an action to be performed via the second APP via message 4412, as illustrated in FIG. 4I. For instance, the first APP can indicate to enter a name via input area 4215 of email APP interface 4120, as illustrated in FIG. 4I. If the first APP determines that addition user input is not applicable, the first APP can exit at 3380. For example, the first APP can determine that addition user input is not applicable via a conclusion of a set-up and/or walk-through process.

Figure 3D:
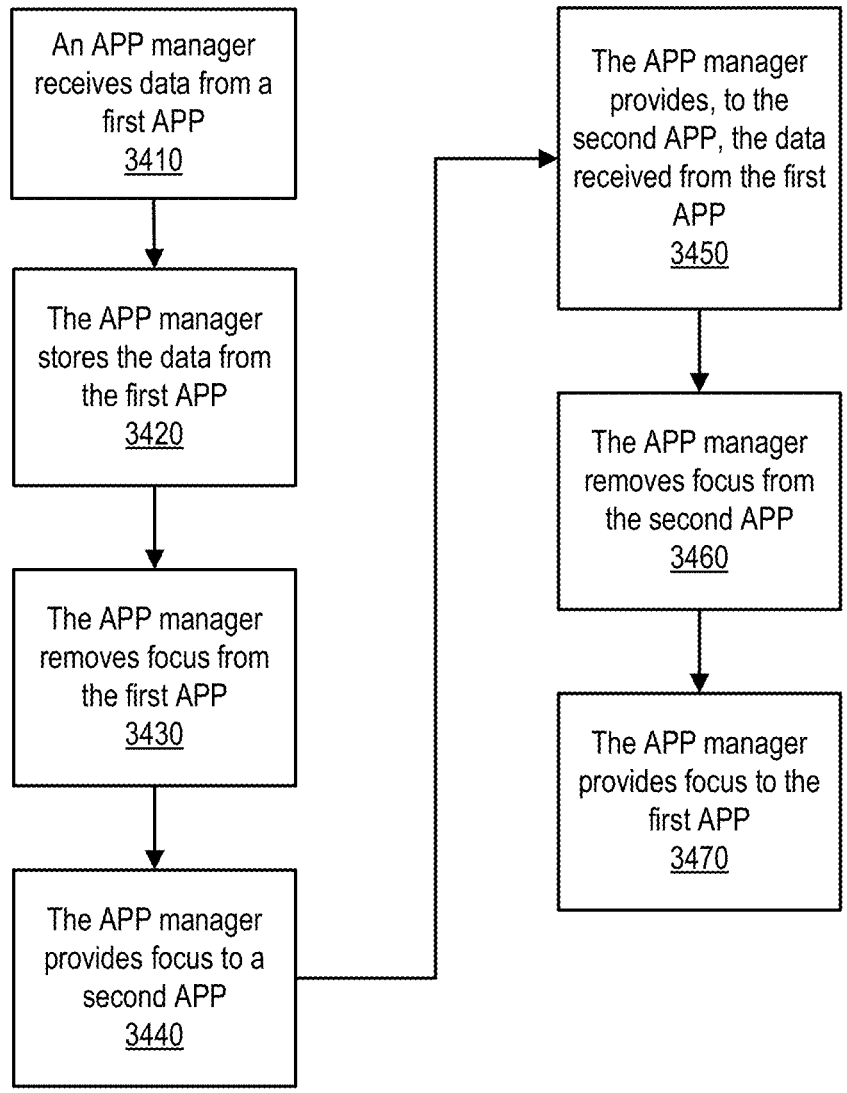
FIG. 3D provides an exemplary method of operating an application manager, according to one or more embodiments.

Turning now to FIG. 3D, a method of operating an APP manager is illustrated, according to one or more embodiments. At 3410, APP manager 2310 can receive data from a first APP. For example, the first APP can be APP 2426, and APP 2426 can provide the data to APP manager 2310. At 3420, APP manager 2310 can store the data from the first APP. For example, APP manager 2310 can store the data from the first APP via queue 2380.

At 3430, APP manager 2310 can remove focus from the first APP. In one or more embodiments, "focus" indicates a component of a GUI that is selected to receive input. For example, text pasted from a clipboard and/or entered via a keyboard can be sent to the component that has the focus. In one or more embodiments, APP manager 2310 withdraws and/or removes the focus an APP by giving another APP the focus.

At 3440, APP manager 2310 can provide focus to a second APP. For example, the second APP can be an APP of APPs 2420-2424. At 3450, APP manager 2310 can provide, to the second APP, the data received from the first APP. In one or more embodiments, APP manager 2310 can provide, to the second APP, the data received from the first APP via a callback (e.g., a subroutine, a function, a procedure, a subprogram, a method, a callable unit, etc.) of the second APP. For example, APP manager 2310 can provide, to the second APP, the data received from the first APP via an instantiation of the callback of the second APP with the data received from the first APP as a parameter of the callback of the second APP.

In one or more embodiments, APP manager 2310 can utilize multiple callbacks of the second APP. In one example, APP manager 2310 can utilize a first callback of the second APP to handle text (e.g., user input text). In a second example, APP manager 2310 can utilize a second callback of the second APP to handle a check or uncheck of a checkbox. In third example, APP manager 2310 can utilize a third callback of the second APP to handle movement of a scrollbar. In another example, APP manager 2310 can utilize a fourth callback of the second APP to handle a swipe of a user interface.

At 3460, APP manager 2310 can remove focus from the second APP. At 3470, APP manager 2310 can provide focus to the first APP. In one or more embodiments, the first APP can control a second APP via APP manager 2310 and the method of FIG. 3D.

As described above, CD 2000 can be or include a virtual machine, and the user can interface with CD 2000 via media interface 6542 (e.g., a web browser), illustrated in FIG. 4F. In one or more embodiments, the first APP (described with reference to the walk-throughs) can be or include media interface 6542. For example, media interface 6542 can execute instructions that can implement and/or function as the first APP. For instance, media interface 6542 can execute a script (e.g., JavaScript, EMCAScript, etc.) and/or byte code (e.g., Java byte code) that can function as the first APP, described with reference to the walk-throughs. In this fashion, a user can utilize, configure, and/or set-up a mobile device, according to one or more embodiments, as described further below.

Figure 5A:
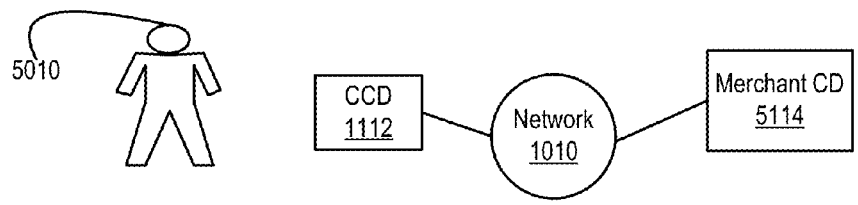
FIGS. 5A-5G provide exemplary diagrams of ordering and configuring a computing device, according to one or more embodiments.

Turning now to FIGS. 5A-5G, exemplary diagrams of ordering and configuring a computing device are illustrated, according to one or more embodiments. In one or more embodiments, a user/customer can utilize a CCD to interface with a merchant CD (e.g., an online retailer) and order a computing device via the merchant CD and a network. For example, as illustrated in FIG. 5A, a user/customer 5010 can utilize CCD 1112 to interface with a merchant CD 5114 (e.g., an online retailer) and order a computing device (e.g., CD 2000) via merchant CD 5114 and network 1010. In one or more embodiments, CD 2000 can be any of various types of devices, including a computer system, a server computer system, a laptop computer system, a notebook computing device, a portable computer, a PDA, a handheld mobile computing device, a mobile wireless telephone (e.g., a satellite telephone, a cellular telephone, etc.), an Internet appliance, a television device, a DVD (digital video disc player) device, a Blu-Ray disc player device, a DVR (digital video recorder) device, an in-vehicle computing device, a wearable computing device (e.g., illustrated in FIGS. 5I and 5J), a watch, a smart watch, or other wireless or wired device that includes a processor that executes instructions from a memory medium.

In one or more embodiments, the user/customer can utilize the CCD to interface with a computer system (CS) and configure a virtual CD (e.g., a virtual machine) via the network. For example, user/customer 5010 can utilize CCD 1112 to interface with a CS 5210 and configure a virtual CD (e.g., a virtual machine) via network 1010. In one or more embodiments, one or more configurations of one or more respective virtual computing devices (CDs) can be stored. In one example, CS 5210 can include storage, and the one or more configurations of the one or more respective virtual CDs can be stored via the storage included in CS 5210. In a second example, storage can be coupled to a network, and the one or more configurations of the one or more respective virtual CDs can be stored via the storage coupled to the network. In another example, as illustrated in FIG. 5B, a storage 5121 can be coupled to CS 5210, and the one or more configurations of the one or more respective virtual CDs can be stored via storage 5121.

Figure 5B:
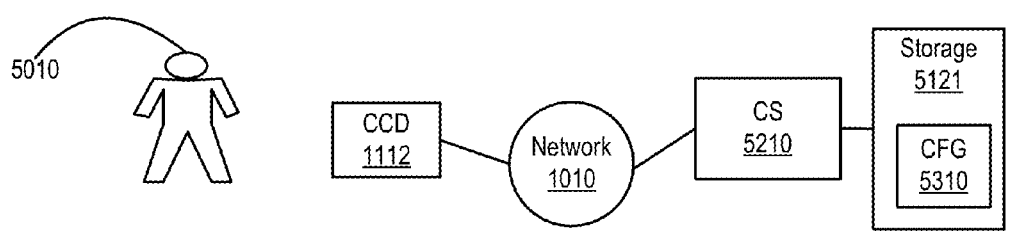

As shown in FIG. 5B, a CFG 5310 can be stored via storage 5121. In one or more embodiments, CFG 5310 can include one or more sound recordings (e.g., MP3 songs, musical pieces, voice memos, conversations, lectures, etc.), one or more contacts (e.g., contact information associated with people, places, companies, etc.), login information, online account information, one or more bookmarks (e.g., web browser book marks), one or more ebooks, one or more social networking sites' respective information (e.g., Facebook information, Twitter information, MySpace information, Foursquare information, Last.fm information, Google+ information, etc.) associated with a user of a MD, and/or one or more mobile device apps (e.g., smart phone apps, tablet computer apps, music player apps, in-vehicle apps, etc.), among others.

Figure 5C:
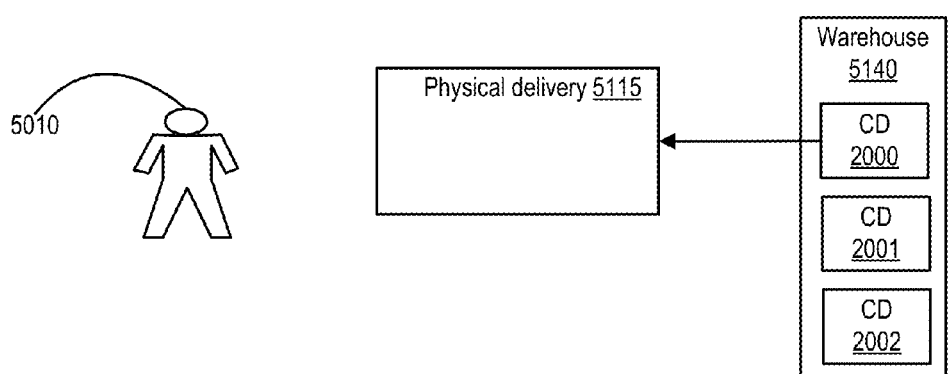

In one or more embodiments, a retailer, a seller, etc., can provide a physical CD to a physical deliver service (e.g., a postal service, a parcel service, a courier service, a courier, an in-store pick-up, an automobile dealership, etc.). For example, as illustrated in FIG. 5C, a retailer, a seller, etc., can provide CD 2000 (e.g., in a physical embodiment) to a physical deliver service 5115 (e.g., a postal service, a parcel service, a courier service, a courier, an in-store pick-up, etc.). As shown in FIG. 5C, CD 2000 can be stored via warehouse 5140 (e.g., a physical warehouse, a physical stockroom, etc.), and CD 2000 can be provided to physical delivery service 5115.

In one or more embodiments, providing a physical CD to a physical delivery service can include marking packaging of the physical CD. In one example, packaging of the physical CD can be marked with information that can identify one or more of the user and the physical CD. In another example, packaging of the physical CD can be marked with address information. For instance, the address information can include a physical address, associated with user 5010, that is utilizable by physical deliver service 5115 to deliver the physical CD to user 5010.

Figure 5D:
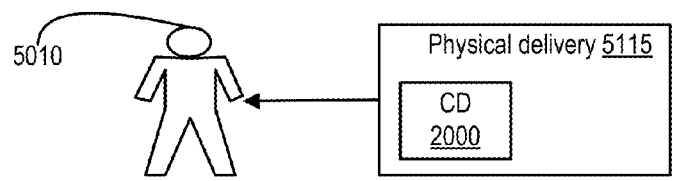

In one or more embodiments, the user/customer can receive the physical CD via a physical deliver service (e.g., a postal service, a parcel service, a courier service, a courier, an in-store pick-up, etc.). For example, as illustrated in FIG. 5D, user/customer 5010 can receive CD 2000 via a physical deliver service 5115 (e.g., a postal service, a parcel service, a courier service, a courier, an in-store pick-up, an automobile dealership, etc.).

Figure 5E:
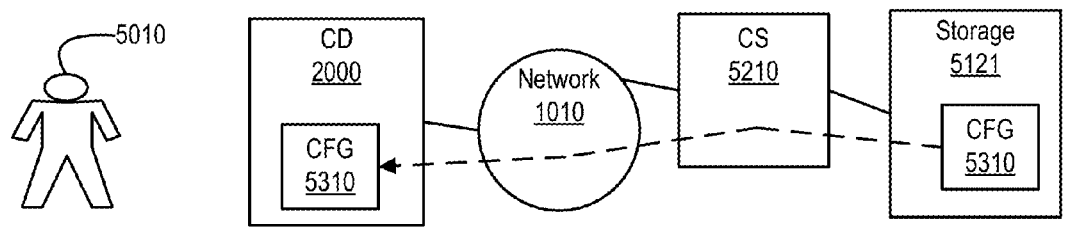

In one or more embodiments, a CD, received via a physical delivery service, can be coupled to a network, and the CD can receive and/or retrieve a configuration that was configured prior to receiving the CD via the physical delivery service. For example, as illustrated in FIG. 5E, CD 2000 can be coupled to network 1010, and CD 2000 can receive and/or retrieve CFG 5310. For instance, CS 5210 can retrieve CFG 5310 from storage 5121 and can provide CFG 5310 to CD 2000 via network 1010.

Figure 5F:
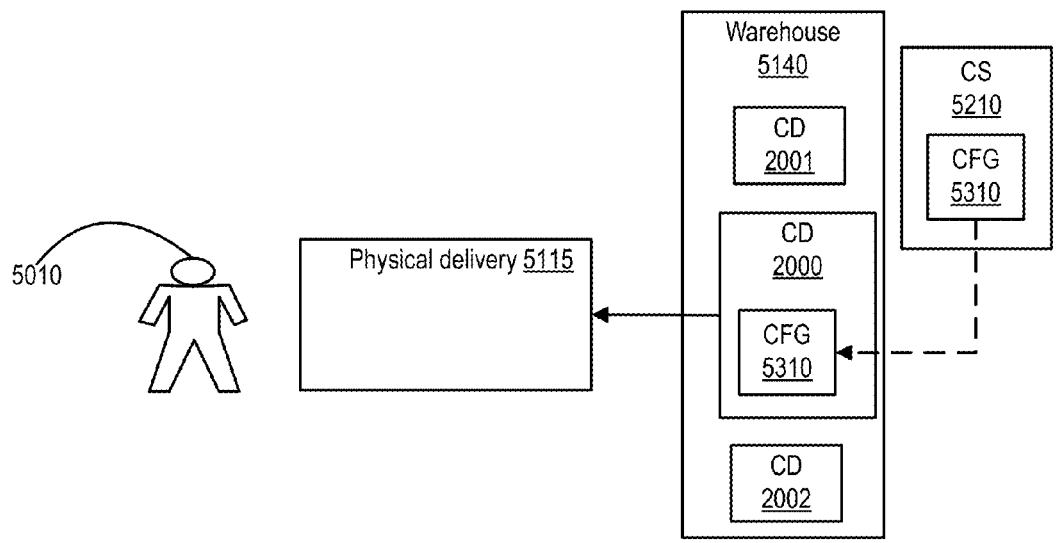
Figure 5G:
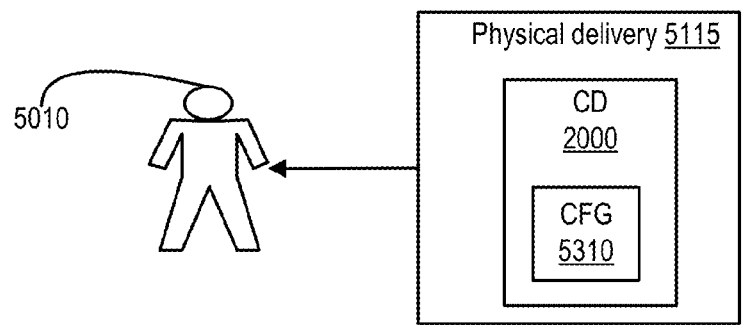

In one or more embodiments, a CD can be configured at a place associated with a retailer, a seller, etc. For example, as illustrated in FIG. 5F, CD 2000 can be configured at warehouse 5140, and CD 2000 can be provided to physical delivery service 5115 after CD 2000 is configured with CFG 5310. In one instance, CD 2000 can be configured with CFG 5310 at warehouse 5140 in a wireless fashion. In another instance, CD 2000 can be configured with CFG 5310 at warehouse 5140 in a wired fashion. As shown in FIG. 5G, physical delivery 5115 can provide CD 2000, configured with CFG 5310, to customer/user 5010.

Figure 5H:
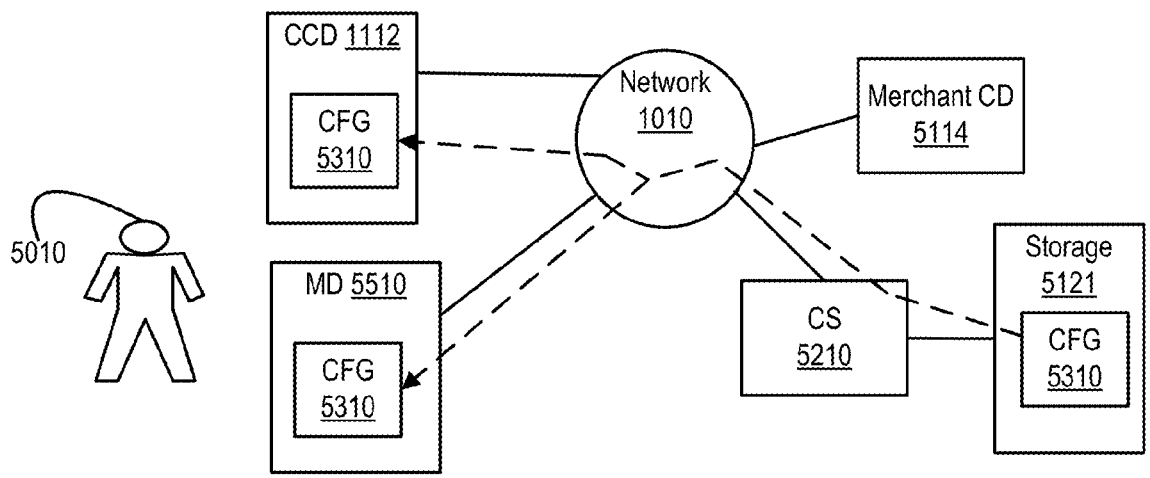
FIG. 5H illustrates an exemplary diagram of delivering a mobile device configuration, according to one or more embodiments.
Figure 5I:
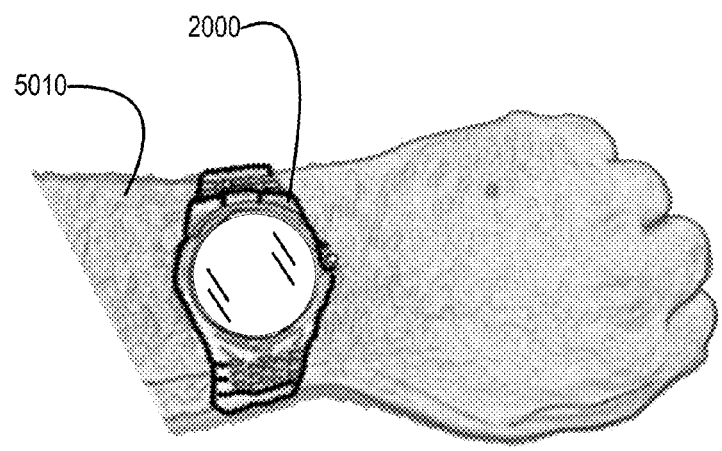
FIGS. 5I and 5J illustrate exemplary diagrams of a wearable computing device, according to one or more embodiments.
Figure 5J:
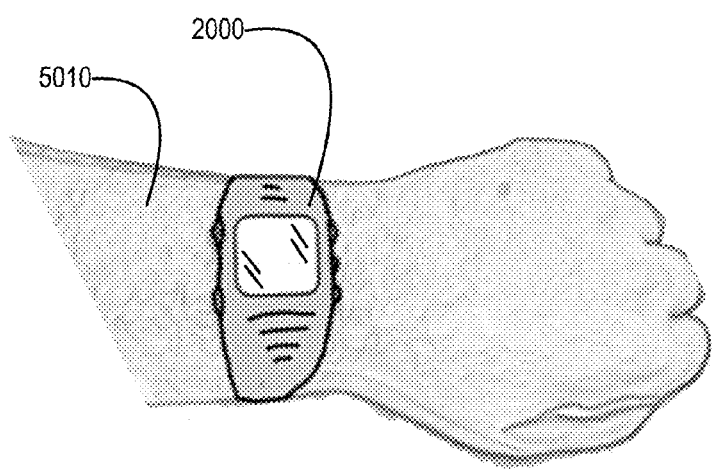

In one or more embodiments, a configuration can be provided to one or more computing devices. For example, as illustrated in FIG. 5H, CFG 5310 can be provided to one or more of CCD 1112 and a mobile device (MD) 5510. In one or more embodiments, one or more computing devices can emulate a MD, based on a provided configuration. For example, user/customer 5010 can begin to utilize an emulation of a configured MD via one or more of CCD 1112 and MD 5510. In one instance, user/customer 5010 can begin to utilize an emulation of CD 2000, configured with CFG 5310, via CCD 1112 and/or MD 5510 before a physical delivery of CD 2000. In another instance, user/customer 5010 can begin to utilize an emulation of CD 2000, configured with CFG 5310, via CCD 1112 and/or MD 5510 without any physical delivery of CD 2000.

Figure 5K:
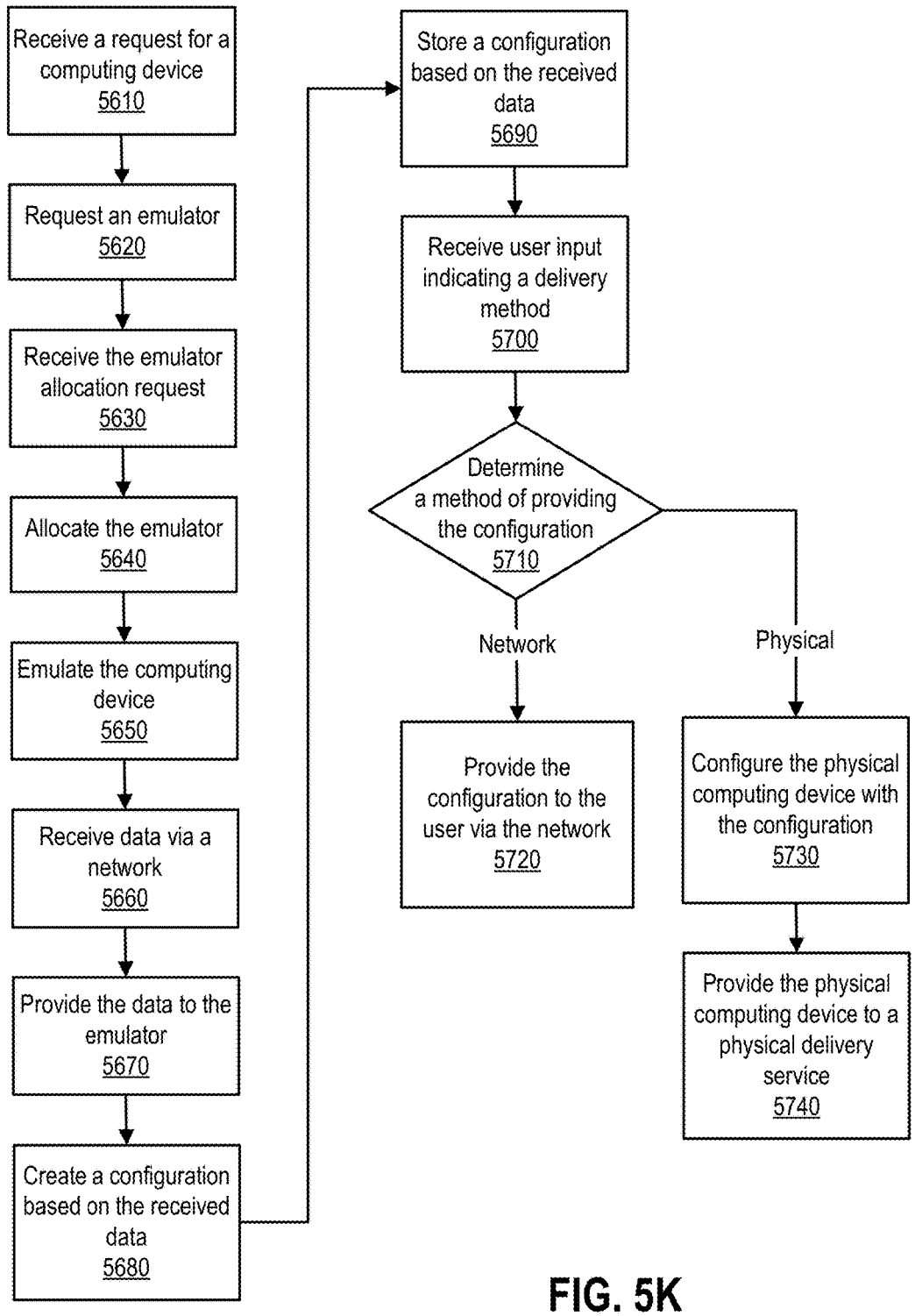
FIG. 5K illustrates a method of creating a configuration of a computing device and delivering the configuration is illustrated, according to one or more embodiments.

Turning now to FIG. 5K, a method of creating a configuration of a computing device and delivering the configuration is illustrated, according to one or more embodiments. At 5610, a request for a computing device can be received. For example, merchant CD 5114 can receive the request for the computing device. In one instance, the request for the computing device can be or include an order for the computing device. In another instance, as illustrated in FIG. 5A, a user/customer 5010 can utilize CCD 1112 to interface with a merchant CD 5114 (e.g., an online retailer) and order the computing device (e.g., CD 2000) via merchant CD 5114 and network 1010. In one or more embodiments, the requested and/or ordered computing device can be a physical mobile device.

At 5620, an emulator corresponding to the requested and/or ordered computing device can be requested. For example, merchant CD 5114 can request the emulator of CS 5210. At 5630, CS 5210 can receive the emulator allocation request. At 5640, the emulator can be allocated. For example, an emulator of emulators 6420-6425, illustrated in FIG. 6E, can be allocated. For instance, the emulator can correspond to a physical mobile device that includes a physical processor, a physical memory, and a physical integrated circuit.

At 5650, the emulator can emulate the computing device. For example, the emulator can be or include a data processing emulator such as QEMU, SPIM, VMware, VirtualBox, or Bochs, among others. At 5660, data can be received via a network. For example, CS 5210 can receive data from user 5010 via network 1010.

At 5670, the received data can be provided to the emulator. At 5680 a configuration can be created. For example, the received data can be utilized to configure the emulated computing device and/or create a configuration (e.g., CFG 5310). For instance, CFG 5310 can include one or more sound recordings (e.g., MP3 songs, musical pieces, voice memos, conversations, lectures, etc.), one or more contacts (e.g., contact information associated with people, places, companies, etc.), one or more bookmarks (e.g., web browser book marks), one or more ebooks, one or more social networking sites' respective information (e.g., Facebook information, Twitter information, MySpace information, Foursquare information, Last.fm information, Google+ information, etc.) associated with user 5010, and/or one or more mobile device apps (e.g., smart phone apps, tablet computer apps, music player apps, in-vehicle apps, etc.), among others, based on and/or created via the received data.

At 5690, the configuration can be stored. In one example, the configuration can be stored via storage 5121. In another example, the configuration can be stored via one or more of storages 6120-6122, illustrated in FIG. 6E. At 5700, user input indicating a delivery method can be received. In one example, CS 5210 can receive the user input indicating the delivery method. In another example, merchant CD 5114 can receive the user input indicating the delivery method.

At 5710, a delivery method can be determined. In one example, CS 5210 can determine the delivery method. In another example, merchant CD 5114 can determine the delivery method. In one or more embodiments, delivery of the configuration can include one or more of delivering the configuration via the network (e.g., network 1010) and delivering a physical computing device configured with the configuration.

If the delivery of the configuration (e.g., CFG 5310) includes delivering the configuration via the network (e.g., network 1010), the configuration can be provided to the user via the network, at 5720. For example, CFG 5310 can be delivered to CCD 1112 and/or to MD 5510 via network 1010, as illustrated in FIG. 5H. If the delivery of the configuration (e.g., CFG 5310) includes delivering the physical computing device configured with the configuration, the physical computing device can be configured with the configuration, at 5730, and the physical computing device (e.g., CD 2000) can be provided to a physical delivery service, at 5740. For instance, the physical delivery service can provide the physical computing device (e.g., CD 2000) as described herein.

Figure 6A:
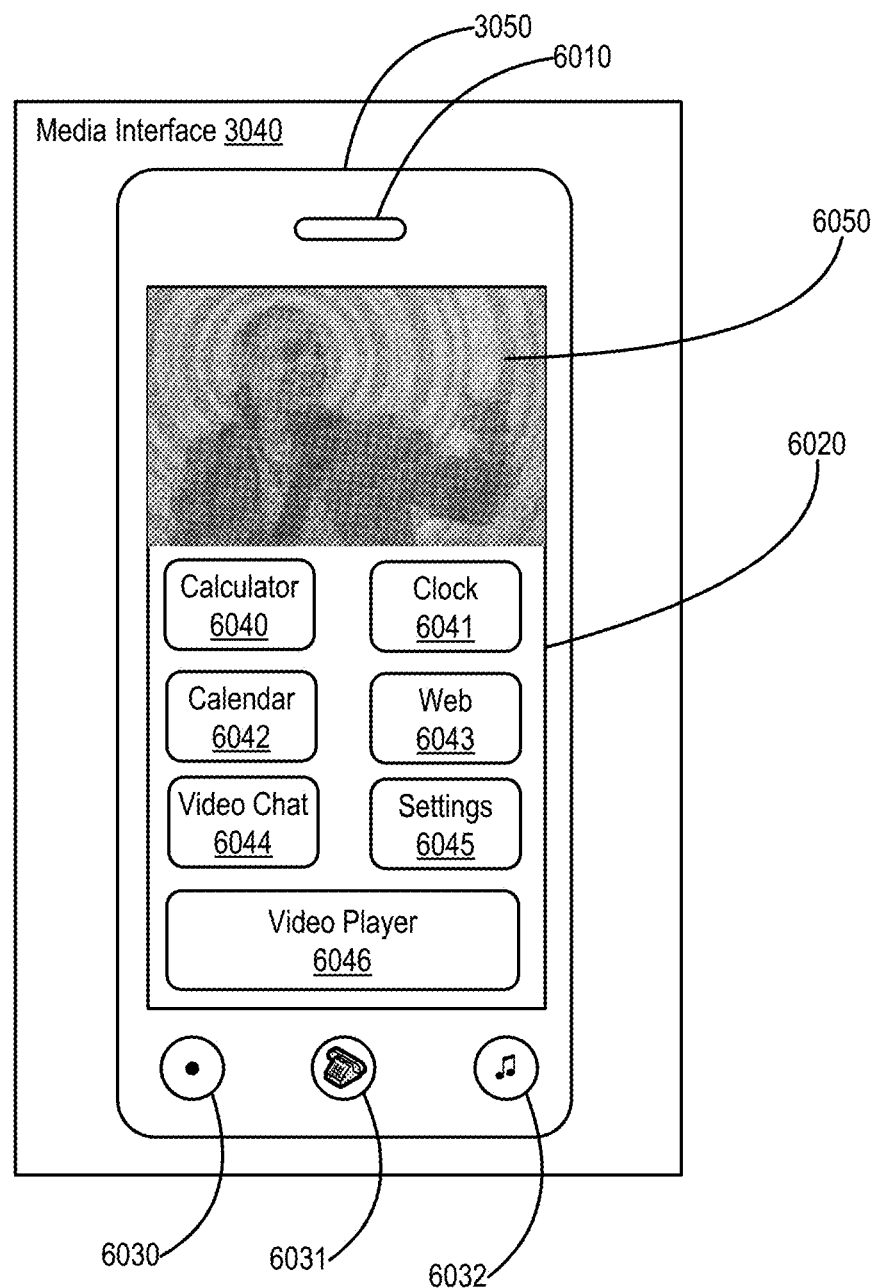
FIGS. 6A-6C provide exemplary diagrams of a simulated object, according to one or more embodiments.
Figure 6B:
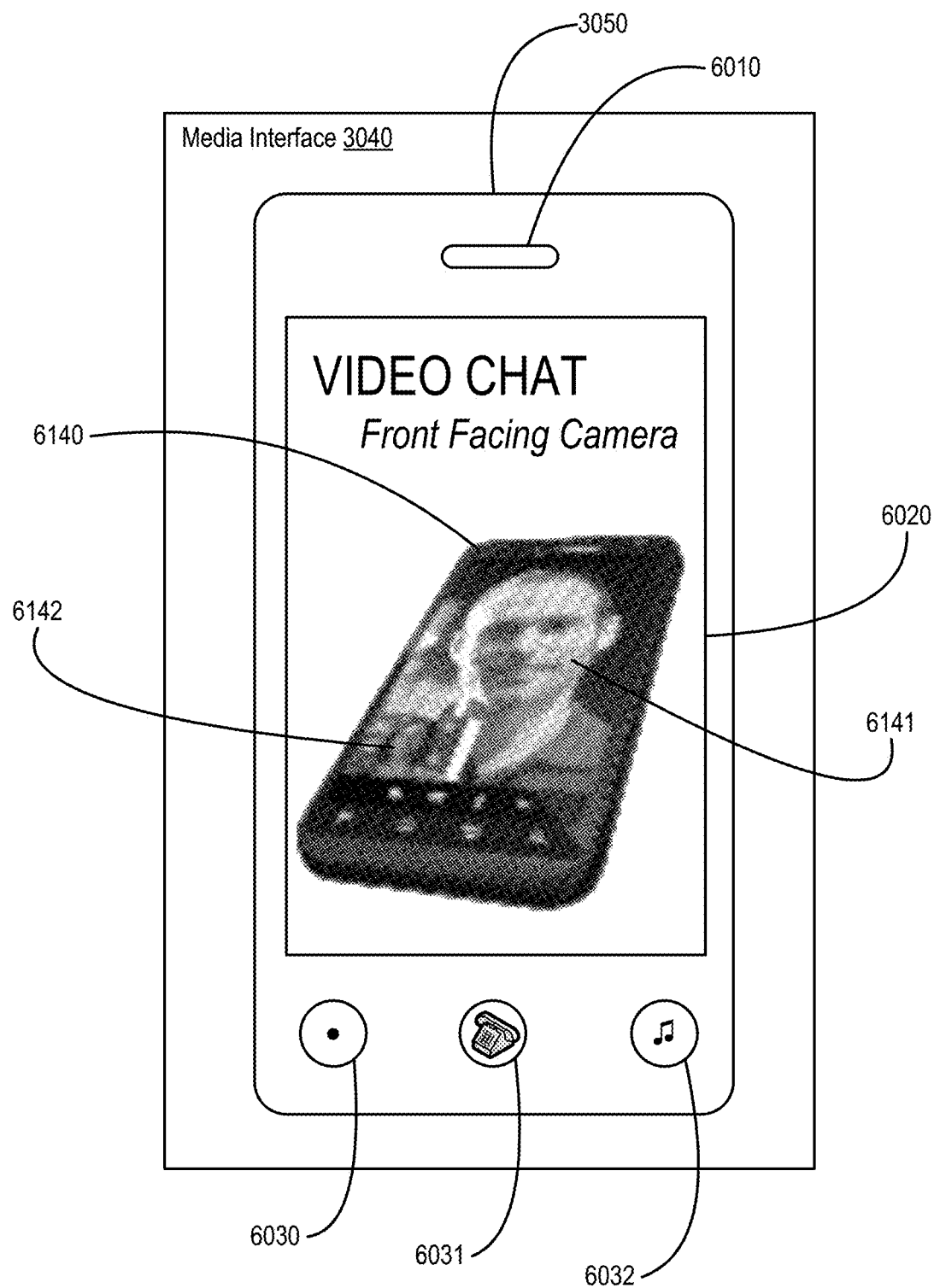
Figure 6C:
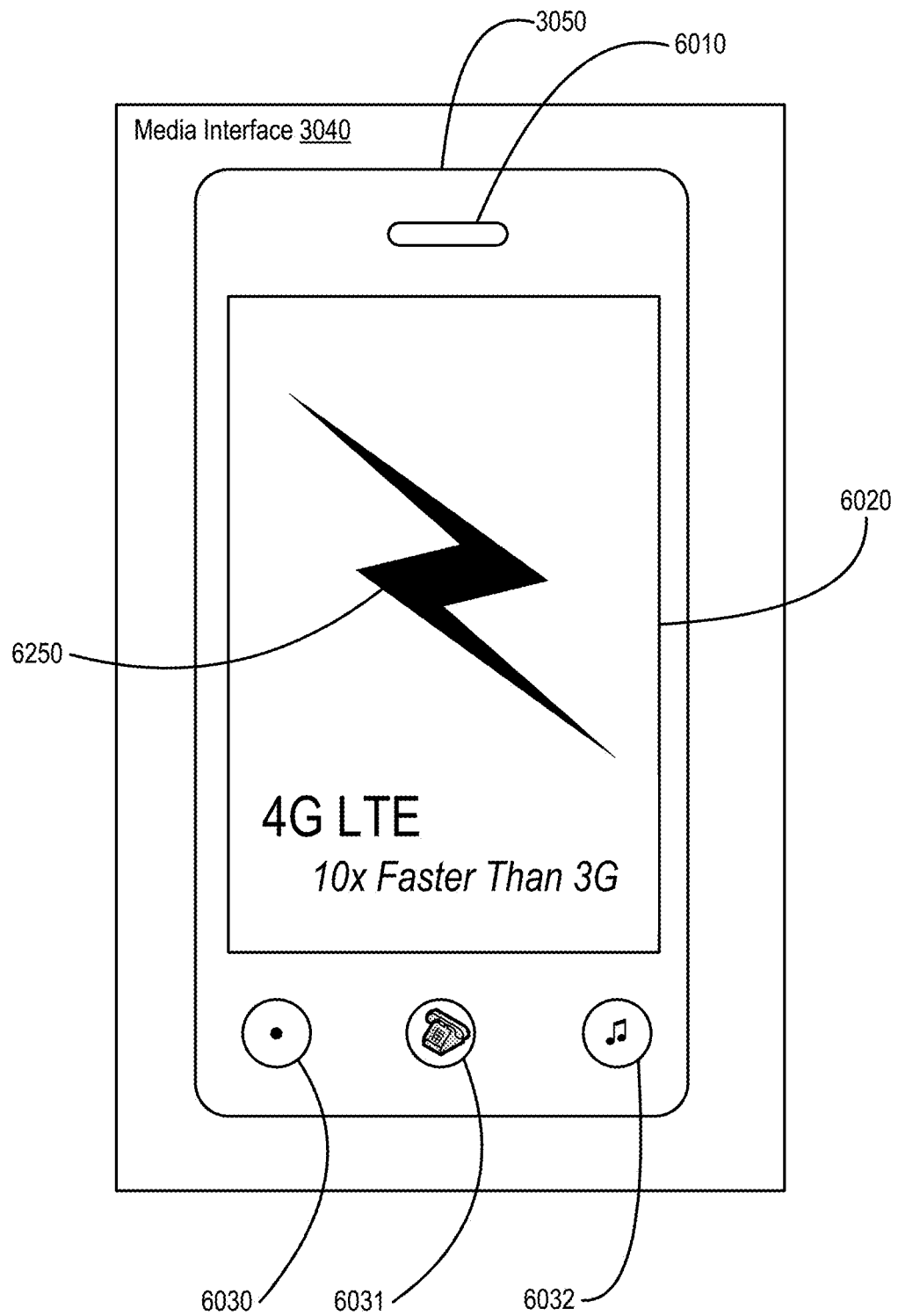

Turning now to FIGS. 6A-6C, exemplary diagrams of a simulated object are illustrated, according to one or more embodiments. As shown in FIG. 6A, simulated object 3050 can include one or more of a wireless telephone (e.g., a cellular telephone, a satellite telephone, a wireless Ethernet telephone, etc.), a digital music player, a tablet computing device, and a PDA, among others. As illustrated, object 3050 can include one or more of a simulated sound output device 6010, a simulated display 6020, and simulated buttons 6030-6032.

As shown, simulated display 6020 can display one or more of a picture or graphic 6050 and one or more buttons or icons 6040-6046. In one or more embodiments, a customer (e.g., a user of a CCD) can select and/or actuate one or more of icons 6040-6046 and buttons 6030-6032, and simulated object 3050 can perform one or more simulated functions associated with a selection or simulation of a selected icon or button of object 3050. In one example, the customer can select button 6031, and a numeric keypad can be displayed via simulated display 6020. For instance, keys of the numeric keypad can simulate a keypad of a telephone. In a second example, the customer can select button 6032, and an interface to a digital music player can be displayed via simulated display 6020. In another example, an icon of icons 6040-6046 can be selected to simulate a respective application of a calculator application, a clock application, a calendar application, a web browser application, a video chat application, a video player (e.g., a motion picture player) application, and a setting or configuration application.

In one or more embodiments, a simulation of object 3050 and/or one or more simulated features and/or functions can be performed via a CCD. In one example, a client-side script (e.g., JavaScript, EMCAScript, etc.) can be executed by a web browser of the CCD. In a second example, a compiled client-side program (e.g., Java byte code) can be executed by a web browser of the CCD. In one or more embodiments, a simulation of object 3050 and/or one or more simulated features and/or functions can be performed via a media server. In one example, the media server can receive information from a CCD that indicates a simulated button or icon has been selected and can utilize simulated display, via media interface 3040, to display functionality associated with the selected button or icon.

As shown in FIG. 6B, simulated display 6020 can display a simulation of a video chat application. In one example, a simulated picture or graphic 6141 of a person with whom the customer is chatting can be displayed via simulated display 6020. In another example, a simulated picture or graphic 6142 of the customer can be displayed via simulated display 6020. For instance, picture or graphic 6142 of the customer can demonstrate a front-facing camera of simulated object 3050. In one or more embodiments, the simulation of the video chat application can be started and/or executed in response to a selection and/or actuation of button or icon 6044 of FIG. 6A. For example, the simulation of the video chat application can be a video (e.g., a motion picture) that can be played via simulated display 6020.

In one or more embodiments, simulated display 6020 can be utilized to play one or more videos (e.g., motion pictures). In one example, simulated display 6020 can be utilized to play a clip from Youtube. In a second example, simulated display 6020 can be utilized to play a trailer to a movie. In another example, simulated display 6020 can be utilized to play videos that demonstrate one or more features of simulated object 3050. In one or more embodiments, user input can be received to pause, play, rewind, and/or fast-forward the video played via simulated display 6020.

In one or more embodiments, the customer can select button 6030 to return to a "home" state or location of simulated object 3050. For example, the "home" state or location of simulated object 3050 is illustrated in FIG. 6A. As illustrated in FIG. 6C, a picture or graphic 6250 can be displayed via simulated display 6020. For example, picture or graphic 6250 can be included in a graphical advertisement for a physical device associated with its simulated object 3050.

Figure 6D:
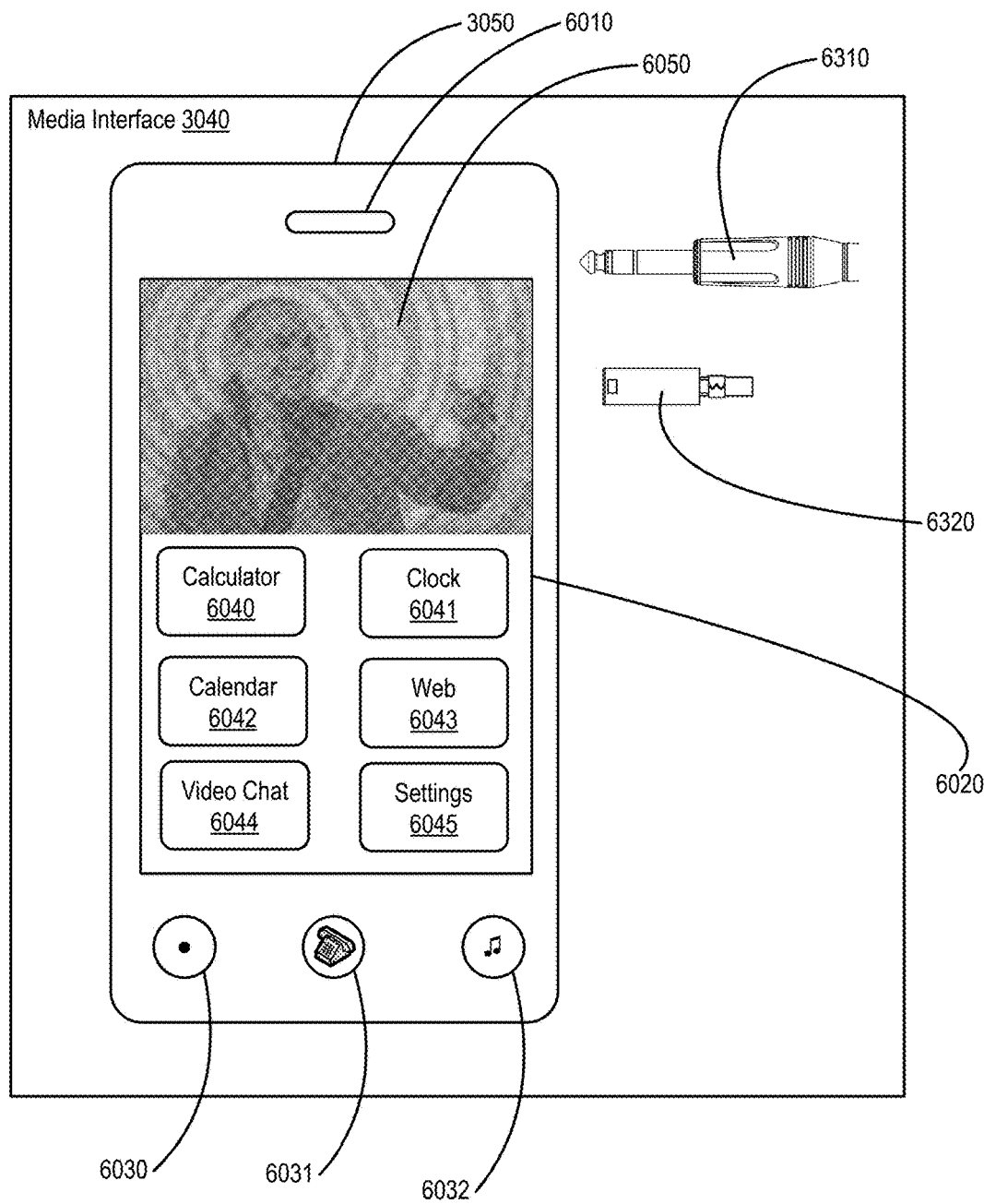
FIG. 6D illustrates an exemplary diagram of a simulated object with operational aids, according to one or more embodiments.

Turning now to FIG. 6D, an exemplary diagram of a simulated object with operational aids is illustrated, according to one or more embodiments. As shown in FIG. 6D, media interface 3040 can display where a headphone or headset connector 6310 can be plugged into a device associated with simulated object 3050 and/or can display where a USB (universal serial bus) connector 6320 can be plugged into a device associated with simulated object 3050. In one or more embodiments, a demonstration and/or simulation of coupling connectors to a device can be automated.

In one example, the customer can select "How to use headphones with your device" from a help menu. For instance, a media server can provide, to a media interface, data and/or information that includes a demonstration and/or simulation that demonstrates and/or simulates a process of coupling headphones with simulated object 3050. In another example, the customer can select "How to charge your device or connect your device to a PC or a Mac" from a help menu. For instance, a media server can provide, to a media interface, data and/or information that includes a demonstration and/or simulation that demonstrates and/or simulates a process of coupling simulated object 3050 with a computing device. For example, the demonstration and/or simulation can simulate a process of coupling simulated object 3050 with at least one of a PC, a Mac, and a charging device (e.g., a wall charger, a solar charger, etc.).

In one or more embodiments, a demonstration and/or simulation of connecting connectors to a device can instantiated and/or coordinated by a service representative via a CSD and/or a media server. For example, a service representative can be communicating with a customer, via telephone or via interactive communication interface 3060, and can provide control information, via one or more of CSD 1310, network 1010, and media server 1212, to interactive communication interface 3060 and/or an application associated with interactive communication interface 3060. For instance, the service representative can provide control information, via one or more of CSD 1310, network 1010, and media server 1212, to client interface 3020 and/or an application associated with client interface 3020, and media interface 3040 can display a demonstration of connecting headphone or headset connector 6310 and/or USB connector to a device associated with simulated object 3050.

In one or more embodiments, a simulated object can be an emulated object. For example, simulated object 3050 can be an emulation of a physical device. In one instance, simulated object 3050 can be an emulation of CD 2000. In another instance, simulated object 3050 can be an emulation of CD 2000, and CS 5210 can emulate CD 2000.

Figure 6E:
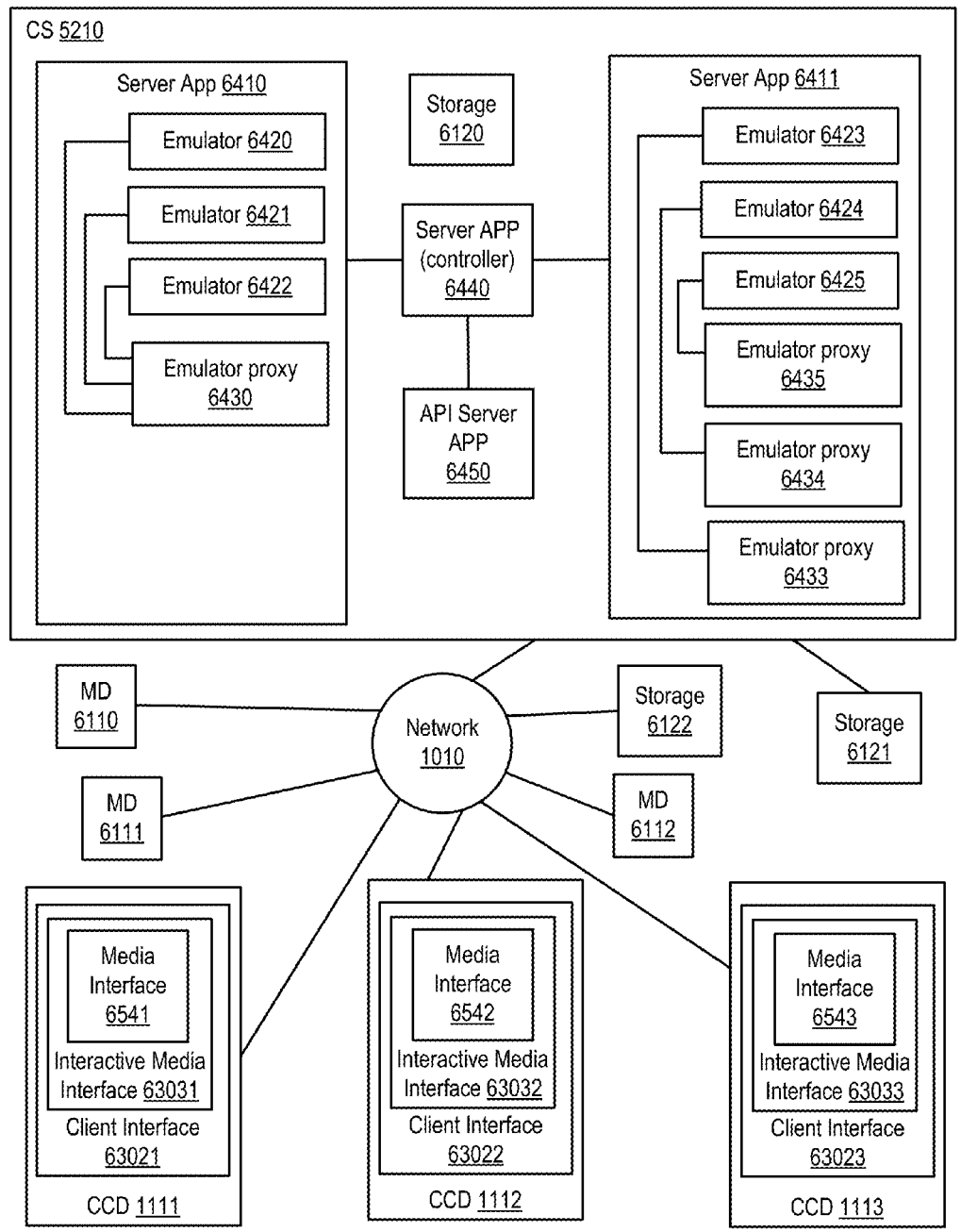
FIG. 6E illustrates an exemplary system that supports physical device emulation, according to one or more embodiments.

Turning now to FIG. 6E, an exemplary system that supports physical device emulation is illustrated, according to one or more embodiments. As shown, one or more of CCDs 1111-1113 can be coupled to CS 5210 via network 1010. In one or more embodiments, CS 5210 can include and/or execute one or more of a server app 6410, a server APP 6411, a server APP 6440, and an API (application programming interface) server APP 6450. As illustrated, API server APP 6450 can be coupled to server APP 6440, server APP 6440 can be coupled to server APP 6410, and server APP 6450 can be coupled to server APP 6411. In one or more embodiments, a first server APP can be coupled to a second server APP via one or more of a named pipe, an anonymous pipe, a pipe, a Unix domain socket, a network connection (e.g., a network socket connection such as at least one of TCP, UDP, and IP, among others), a D-Bus (Desktop Bus), an IPC (interprocess communication) (e.g., inter-thread communication, inter-application communication, etc.), a shared memory interface, message passing, a file, and a file system, among others.

As illustrated, server APP 6410 can include one or more of an emulator proxy 6430 and one or more of emulators 6420-6422, and one or more of emulators 6420-6422 can be coupled to emulator proxy 6430. As shown, server APP 6411 can include one or more of one or more emulator proxies 6433-6435 and one or more of emulators 6423-6425, and one or more of emulators 6423-6425 can be coupled to respective one or more emulator proxies 6433-6435. In one or more embodiments, one or more of emulators 6423-6425 can include one or more of the same, similar or different functionalities and/or structures described with reference to one or more emulators 6420-6422, and one or more of emulator proxies 6433-6435 can include one or more of the same, similar or different functionalities and/or structures described with reference to emulator proxy 6430.

In one or more embodiments, one or more of emulator proxy 6430 and one or more of emulators 6420-6422 can include or be one or more of a process, a task, an application, and a thread, among others; and an emulator of emulators 6420-6422 can be coupled to emulator proxy 6430 via one or more of a named pipe, an anonymous pipe, a pipe, an Unix domain socket, a network connection, a D-Bus, an IPC, a shared memory interface, message passing, a file, and a file system, among others.

As shown, one or more of CCDs 1111-1113 can include and/or execute respective one or more client interfaces 63021-63023, respective one or more interactive media interfaces 63031-63033, and/or respective one or more media interfaces 6541-6543. In one or more embodiments, one or more client interfaces 63021-63023 can include same or similar one or more functionalities described with reference to client interface 3020, one or more interactive media interfaces 63031-63033 can include same or similar one or more functionalities described with reference to interactive media interface 3030, and/or one or more media interfaces 6541-6543 can include same or similar one or more functionalities described with reference to media interface 3040.

As illustrated, one or more of mobile devices (MDs) 6110-6112 can be coupled to CS 5210 via network 1010. As shown, CS 5210 can include a storage 6120, can be coupled to a storage 6121, and/or can be coupled to a storage 6122 via network 1010. In one or more embodiments, one or more of storages 6120-6122 can include non-volatile storage and/or memory that can store configurations and/or data of one or more of MDs 6110-6112.

In one or more embodiments, CS 5210 and/or storages 6120-6122 can provide and/or implement one or more system for synchronizing and/or storing preferences, configuration(s), installed applications of a physical MD in a system independent format (e.g., the system can be used for multiple OS types and/or multiple platform types). In one example, one or more granular levels (e.g., storing and/or retrieving data for recovery may not require that a recovered system synchronize its data, information, and/or configuration with CS 5210 and/or storages 6120-6122) of data (e.g. data such as applications, contact list(s), photos, videos, ring tone(s), sound preference(s), etc.) can be stored and/or retrieved. For instance, an API can be provided and/or made available that can be utilized in storing and retrieving associated information and/or data of and/or associated with one or more physical mobile devices. In another example, multiple devices can be configured and/or recovered from CS 5210 and/or storages 6120-6122. In one instance, each of the multiple devices can be configured and/or recovered with respective associated data and/or configuration(s).

In another instance, multiple devices can be configured and/or recovered from CS 5210 and/or storages 6120-6122. For example, each of the multiple devices can be configured and/or recovered with same data and/or configuration(s). For instance, a company can issue multiple wireless telephones to a sales group, and each of the multiple wireless telephones can be configured with one or more of a contact list, sales presentations, and smart phone applications, among others, for the sales group.

Figure 6F:
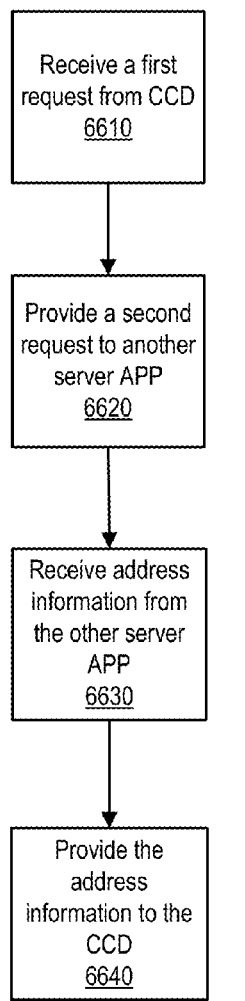
FIG. 6F provides an exemplary method of operating an application programming interface server application, according to one or more embodiments.

Turning now to FIG. 6F, an exemplary method of operating an API server APP is illustrated, according to one or more embodiments. At 6610, a first request from a CCD (e.g., a CCD of CCDs 1111-1113) can be received. For example, API server APP 6450 included in and/or executed by media server 1211 can receive, via network 1010, the first request from the CCD. In one instance, API server APP 6450 can receive, via network 1010, the first request from media interface 6541 included in and/or executed by CCD 1111. In a second instance, API server APP 6450 can receive, via network 1010, the first request from media interface 6542 included in and/or executed by CCD 1112. In another instance, API server APP 6450 can receive, via network 1010, the first request from an interactive media interface (e.g., an interactive media interface of interactive media interfaces 63031-63033) or a client interface (e.g., a client interface of client interfaces 63021-63023).

In one or more embodiments, the first request can include a request for connection information. For example, the first request can include a XMLHttpRequest (XHR) that includes the request for the connection information. At 6620, a second request can be provided to another server APP. For example, API server APP 6450 can provide the second request to server APP 6440.

In one or more embodiments, providing the second request to server APP 6440 can include initiating a remote procedure call (RPC) with server APP 6440. For example, providing the second request to server APP 6440 can include utilizing a RPC framework and/or a RPC functional library. For instance, providing the second request to server APP 6440 can include initiating a Thrift request with server APP 6440. In one or more embodiments, Thrift can include one or more a library (e.g., a software library) and one or more code generation tools that can be utilized to define data types and service interfaces in a language-neutral file and generate instructions (e.g., software executable by a processing system) that can be utilized in RPC clients and servers that are executable on respective computing devices.

At 6630, address information can be received. For example, API server APP 6450 can receive the address information from the other server APP (e.g., server APP 6440). In one or more embodiments, the address information from the other server can include one or more of an IP address, a port number (e.g., a TCP port number, a UDP port number, etc.), and audio proxy information, among others. In one example, one or more of the IP address and the port number can be utilized with a virtual network console (VNC) and/or a remote network console. In a second example, one or more of the IP address and the port number can be utilized with one or more of a remote desktop connection, an Apple remote desktop connection, and a remote X11 session or connection, among others. In another example, the audio proxy information can include information associated with a websocket proxy.

In one or more embodiments, a first computing device and a second computing device can communicate via a websocket API and/or protocol. In one example, the first computing device can provide, via a network, a first set of one or more TCP packets to a second computing device via the websocket API and/or protocol. For instance, providing the first set of one or more TCP packets to the second computing device can include providing, via HTTP or HTTPS, the first set of one or more TCP packets to the second computing device. In another example, the second computing device can provide, via the network, a second set of one or more TCP packets to the first computing device via the websocket API and/or protocol. For instance, providing the second set of one or more TCP packets to the second computing device can include providing, via HTTP or HTTPS, the second set of one or more TCP packets to the first computing device.

At 6640, the address information, received at 6630, can be provided to the CCD. For example, API server APP 6450 can provide the address information to the CCD. For instance, API server APP 6450 can provide a XHR object that includes the address information to the CCD. In one or more embodiments, the CCD can utilize the address information to communicate with emulator proxy 6430.

Figure 6G:
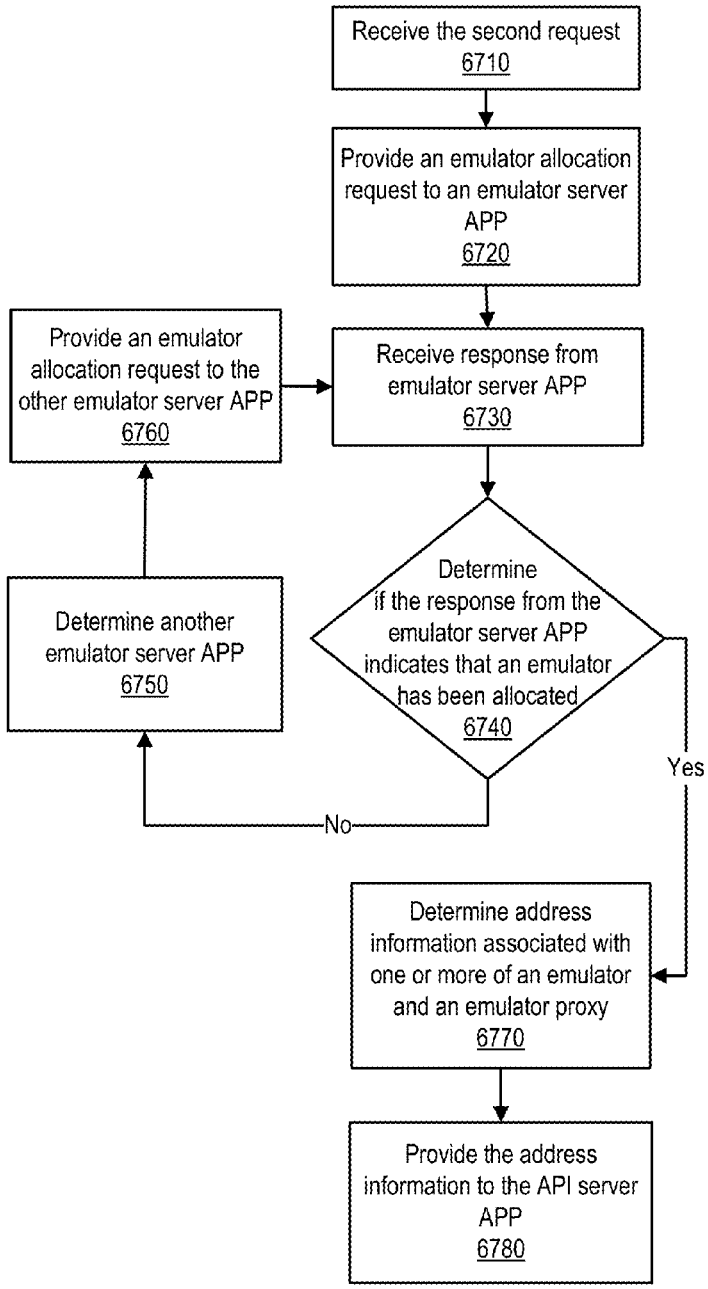
FIG. 6G provides an exemplary method of operating a server application, according to one or more embodiments.

Turning now to FIG. 6G, an exemplary method of operating a server APP is illustrated, according to one or more embodiments. In one or more embodiments, the method illustrated in FIG. 6G can be utilized in operating server APP 6440 or other server APPs that include same or similar one or more functionalities of server APP 6440. At 6710, the second request (e.g., provided at 6620) can be received. For example, server APP 6440, included in and/or executed by media server 1211, can receive the second request from API server APP 6450.

At 6720, an emulator allocation request can be provided to an emulator server APP. For example, server APP 6440 can provide an emulator allocation request to an emulation server APP 6410. At 6730, a response from the emulator server APP can be received. For example, server APP 6440 can receive, from emulator server APP 6410, a response to the emulator allocation request.

At 6740, it can be determined if the response from the emulator server APP indicates that an emulator has been allocated. For example, server APP 6440 can determine if the response from the emulator server APP indicates that an emulator has been allocated. If the response from the emulator server APP indicates that an emulator has not been allocated, another emulator server APP can be determined at 6750. For example, server APP 6440 can determine another emulator server APP (e.g., different from emulator server APP 6410 such as server APP 6411). At 6760, an emulator allocation request can be provided to the other emulator server APP, and the method can proceed to 6730. For example, server APP 6440 can provide an emulator allocation request to the other emulation server APP.

If the response from the emulator server APP indicates that an emulator has been allocated, address information associated with one or more of an emulator and an emulator proxy can be determined, at 6770. In one example, server APP 6440 can determine the information associated with one or more of the emulator and the emulator proxy from the response from the emulator server APP and/or based on the response from the emulator server APP.

In another example, server APP 6440 can receive additional information from the emulator server APP and can determine the information associated with one or more of the emulator and the emulator proxy from the additional information from the emulator server APP and/or based on the additional information from the emulator server APP. At 6780, the address information can be provided to the API server APP. For example, server APP 6440 can provide the address information associated with one or more of the emulator and the emulator proxy to API server APP 6450.

Figure 6H:
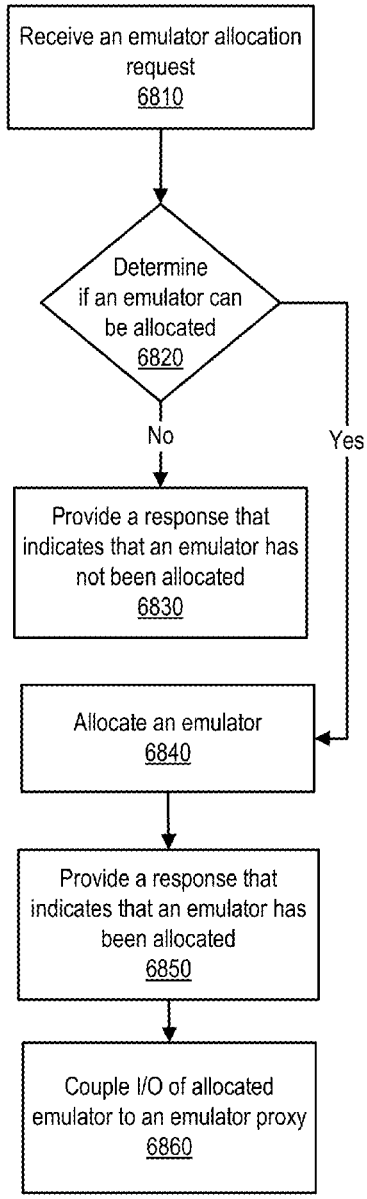
FIG. 6H provides an exemplary method of operating an emulator server application, according to one or more embodiments.

Turning now to FIG. 6H, an exemplary method of operating an emulator server APP is illustrated, according to one or more embodiments. At 6810, an emulator allocation request can be received. For example, server APP 6410 can receive an emulator allocation request from server APP 6440. At 6820, it can be determined if an emulator can be allocated. For example, server APP 6410 can determine if an emulator can be allocated. In one or more embodiments, determining if an emulator can be allocated can include determining one or more of an amount of memory is available, a thread can be allocated, a process can be allocated, a task can be allocated, a processing load is below a threshold, and an amount of bandwidth is below a threshold, among others. If an emulator is not allocated, a response that indicates that an emulator has not been allocated can be provided, at 6830. For example, server APP 6410 can provide, to server APP 6440, a response that indicates that an emulator has not been allocated.

If an emulator can be allocated, an emulator can be allocated, at 6840. For example, server APP 6410 can allocate an emulator. For instance, server APP 6410 can allocate an emulator such as an emulator of emulators 6420-6422. In one or more embodiments, allocating an emulator can include marking an emulator, from a pool of available emulators, as no longer available to be allocated by an allocation request and providing the marked emulator as available to a requestor.

In one or more embodiments, an emulator can emulate a data processing system. In one example, the emulated data processing system can include an emulated memory coupled to an emulated processor that executes instructions from an ISA (instruction set architecture) that can be stored in the emulated memory. In one instance, the emulated processor can execute instructions from at least one of an ARM ISA, a MIPS ISA, an x86 ISA, a PowerPC ISA, and a DSP (digital signal processing) ISA, among others.

In a second instance, the emulated memory can include at least one of emulated DRAM (dynamic random access memory), SRAM (static random access memory), FRAM (ferroelectric random access memory), FLASH memory (e.g., NAND FLASH memory), EEPROM (electrically erasable read only memory), EPROM (erasable programmable read only memory), PROM (programmable read only memory), and ROM (read only memory), among others. In a third instance, the emulated data processing system can include at least one emulated bus, coupled to the emulated processor, such as at least one emulated bus of an I²C (inter-integrated circuit) bus, an universal serial bus (USB), a serial peripheral interconnect (SPI) bus, a peripheral component interconnect (PCI) bus, a peripheral component interconnect express (PCIe), and an advanced high-performance bus (AHB), among others.

In another instance, one or more emulated devices and/or interfaces can be coupled to the emulated processor, such as one or more of an emulated wireless Ethernet interface (e.g., a WiFi interface), an Ethernet interface, a global positioning system (GPS) receiver device, a GSM (global system for mobile communications) interface, a CDMA (code division multiple access) interface, a WiMAX interface, a proximity sensing device, a Bluetooth interface, a ZigBEE interface, a magnetometer, an accelerometer, a pressure transducer, a humidity sensing device, a capacitive sensing touch device, a resistive sensing touch device, an electronic gyroscope, a gas sensing device, an image sensing device (e.g., a digital camera), a sound sensing device (e.g., a microphone), a sound output device (e.g., a speaker), a digital compass device, a temperature sensing device, a FM radio receiving device (e.g., tunable to one or more frequencies of 87.5 MHz-108 MHz, 76 MHz-90 MHz, 162.4 MHz-162.55 MHz, etc.), a FM radio transmitting device (e.g., tunable to one or more frequencies of 87.5 MHz-108 MHz, 76 MHz-90 MHz, etc.), a light sensing device, a proximity sensing device, a radio frequency identification (RFID) sensing device, a RFID transmitting device, a near field communication (NFC) device, and a range determining device, among others.

In another example, the emulated data processing system can include a data processing emulator such as QEMU, SPIM, VMware, VirtualBox, or Bochs, among others. In one instance, SPIM can emulate a processor that can execute instructions from a MIPS ISA. In a second instance, QEMU can emulate a processor that can execute instructions from an IA-32 (e.g., x86) ISA, a MIPS ISA, a SPARC ISA, an ARM ISA, and a PowerPC ISA, among others. In another instance, QEMU, SPIM, VMware, VirtualBox, or Bochs can emulate one or more a memory system, a bus, a device, and an interface, among others, coupled to an emulated processor. In one or more embodiments, an emulator (e.g., an emulator of emulators 6420-6422) can be or include a virtual machine.

In one or more embodiments, an emulator (e.g., an emulator of emulators 6420-6422) can emulate and/or simulate one or more of a physical wireless telephone, a physical personal audio device, a physical tablet computing device, and a physical MP3 player, among others, and the emulator can execute an operating system and/or platform. In one example, the emulator can execute a Linux operating system and/or platform. In a second example, the emulator can execute an Android operating system and/or platform. In a third example, the emulator can execute an iOS operating system and/or platform. In a fourth example, the emulator can execute a BSD (Berkeley Software Distribution) operating system and/or platform. In a fifth example, the emulator can execute a Windows CE operating system and/or platform. In sixth example, the emulator can execute a Windows Mobile operating system and/or platform. In another example, the emulator can execute a VxWorks operating system and/or platform.

In one or more embodiments, the emulator can execute a data generating thread, task, and/or process that can emulate, simulate, and/or provide an operating system and/or platform with data associated with one or more functionalities of an emulated device (e.g., a physical wireless telephone, a physical personal audio device, a physical tablet computing device, a physical MP3 player, etc.). In one example, the data generating thread and/or process can provide the operating system and/or platform with data that emulates and/or simulates an incoming telephone call.

In one instance, the data generating thread and/or process can provide the operating system and/or platform with data that emulates and/or simulates GSM data. In a second instance, the data generating thread and/or process can provide the operating system and/or platform with data that emulates and/or simulates CDMA data. In a third instance, the data generating thread and/or process can provide the operating system and/or platform with data that emulates and/or simulates GPS data. In fourth instance, the data generating thread and/or process can provide the operating system and/or platform with data that emulates and/or simulates frequency modulation (FM) data (e.g., sounds and/or text data carried via a FM carrier wave). In another instance, the data generating thread and/or process can provide the operating system and/or platform with data that emulates and/or simulates amplitude modulation (AM) data (e.g., sounds and/or text data carried via a AM carrier wave).

In a second example, the data generating thread and/or process can provide the operating system and/or platform with data that emulates and/or simulates short messaging system (SMS) data. For instance, the data generating thread and/or process can provide the operating system and/or platform with data that emulates and/or simulates a SMS text message. In a third example, the data generating thread and/or process can provide the operating system and/or platform with data that emulates and/or simulates user input data. In one instance, the data that emulates and/or simulates user input data can be generated in response to user input data from a service representative. In another instance, the data that emulates and/or simulates user input data can be generated in response to user input data from a customer via a CCD utilized by the customer.

At 6850, a response that indicates that an emulator has been allocated can be provided. For example, server APP 6410 can provide, to server APP 6440, a response that indicates that an emulator has been allocated. At 6860, input/output (I/O) of the allocated emulator can be coupled to an emulator proxy. For example, server APP 6410 can couple I/O of the allocated emulator to emulator proxy 6430. For instance, server APP 6410 can couple I/O of an emulator of emulators 6420-6422 to emulator proxy 6430.

In one or more embodiments, utilizing emulator proxy 6430 can prohibit direct access of one or more clients (e.g., one or more of CCDs 1111-1113) to one or more emulators (e.g., one or more of emulators 6420-6422). For example, prohibiting direct access of one or more clients to one or more emulators can include providing and/or implementing access control. In one instance, providing and/or implementing access control can include limiting a number of ports (e.g., TCP ports, UDP ports, etc.) of one or more emulators that one or more clients can access. In another instance, providing and/or implementing access control can include limiting an amount of time that one or more clients can access one or more emulators and/or can include timing out one or more communication couplings after an amount of time transpires without communication activity and/or data.

In one or more embodiments, utilizing emulator proxy 6430 can bridge access of one or more clients (e.g., one or more of CCDs 1111-1113) utilizing a first communication protocol to one or more emulators (e.g., one or more of emulators 6420-6422) utilizing a second communication protocol. For example, the first communication protocol (e.g., a websocket protocol) can be different from the second communication protocol (e.g., a transmission control protocol). For instance, bridging access of one or more clients utilizing the first communication protocol to one or more emulators utilizing the second communication protocol can include translating and/or transforming data of the first communication protocol into data of the second communication protocol and/or can include translating and/or transforming data of the second communication protocol into data of the first communication protocol.

In one or more embodiments, I/O of an emulator can include video output. For example, the video output can include output that would be displayed on a screen of a device (e.g., a wireless telephone, a personal audio device, a tablet computing device, a MP3 player, etc.), and the video output can be provided to a client (e.g., a CCD of CCDs 1111-1113). For instance, providing the video output to the client can include providing the video output to the client via emulator proxy 6430 and/or network 1010. In an example, the I/O of an emulator can be implemented via a VNC protocol and/or interface. In one instance, the emulator can provide video output to the client via the VNC protocol and/or interface. In another instance, an operating system and/or kernel executing on the emulator can provide video output to the client via the VNC protocol and/or interface.

In one or more embodiments, I/O of an emulator can include audio output. For example, the audio output can include sounds that would be produced and/or reproduced via a device (e.g., a wireless telephone, a personal audio device, a tablet computing device, a MP3 player, etc.), and the audio output can be provided to a client (e.g., a CCD of CCDs 1111-1113). For instance, providing the audio output to the client can include providing the audio output to the client via emulator proxy 6430 and/or network 1010. In an example, the I/O of an emulator can be implemented via a websocket protocol and/or interface.

In one or more embodiments, the audio output can include one or more of pulse width modulation data, pulse code modulation data, raw audio data, WAV audio data, AIFF audio data, AAC audio data, MPEG audio data, OGG audio data, Real Audio audio data, and WMA audio data, among others. In one example, the emulator can provide audio output to the client via the websocket protocol and/or interface. In another example, an operating system and/or kernel executing on the emulator can provide audio output to the client via the websocket protocol and/or interface.

In one or more embodiments, the method illustrated in FIG. 6H can be utilized by multiple emulators. In one example, two or more different emulators can emulate a same physical mobile device. In another example, two or more different emulators can emulate different respective physical mobile devices, and the two or more emulators emulating different respective physical mobile devices can perform differently in accordance with functionalities, devices, and/or structures associated with the different respective physical mobile devices.

In one or more embodiments, a first emulator can emulate a first physical device, and a second, different, emulator can emulate a second, different, physical device. For example, a first emulated mobile device, emulated via the first emulator, that corresponds to a first physical mobile device that can include a first physical processor, a first physical memory, and a first physical integrated circuit can be different from a second emulated mobile device, emulated via the second emulator, that corresponds to a second physical mobile device that can include a second physical processor, a second physical memory and a second physical integrated circuit, where at least one of the first physical processor, the first physical memory, and the first physical integrated circuit is different from a corresponding one of the second physical processor, the second physical memory and the second physical integrated circuit.

In one instance, the first physical integrated circuit can include one or more of a WiFi device (e.g., a WiFi interface), WiMAX device (e.g., a WiMAX interface), a GPS device, a GSM device (e.g., a GSM interface), a CDMA device (e.g., a CDMA interface), a satellite telephone network interface, a Bluetooth device (e.g., a Bluetooth interface), a ZigBEE device (e.g., a ZigBEE interface), a GPS device, an Ethernet device (e.g., an Ethernet interface), a proximity sensing device, a magnetometer, an accelerometer, a pressure transducer, a humidity sensing device, a capacitive sensing touch device, a resistive sensing touch device, an electronic gyroscope, a gas sensing device, an image sensing device (e.g., a digital camera), a sound output device, a sound sensing device (e.g., a microphone), a digital compass device, a temperature sensing device, a FM radio receiving device, a FM radio transmitting device, a light sensing device, a RFID sensing device, a RFID transmitting device, a NFC device, and a range determining device, among others. In a second instance, the first emulator can emulate an iPhone 4 that includes an Apple A4 processor, and the second emulator can emulate an iPhone 4S that includes an Apple A5 processor.

In third instance, the first emulator can emulate a first wireless telephone that includes a CDMA wireless telephone network interface, and the second emulator can emulate a wireless telephone that includes a GSM wireless telephone network interface. In fourth instance, the first emulator can emulate a first wireless telephone that includes a cellular wireless telephone network interface, and the second emulator can emulate a second wireless telephone that includes a satellite wireless telephone network interface. In a fifth instance, the first emulator can emulate a first wireless telephone that includes a first integrated circuit, and the second emulator can emulate a second wireless telephone that includes a second integrated circuit that is different from the first integrated circuit. In a sixth instance, the first emulator can emulate a first wireless telephone that includes a Trimble GPS device, and the second emulator can emulate a wireless telephone that includes a ublox GPS device. In another instance, the first emulator can emulate a first physical device that includes an integrated circuit (e.g., an audio integrated circuit, a graphics processing unit, a GPS integrated circuit, etc.), and the second emulator can emulate a second physical device that does not includes the integrated circuit.

Figure 6J:
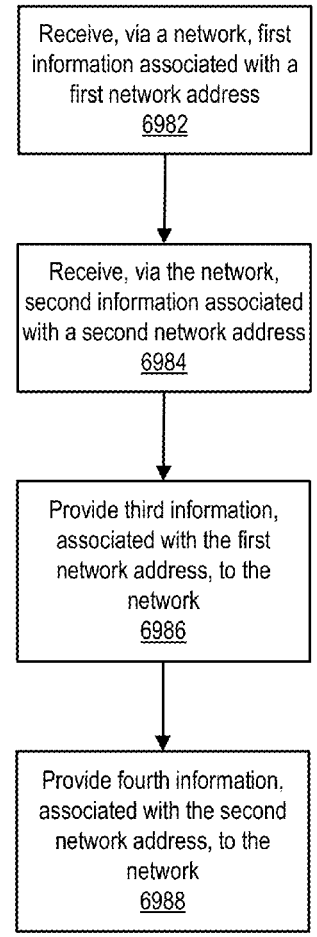
FIG. 6J provides an exemplary method of providing multiple simulated objects to multiple customer computing devices, according to one or more embodiments.
Figure 6I:
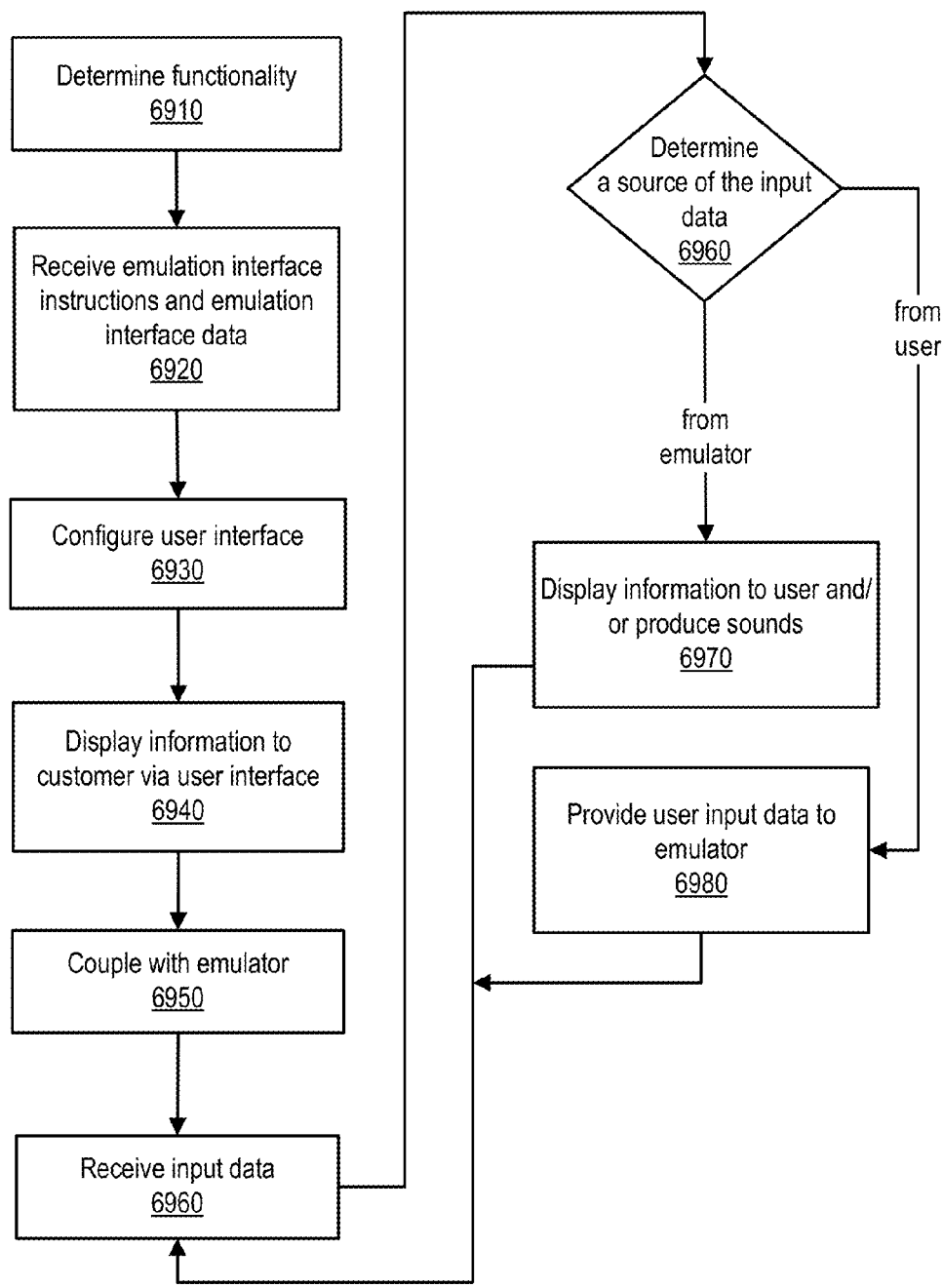
FIG. 6I provides an exemplary method of operating a client that can interact with an emulator, according to one or more embodiments.

Turning now to FIG. 6I, an exemplary method of operating a client that can interact with an emulator is illustrated, according to one or more embodiments. At 6910, functionality can be determined. For example, functionality of a client device for providing the GUI can be determined. For instance, functionality of a client interface can be determined via a scripting functionality. In one or more embodiments, the client interface can implement a media interface (e.g., a media interface of media interfaces 6540-6542). For example, the client interface can include a web browser, and functionality of the web browser can be determined. For instance, functionality of the web browser can include one or more of a scripting functionality, a plug-in functionality, a virtual machine functionality, and a markup language functionality, among others. In one or more embodiments, determining functionality can include determining a version of a functionality.

At 6920, emulation interface instructions and data can be received. For example, the client interface and/or a media interface can receive the emulation interface instructions and the emulation interface data from a media server via network 1010. For example, the client interface can include a web browser, and the web browser can receive the emulation interface instructions and the emulation interface data.

In one or more embodiments, the emulation interface instructions can include one or more of a script, executable byte code, and executable code for a plugin, among others. In one example, the emulation interface instructions can include the script that can be in accordance with a scripting language such as JavaScript, EMCAScript, Ruby, Python, or Lua, among others. In a second example, the executable byte code can be in accordance with one or more of Ruby byte code, Python byte code, Lua byte code, Ruby byte code, and Java byte code, among others. For instance, the byte code can be executed by a virtual machine. In another example, the executable code for a plugin can include Adobe Flash executable code, Java executable code, Ruby executable code, and Lua executable code, among others. In one or more embodiments, the emulation interface data can include one or more of a graphic and data of a markup language. For example, the markup language can include one or more of HTML and XML, among others.

At 6930, a user interface can be configured. For example, a media interface (e.g., a media interface of media interfaces 6540-6542) can be configured based on the emulation interface instructions (e.g., instructions associated with a scripting language such as JavaScript, EMCAScript, Ruby, Python, Lua, etc. and/or instructions associated with Ruby byte code, Python byte code, Lua byte code, Java byte code, etc.) and/or the emulation interface data (e.g., HTML data, XML data, etc.).

At 6940, information can be displayed to the customer via the user interface. For example, a media interface (e.g., a media interface of media interfaces 6540-6542) can display the information to the customer based on the emulation interface instructions and/or the emulation interface data. At 6950, the user interface (e.g., a media interface) can couple with an emulator (e.g., an emulator of emulators 6420-6422). For example, a media interface can couple with an emulator via network 1010 and/or emulator proxy 6430.

At 6960, input data can be received. In one example, a media interface can receive the input data from an emulator. For instance, the media interface can receive the input data from the emulator via network 1010 and/or emulator proxy 6430. In another example, the media interface can receive the input data from a customer (e.g., user input data). In one or more embodiments, input from the customer can include one or more of a selection of a graphic, a selection of an icon, a selection of a key (e.g., a key from a keypad, a key from a keyboard, etc.), visual input (e.g., one or more images from a camera coupled to a CCD), and sound input (e.g., one or more sounds from a microphone coupled to a CCD), among others.

At 6960, a source of the input data can be determined. If the source of the data is determined to be from the emulator, information can be displayed and/or sounds can be produced for the user (e.g., customer) via the media interface and/or a sound output device of a CCD, at 6970. In one or more embodiments, the method can proceed to 6960, where further information can be received. If the source of the data is determined to be from the user, the user input data can be provided to the emulator, at 6980. For example, the user input data can be provided to the emulator via network 1010 and/or emulator proxy 6430. In one or more embodiments, the method can proceed to 6960, where further information can be received.

Turning now to FIG. 6J, an exemplary method of providing multiple simulated objects to multiple CCDs is illustrated, according to one or more embodiments. At 6982, first information, associated with a first network address, can be received via a network. For example, the first information can be received from a first CCD (e.g., CCD 1110). At 6984, second information, associated with a second network address, can be received via the network. For example, the second information can be received from a second CCD (e.g., CCD 1111). In one or more embodiments, at least one of the first information and the second information can include a request for a simulated object and/or a request to interact with a simulated object.

At 6986, third information, associated with the first network address, can be provided to the network. For example, the third information can be addressed to the first network address (e.g., associated with the first CCD). In one or more embodiments, the third information can include first data utilizable, by a first client interface associated with the first CCD, to display a three-dimensional simulation of a first simulated object and/or to change a viewing angle of the first simulated object.

At 6988, fourth information, associated with the second network address, can be provided to the network. For example, the fourth information can be addressed to the second network address (e.g., associated with the second CCD). In one or more embodiments, the fourth information can include second data utilizable, by a second client interface associated with the second CCD, to display a three-dimensional simulation of a first simulated object and/or to change a viewing angle of the first simulated object.

Figure 7A:
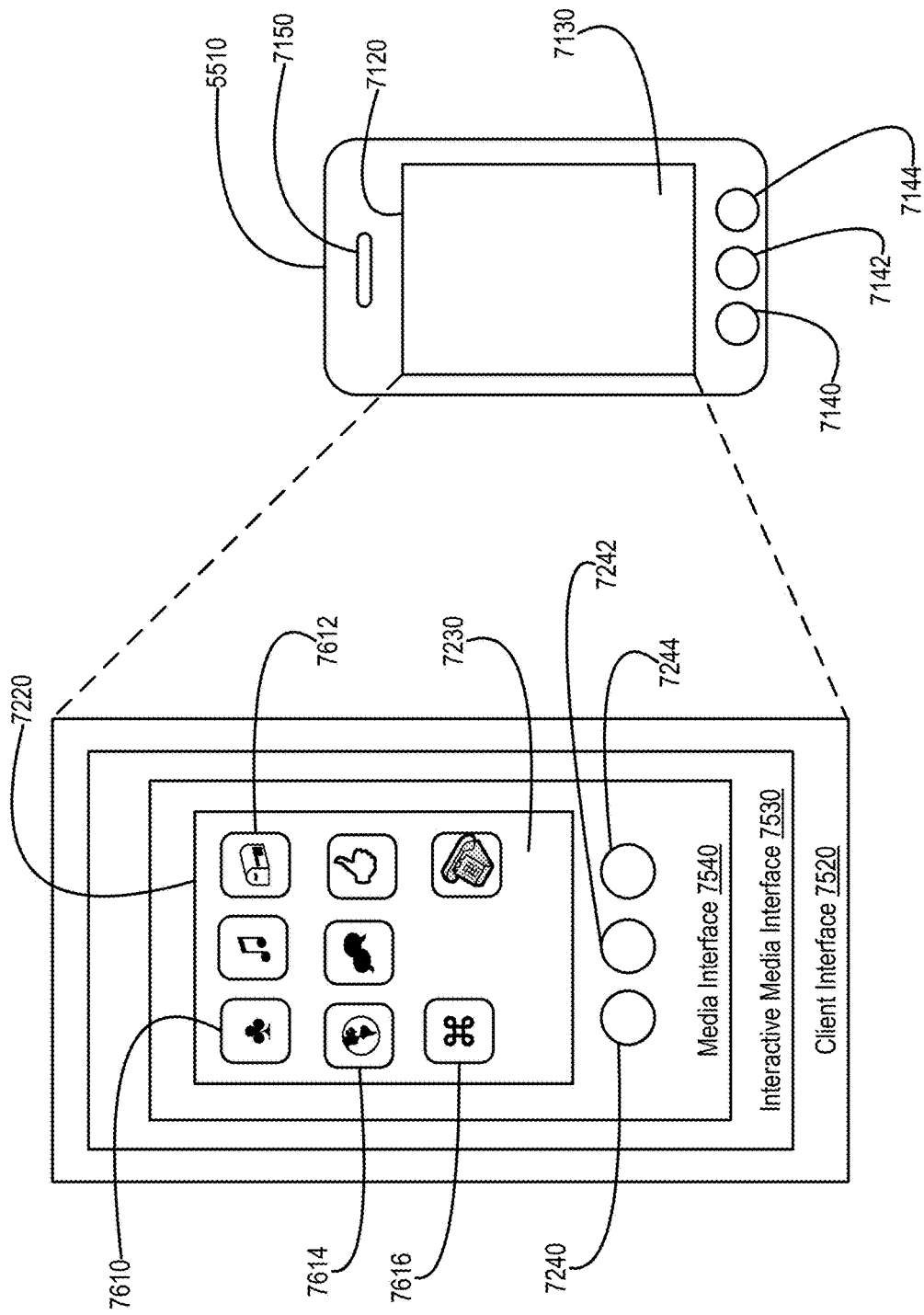
FIG. 7A illustrates an exemplary mobile device that emulates a physical device, according to one or more embodiments.

Turning now to FIG. 7A, a mobile device that emulates a physical device is illustrated, according to one or more embodiments. As shown, mobile device 5510 can include a display 7120, a touch screen 7130, a sound output device 7150 (e.g., a speaker), and one or more buttons 7140-7144. Mobile device 5510 can also include a sound input device (e.g., a microphone), which is not shown. In one or more embodiments, MD 5510 can include one or more structures and/or one or more functionalities described with reference to one or more mobile devices, one or more computer systems, and/or one or more computing devices described herein.

As illustrated, display 7120 can display a client interface 7520 that can include an interactive media interface 7530 that can include a media interface 7540. In one or more embodiments, client interface 7520, media interface 7530, and media interface 7540 can include one or more structures and/or functionalities of client interface 3020, media interface 3030, and media interface 3040, respectively. As shown, media interface 7540 can display one or more icons/buttons 7610-7616, one or more of icons/buttons 7240-7244, emulated display 7220, and/or emulated touch screen 7230, among others. In one or more embodiments, MD 5510 can include one or more structures and/or functionalities as those described with reference to a CD 7811, illustrated in FIGS. 7C and 7D.

In one or more embodiments, client interface 7520 can provide interactivity between a user and an emulated mobile device. For example, client interface 7520 can provide interactivity between user 5010 and an emulated mobile device emulated via emulator 6422. For instance, emulator 6422 can be configured with CFG 5310 that can produce and/or implement an emulated device (ED) 7836 (illustrated in FIGS. 7C and 7D), emulated via physical MD 5510. In one or more embodiments, CFG 5310 can include one or more of emulator 6422 and MDD 7838. In one example, receiving CFG 5310, as illustrated in FIG. 5H, can include receiving emulator 6422 and/or ED 7836. In another example, receiving CFG 5310, as illustrated in FIG. 5H, can include receiving MDD 7838 and/or ED 7836.

With reference again to FIG. 7A, MD 5510 can host an emulated device in a seamless fashion, according to one or more embodiments. For example, one or more of virtual display 7220, virtual touch screen 7230, and virtual buttons 7240-7244 can be mapped to respective physical one or more of display 7120, touch screen 7130, and buttons 7140-7144.

In one or more embodiments, user input can halt the emulated device and/or return control to physical MD 5510. For example, the user can select a button, a combination of buttons, and/or an icon to halt the emulated device and/or return control to physical MD 5510. In one instance, the user can concurrently actuate buttons 7140 and 7144 to halt the emulated device and/or return control to physical MD 5510. In a second instance, the user can concurrently actuate button 7144 and select icon 7616 to halt the emulated device and/or return control to physical MD 5510. In another instance, the user can select icon 7616 to halt the emulated device and/or return control to physical MD 5510.

In one or more embodiments, returning control to a physical MD can include returning control and/or focus to an OS and/or APP of the physical MD. In one example, returning control to physical MD 5310 can include returning control and/or focus to OS 7835 (illustrated in FIGS. 7C and 7D). In another example, returning control to physical MD 5310 can include returning control and/or focus to APP 7832 (illustrated in FIGS. 7C and 7D).

Figure 7B:
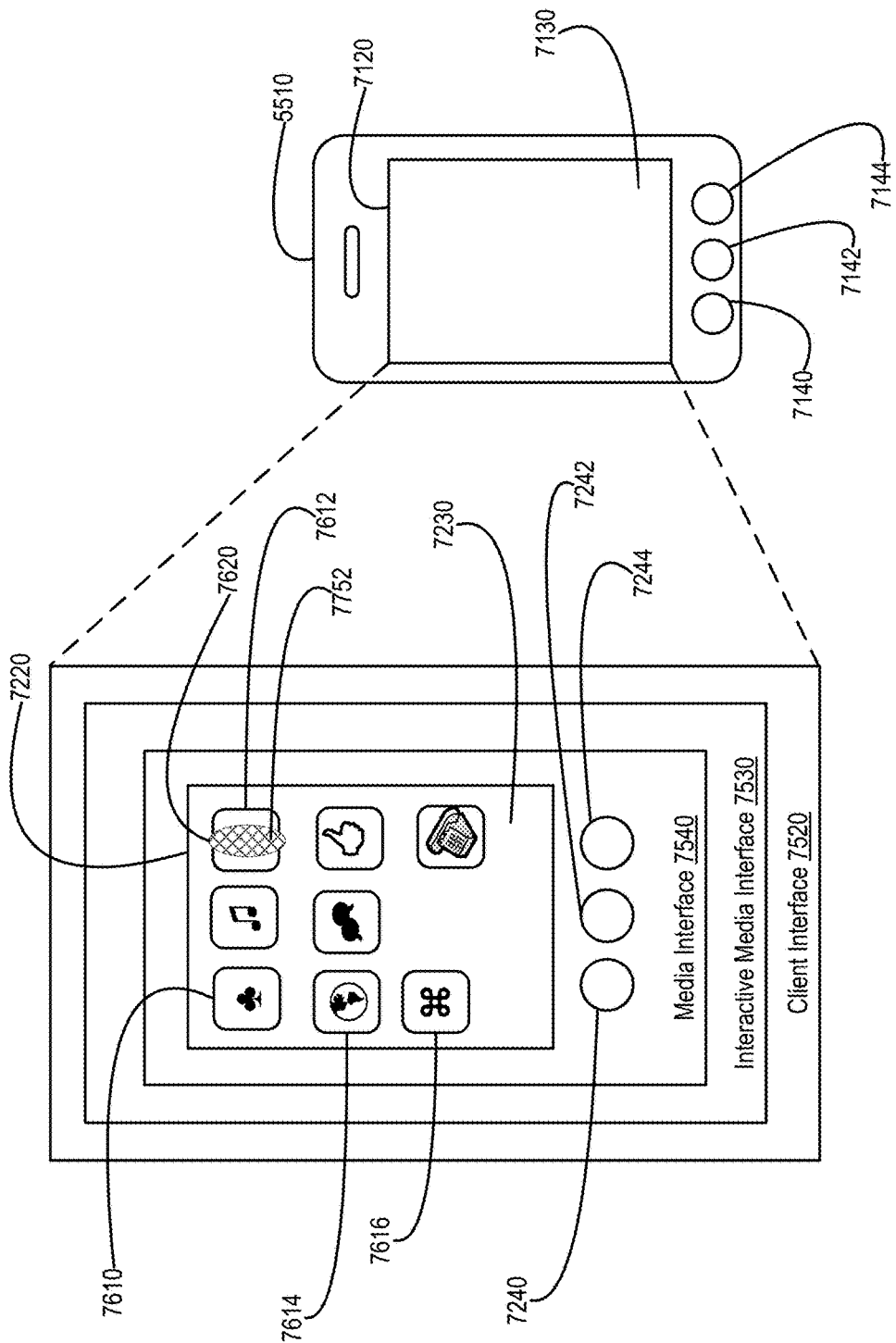
FIG. 7B illustrates an exemplary mobile device that emulates a physical device, where a transparent layer with a beacon over a user interface directs user input, according to one or more embodiments.

Turning now to FIG. 7B, an exemplary illustration of a walk-through of an emulated device is provided, according to one or more embodiments. As shown, a beacon 7620 can be utilized to highlight and/or signal an intended action and/or a motion of the user interaction with the emulated device. For instance, beacon 7620 can be utilized within a transparent layer to highlight and/or signal an intended action and/or a motion of the user interaction with the emulated device. In one or more embodiments, beacon 7620 can be utilized with an application-based tutorial, set-up, and/or walk-through, described herein, that can walk/step a user through steps to use an APP of an emulated device (e.g., ED 7836). For example, ED 7836 can emulate CD 2000.

Figure 7C:
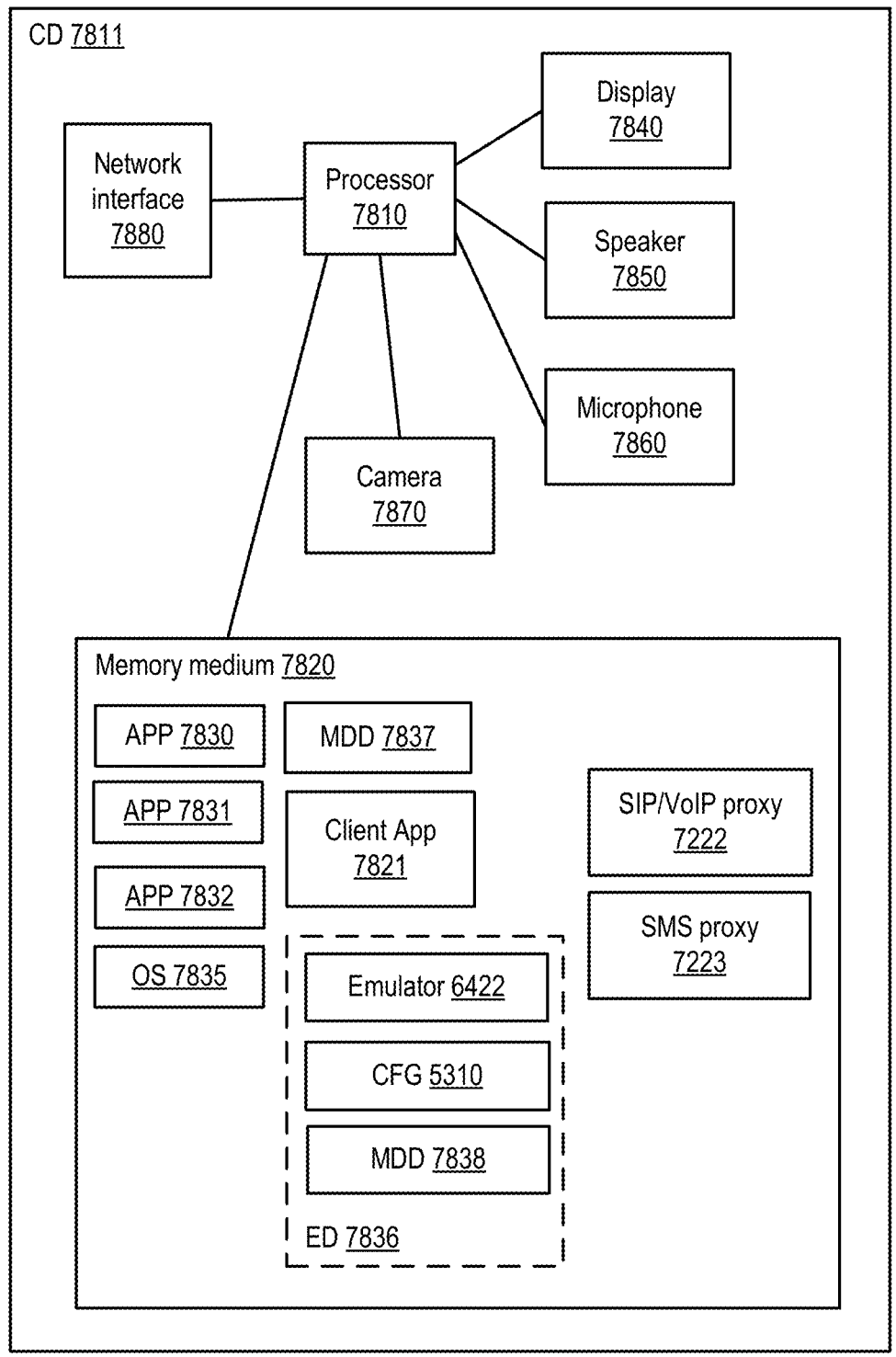
FIGS. 7C and 7D provide exemplary diagrams of a computing device, according to one or more embodiments.

Turning now to FIG. 7C, an exemplary computing device is illustrated, according to one or more embodiments. As shown, CD 7811 can include a processor 7810 coupled to a memory medium 7820. In one or more embodiments, memory medium 7820 can store data and/or instructions that can be executed by processor 7810. For example, memory medium 7820 can store one or more APPs 7830-7832, an OS 7835, mobile device data (MDD) 7837, MDD 7838, client app 7821, emulator 6422, CFG 5310, SIP/VoIP proxy 7222, and/or SMS proxy 7223. For instance, one or more of APPs 7830-7832, OS 7835, client app 7821, emulator 6422, SIP/VoIP proxy 7222, and SMS proxy 7223 can include instructions of an ISA associated with processor 7810. In one or more embodiments, one or more of the processes and/or methods described here can be implemented when processor 7810 executes one or more of APPs 7830-7832, OS 7835, client app 7821, emulator 6422, SIP/VoIP proxy 7222, and SMS proxy 7223. In one or more embodiments, one or more of SIP/VoIP proxy 7222 and SMS proxy 7223 can include one or more structures and/or functionalities as those described with reference to respective one or more of SIP/VoIP proxy 23210 and SMS proxy 23220, illustrated in FIG. 23.

In one or more embodiments, a client app 7821 coupled to emulator 6422. For example, client app 7821 and emulator 6422 can communicate via one or more processes and/or methods described herein. In one or more embodiments, client app 7821 can be or include client interface 7520 (illustrated in FIGS. 7A and 7B). For example, a user of local MD 5510 (implementing and/or including one or more structures and/or functionalities of CD 7811) can control and/or utilize emulator as a telephone via one or more of client interface 7520, interactive media interface 7530, and media interface 7540. In one or more embodiments, one or more interactions with emulator 6422 can be conducted via a web browser interfacing with a web server of emulator 6422.

In one or more embodiments, MDD can include data and/or configuration data associated with a MD. In one example, the MDD can include one or more sound recordings (e.g., MP3 songs, musical pieces, voice memos, conversations, lectures, etc.), one or more contacts (e.g., contact information associated with people, places, companies, etc.), one or more bookmarks (e.g., web browser book marks), one or more ebooks, one or more social networking sites' respective information (e.g., Facebook information, Twitter information, MySpace information, Foursquare information, Last.fm information, Google+ information, etc.) associated with a user of the MD, one or more mobile device apps (e.g., smart phone apps, tablet computer apps, music player apps, etc.), and/or one or more configurations of the MD associated with the MDD, among others.

As illustrated, CD 7811 can include a display 7840 coupled to processor 7810. In one or more embodiments, display 7840 can be utilized to display one or more of graphics and/or videos to a user. As shown, CD 7811 can include a network interface 7880. In one example, network interface 7880 can interface with a wired network coupling, such as a wired Ethernet, a T-1, a DSL modem, a PSTN, or a cable modem, among others. In another example, network interface 7880 can interface with a wireless network coupling, such as a satellite telephone system, a cellular telephone system, WiMax, WiFi, or wireless Ethernet, among others.

As shown, CD 7811 can include a speaker 7850 coupled to processor 7810. In one or more embodiments, speaker 7850 can output one or more sounds that can be received, aurally, by a user of CD 7811. In one or more embodiments, speaker 7850 can be coupled to processor 7810 via a digital to analog converter (DAC). For example, the DAC can receive digital signals from processor 7850 and transform the digital signals to analog signals.

As illustrated, CD 7811 can include a microphone 7860 coupled to processor 7810. In one or more embodiments, microphone 7860 can receive audio signals and can transform the audio signals into one or more voltage signals, one or more current signal, and/or one or more digital signals that can be utilized by processor 7810. For example, an analog to digital converter (ADC) can be utilized to transform the one or more voltage signals and/or the one or more current signal into the one or more digital signals that can be utilized by processor 7810. In one or more embodiments, the ADC can interpose processor 7810 and microphone 7860 such that microphone 7860 is coupled to processor 7810 via the ADC.

As shown, CD 7811 can include a camera 7870 coupled to processor 7810. In one or more embodiments, camera 7870 can include one or more image and/or light sensors that can transform received light signals into one or more digital signals that can be utilized by processor 7810. In one or more embodiments, CD 7811 can be coupled to and/or include one or more of a keyboard and a pointing device (e.g., a mouse, a track ball, a track pad, a stylus, etc.). In one or more embodiments, a touch screen can function as a pointing device. In one example, the touch screen can determine a position via one or more pressure sensors. In another example, the touch screen can determine a position via one or more capacitive sensors.

Figure 7D:
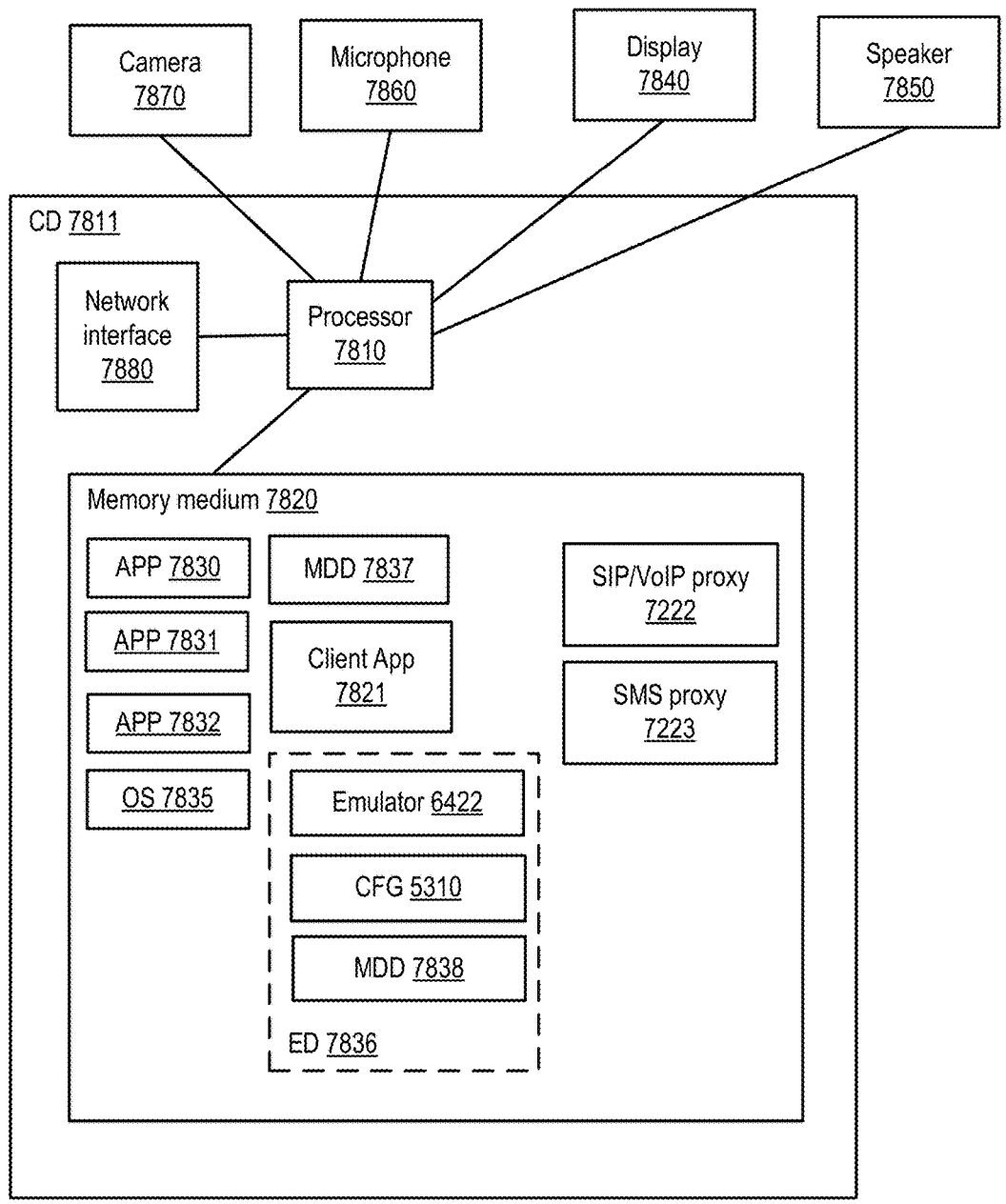

In one or more embodiments, one or more elements of CD 7811 can be external to CD 7811. For example, as illustrated in FIG. 7D, one or more of display 7840, speaker 7850, microphone 7860, and camera 7870 can be external to CD 7811. In one instance, one or more of display 7840, speaker 7850, microphone 7860, and camera 7870 can be coupled to CD 7811 in a wired fashion. In another instance, one or more of display 7840, speaker 7850, microphone 7860, and camera 7870 can be coupled to CD 7811 in a wireless fashion.

Figure 8:
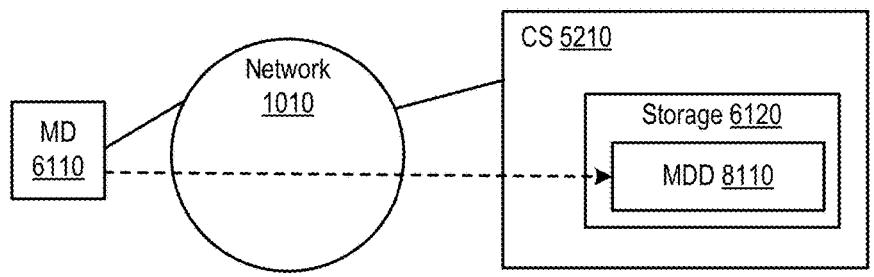
FIGS. 8-10 illustrate exemplary network systems that supports storage of data and configurations of physical mobile devices, according to one or more embodiments.
Figure 9:
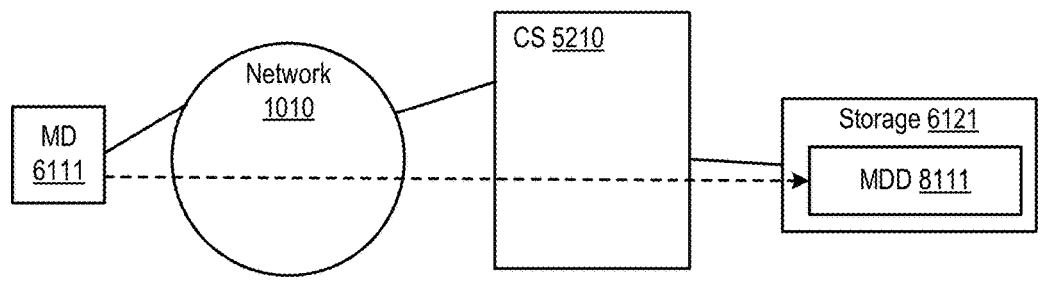
Figure 10:
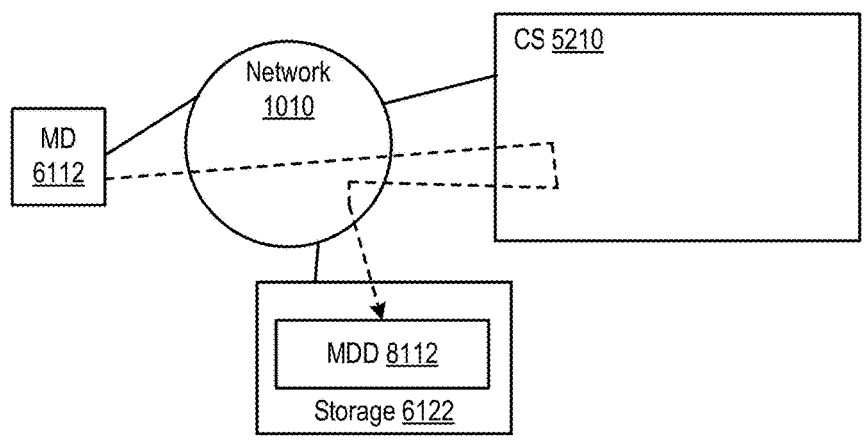

Turning now to FIGS. 8-10, exemplary network systems that supports storage of data and configurations of physical mobile devices are illustrated, according to one or more embodiments. As shown in FIG. 8, MDD 8110 associated with MD 6110 can be stored via storage 6120 that can be included in CS 5210. In one or more embodiments, MDD can include data and/or configuration data associated with a MD. In one example, the MDD can include one or more sound recordings (e.g., MP3 songs, musical pieces, voice memos, conversations, lectures, etc.), one or more contacts (e.g., contact information associated with people, places, companies, etc.), one or more bookmarks (e.g., web browser book marks), one or more ebooks, one or more social networking sites' respective information (e.g., Facebook information, Twitter information, MySpace information, Foursquare information, Last.fm information, Google+ information, etc.) associated with a user of the MD, one or more mobile device apps (e.g., smart phone apps, tablet computer apps, music player apps, etc.), and/or one or more configurations of the MD associated with the MDD, among others. As illustrated, in FIG. 9, MDD 8111 associated with MD 6111 can be stored via storage 6121 that can be coupled to CS 5210. As shown in FIG. 10, MDD 8111 associated with MD 6112 can be stored via storage 6122 that can be coupled to network 1010.

In one or more embodiments, a MD can include executable instructions (e.g., an application, a utility, an operating system, a portion of an operating system, etc.) that, when the executable instructions are executed by a processor of the MD, the MD can synchronize, backup, restore, and/or initialize MDD associated with the MD. In one example, the MD can synchronize and/or backup MDD associated with the MD via a wired or wireless coupling to a local system (e.g., a local computer system, a personal computer, a laptop computer system, a local office computer system, etc.) and/or via network 1010 to a remote system such as CS 5210 and/or storages 6120-6122, a distributed computer system, and/or a cloud-based system. In one example, the MD can incrementally synchronize changes in the MDD. For instance, one or more synchronization updates can utilize one or more portions of the MDD and/or may not require a full and/or complete duplication of the MDD.

In one or more embodiments, the MDD can include information associated with one or more states of the MD associated with the MD. In one example, the MD can receive the MDD from CS 5210 and restore the MD to one or more states, based on the MDD. In another example, the MD can receive the MDD from CS 5210 and can perform a "fresh" install, even if the MDD indicates a particular state or if the MD is in a particular state. In one or more embodiments, the MD can receive user input that indicates one or more selected items to restore which can be in addition to what is present and/or to overwrite existing properties/data.

Figure 11:
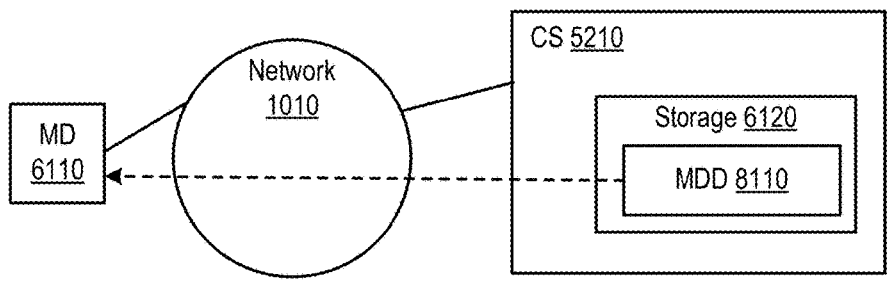
FIGS. 11-13 illustrate exemplary network systems that support recovery and/or restoration of data and configurations of physical mobile devices, according to one or more embodiments.
Figure 12:
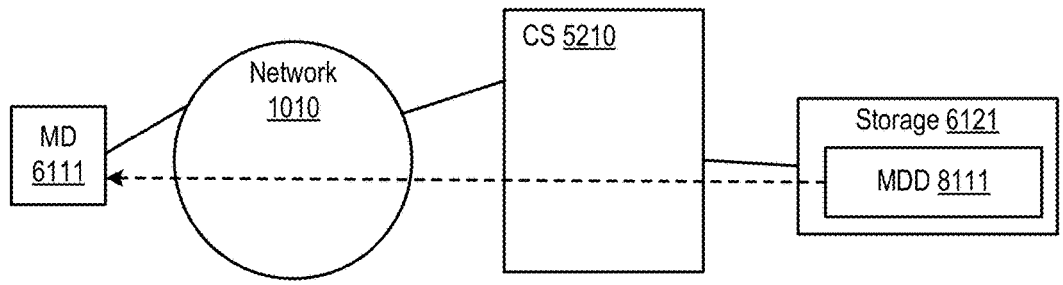
Figure 13:
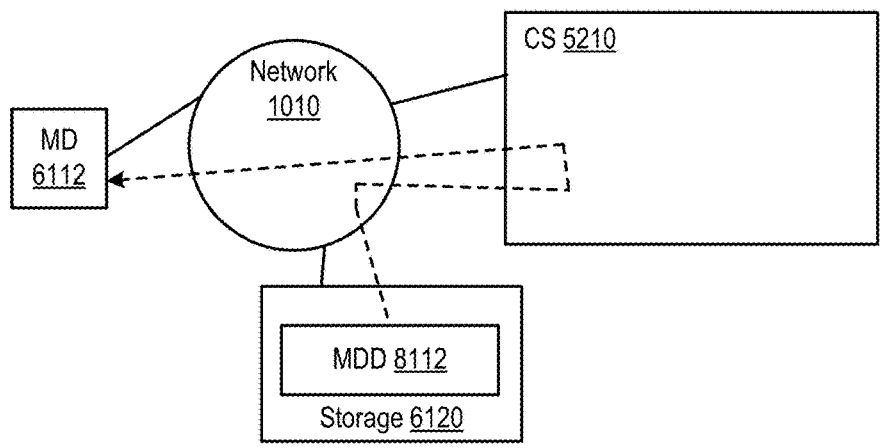

Turning now to FIGS. 11-13, exemplary network systems that support recovery and/or restoration of data and configurations of physical mobile devices are illustrated, according to one or more embodiments. As shown in FIG. 11, MDD 8110 can be restored to MD 6110. As illustrated in FIG. 12, MDD 8111 can be restored to MD 6111. As shown in FIG. 13, MDD 8112 can be restored to MD 6112.

In one or more embodiments, recovery and/or restoration of MDD associated with a first MD or recovery and/or restoration of one or more portions of the MDD associated with the first MD can be utilized with the first MD or can be utilized with a second MD, different from the first MD. In one example, the first MD can be physically different from the second MD. For instance, the first MD can include a first processor, a first memory, and a first integrated circuit; the second MD a second processor, a second memory, and a second integrated circuit; and at least one of the first processor, the first memory, and the first integrated circuit can be different from a respective one of the second processor, the second memory, and the second integrated circuit.

In another example, the first MD can execute an operating system and/or platform different from the second MD. For instance, the first MD can execute a first operating system and/or a first platform, and the second MD can execute a second operating system and/or a second platform, where at least one of the first operating system and the first platform can be different from a respective one of the second operating system and the second platform. In one or more embodiments, this can allow recovery and/or restoration of MDD onto the second MD that did not perform backup and/or synchronization methods and/or processes.

In one or more embodiments, one or more portions of the MDD may not be applicable to the second MD. For example, the first MD can execute an Android operating system and/or platform, the second MD can execute Windows Mobile operating system and/or platform, and one or more applications (e.g., smart phone apps) may not be applicable to the second MD.

In one or more embodiments, one or more portions of the MDD (synchronized and/or backed up via the first MD) can be transformed, altered, converted, translated, adapted, adjusted, changed, modified, and/or adapted, among others, such that the one or more portions of the MDD can be utilized by the second MD. For example, a contact list can be included in the MDD, the contact list can be stored and/or indexed in a format that is associated with an Android operating system and/or platform, and the contact list can be transformed, altered, converted, translated, adapted, adjusted, changed, modified, and/or adapted, among others, such that the Windows Mobile operating system and/or platform of the second MD can utilize information from the contact list.

Figure 14:
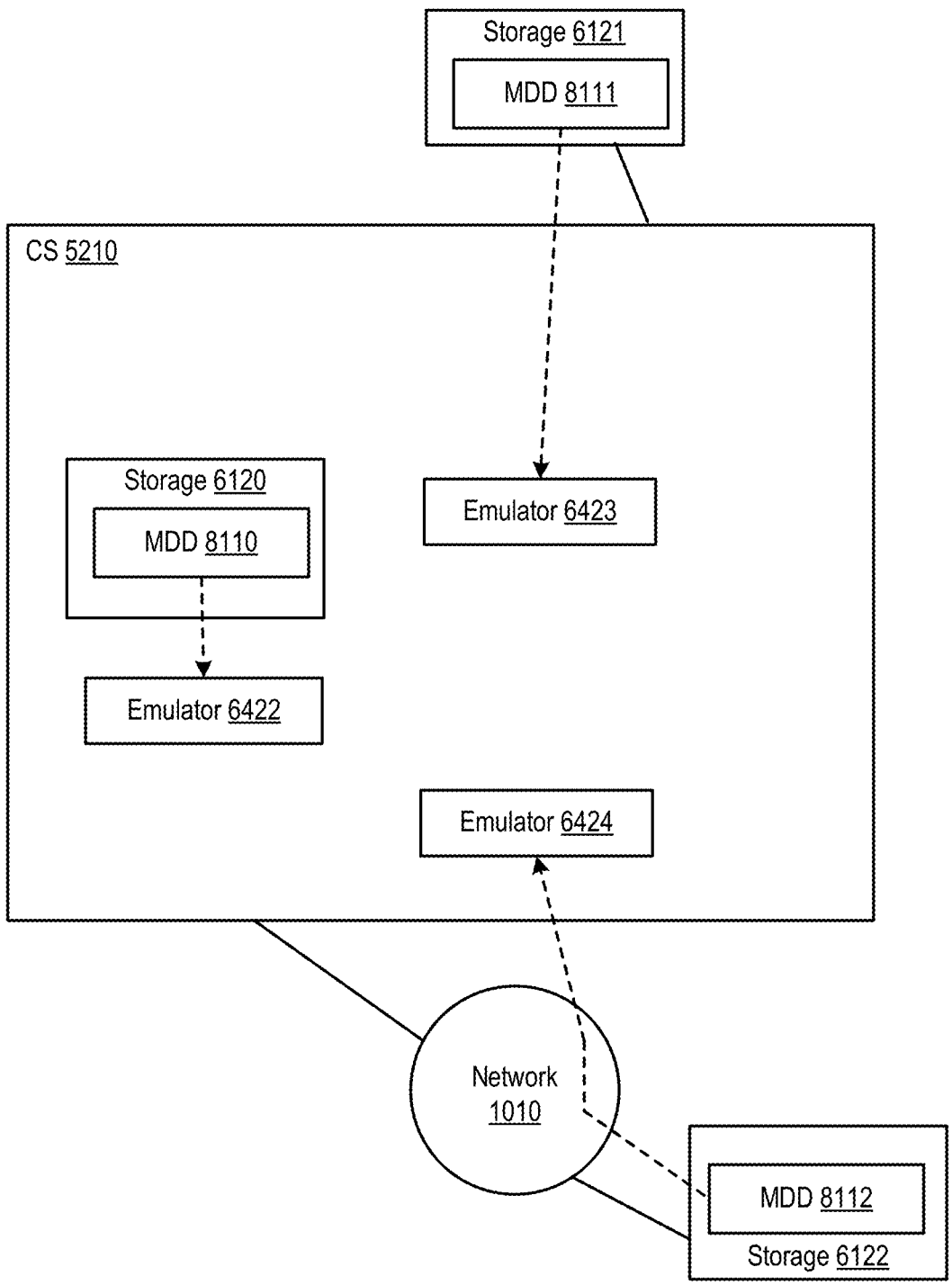
FIG. 14 illustrates an exemplary system that supports installation of data and configurations of one or more physical mobile devices to one or more respective emulators, according to one or more embodiments.

Turning now to FIG. 14, an exemplary system that supports installation of data and configurations of one or more physical mobile devices to one or more respective emulators is illustrated, according to one or more embodiments. In one or more embodiments, one or more emulators can emulate one or more physical mobile devices. In one example, emulator 6422 can emulate MD 6110, emulator 6423 can emulate MD 6111, and/or emulator 6424 can emulate MD 6112. As shown, MDD 8110 can be copied and/or transferred to emulator 6422. In another example, emulator 6422 can emulate MD 6110, emulator 6423 can emulate MD 6111, and/or emulator 6424 can emulate MD 6112. As shown, MDD 8110 or one or more portions of MD 8110 can be copied and/or transferred to emulator 6422; MDD 8111 or one or more portions of MD 8111 can be copied and/or transferred to emulator 6423; and MDD 8112 or one or more portions of MD 8112 can be copied and/or transferred to emulator 6424.

In one or more embodiments, one or more portions of MDD can be copied and/or transferred to an emulator when a method and/or process of and/or associated with the emulator requests the one or more portions of the MDD. In one example, one or more portions of MDD 8110 can be copied and/or transferred to emulator 6422 when a method and/or process of and/or associated with emulator 6422 requests the one or more portions of MDD 8110. In a second example, one or more portions of MDD 8111 can be copied and/or transferred to emulator 6423 when a method and/or process of and/or associated with emulator 6423 requests the one or more portions of MDD 8111. In another example, one or more portions of MDD 8112 can be copied and/or transferred to emulator 6424 when a method and/or process of and/or associated with emulator 6424 requests the one or more portions of MDD 8112.

In one or more embodiments, the MDD or one or more portions of MDD can be transformed, altered, converted, translated, adapted, adjusted, changed, modified, and/or adapted, among others, and transferred to an emulator when a method and/or process of and/or associated with the emulator requests the MDD or the one or more portions of the MDD. In one example, MDD 8110 or one or more portions of MDD 8110 can be transformed, altered, converted, translated, adapted, adjusted, changed, modified, and/or adapted, among others, and transferred to emulator 6422 when a method and/or process of and/or associated with emulator 6422 requests the one or more portions of MDD 8110. In a second example, MDD 8111 or one or more portions of MDD 8111 can be transformed, altered, converted, translated, adapted, adjusted, changed, modified, and/or adapted, among others, and transferred to emulator 6423 when a method and/or process of and/or associated with emulator 6423 requests the one or more portions of MDD 8111. In another example, MDD 8112 or one or more portions of MDD 8112 can be transformed, altered, converted, translated, adapted, adjusted, changed, modified, and/or adapted, among others, and transferred to emulator 6424 when a method and/or process of and/or associated with emulator 6424 requests the one or more portions of MDD 8112. In one or more embodiments, transferring data to an emulator (e.g., an emulator of emulators 6422-6423) can include providing availability of and/or access to the data by the emulator.

In one or more embodiments, an emulator can include executable instructions (e.g., an application, a utility, an operating system, a portion of an operating system, etc.), that when the executable instructions are executed by an emulated processor of the emulator, the emulator can synchronize, backup, restore, and/or initialize MDD associated with an associated MD. In one example, the emulator can initiate synchronization of one or more settings, one or more configurations, and/or information from the MDD. In a second example, the emulator can initiate synchronization of one or more settings, one or more configurations, and/or information from the MDD, where the MDD is associated with a MD that includes and/or executes a first operating and/or a first platform than a second, different, operating system and/or a second, different, platform. For instance, one or more portions of the MDD can be transformed, altered, converted, translated, adapted, adjusted, changed, modified, and/or adapted, among others, and transferred to the emulator when a method and/or process of and/or associated with the emulator requests the one or more portions of the MDD associated with the MD. In one or more embodiments, one or more modifications to the MDD and/or a base image of the emulator can be stored. For example, the one or more modifications can be stored temporarily and erased and/or discarded after the emulator is terminated and/or concludes operations.

In one or more embodiments, a determination of what information associated with the MDD to restore and/or to initialize the emulator can be made. In one example, the determination can include a full restoration of the MDD to the emulator. In another example, the determination can include a restoration of one or more portions of the MDD to the emulator. In one or more embodiments, the determination can be based on user input and/or one or more user preferences and/or configurations.

In one or more embodiments, the determination can be based on one or more attributes associated with the emulator and/or one or more attributes associated with the MD. In one example, the determination can be based on one or more similarities between or among the one or more attributes associated with the emulator and the one or more attributes associated with the MD. In another example, the determination can be based on one or more differences between or among the one or more attributes associated with the emulator and the one or more attributes associated with the MD.

In one or more embodiments, the one or attributes associated with the emulator can include one or more of an operating system, a platform, an emulated processor, an emulated memory, an emulated integrated circuit, an emulated GPU, an emulated WiFi device (e.g., an emulated WiFi interface), an emulated WiMAX device (e.g., an emulated WiMAX interface), an emulated GPS device, an emulated GSM device (e.g., an emulated GSM interface), an emulated CDMA device (e.g., an emulated CDMA interface), an emulated satellite telephone network interface, an emulated Bluetooth device (e.g., an emulated Bluetooth interface), an emulated ZigBEE device (e.g., an emulated ZigBEE interface), an emulated GPS device, an emulated Ethernet device (e.g., an emulated Ethernet interface), an emulated proximity sensing device, an emulated magnetometer, an emulated accelerometer, an emulated pressure transducer, an emulated humidity sensing device, an emulated capacitive sensing touch device, an emulated resistive sensing touch device, an emulated electronic gyroscope, an emulated gas sensing device, an emulated image sensing device (e.g., an emulated digital camera), an emulated sound output device, an emulated sound sensing device (e.g., an emulated microphone), an emulated digital compass device, an emulated temperature sensing device, an emulated FM radio receiving device, an emulated FM radio transmitting device, an emulated light sensing device, an emulated RFID sensing device, an emulated RFID transmitting device, an emulated NFC device, and an emulated range determining device, among others.

In one or more embodiments, the one or attributes associated with the MD can include one or more of an operating system, a platform, a processor, a memory, an integrated circuit, a GPU, a WiFi device (e.g., a WiFi interface), WiMAX device (e.g., a WiMAX interface), a GPS device, a GSM device (e.g., a GSM interface), a CDMA device (e.g., a CDMA interface), a satellite telephone network interface, a Bluetooth device (e.g., a Bluetooth interface), a ZigBEE device (e.g., a ZigBEE interface), a GPS device, an Ethernet device (e.g., an Ethernet interface), a proximity sensing device, a magnetometer, an accelerometer, a pressure transducer, a humidity sensing device, a capacitive sensing touch device, a resistive sensing touch device, an electronic gyroscope, a gas sensing device, an image sensing device (e.g., a digital camera), a sound output device, a sound sensing device (e.g., a microphone), a digital compass device, a temperature sensing device, a FM radio receiving device, a FM radio transmitting device, a light sensing device, a RFID sensing device, a RFID transmitting device, a NFC device, and a range determining device, among others.

Figure 15:
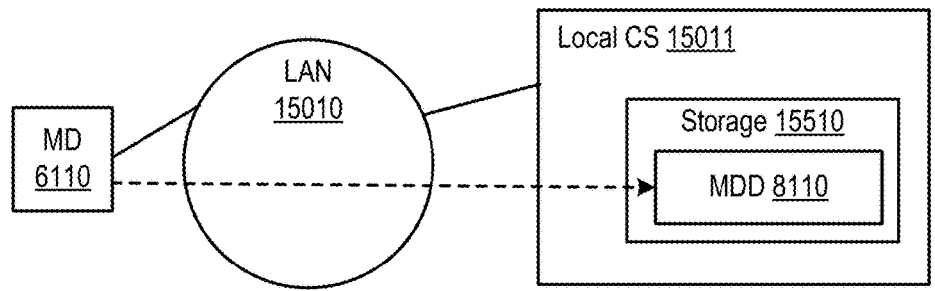
FIGS. 15-17 illustrate exemplary local area network systems that support storage of data and configurations of physical mobile devices, according to one or more embodiments.
Figure 16:
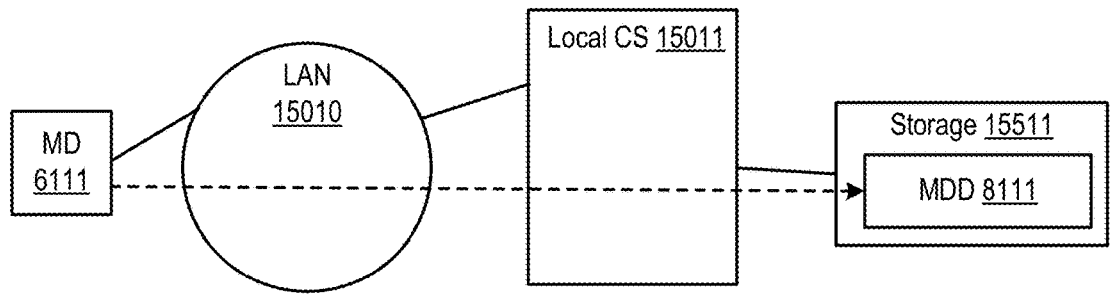
Figure 17:
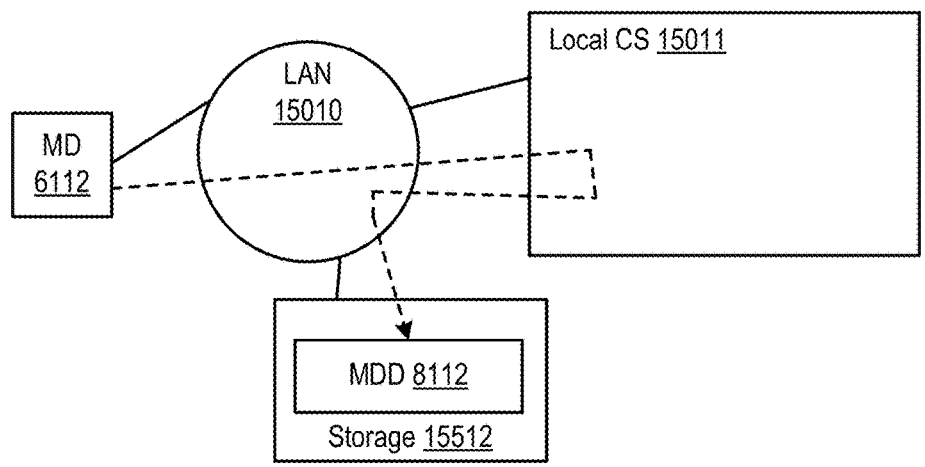

Turning now to FIGS. 15-17, exemplary local area network systems that support storage of data and configurations of physical mobile devices are illustrated, according to one or more embodiments. As shown in FIG. 15, MDD 8110 associated with MD 6110 can be stored via storage 15510 that can be included in a local CS 15011. As illustrated, MD 6110 and local CS 15011 can be coupled to a local area network (LAN) 15010. In one or more embodiments, local CS 15011 can include one or more of a computer system, a server computer system, a laptop computer system, a notebook computing device, a portable computer, a network appliance, a television device, a DVD (digital video disc player) device, a Blu-Ray disc player device, a DVR (digital video recorder) device, or other wireless or wired device that includes a processor that executes instructions from a memory medium.

In one or more embodiments, LAN 15010 can include a wired network. In one example, LAN 15010 can include a wired network based on wired Ethernet. In another example, LAN 15010 can include a wired network based on wired Ethernet over one or more power lines. For instance, LAN 15010 can include a wired network based on one or more of IEEE 1901, IEEE 1675, HomePNA, and HomePlug, among others. In one or more embodiments, LAN 15010 can include a wireless network. In one example, LAN 15010 can include a wireless network based on wireless Ethernet (e.g., based on IEEE 802.11). In a second example, LAN 15010 can include a wireless network based on Bluetooth (e.g., based on IEEE 802.15). In a third example, LAN 15010 can include a wireless network based on wireless USB. In another example, LAN 15010 can include a wireless network based on one or more of IEEE 802.15.4 and ZigBEE, among others.

As shown in FIG. 16, MDD 8111 associated with MD 6111 can be stored via storage 15511 that can be coupled to local CS 15011. As illustrated FIG. 17, MDD 8112 associated with MD 6112 can be stored via storage 15512 that can be coupled to LAN 15010.

Figure 18:
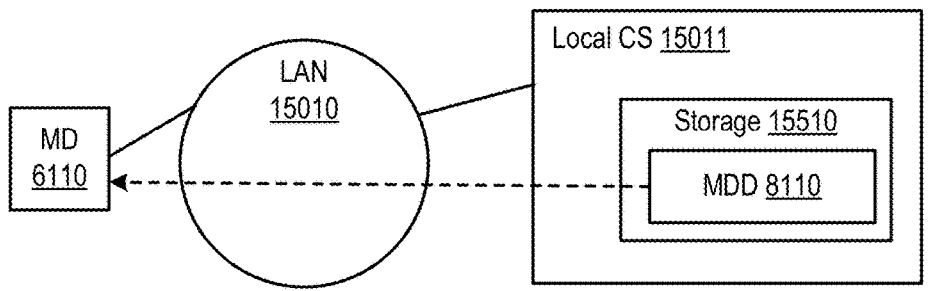
FIGS. 18-20 illustrate exemplary local network systems that support recovery and/or restoration of data and configurations of physical mobile devices, according to one or more embodiments.
Figure 19:
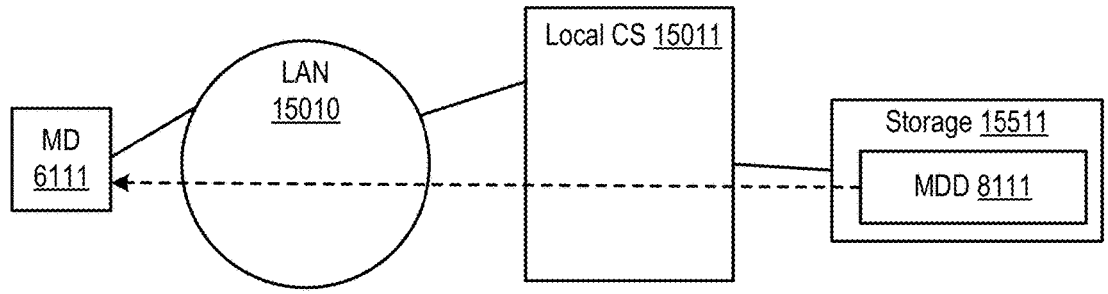
Figure 20:
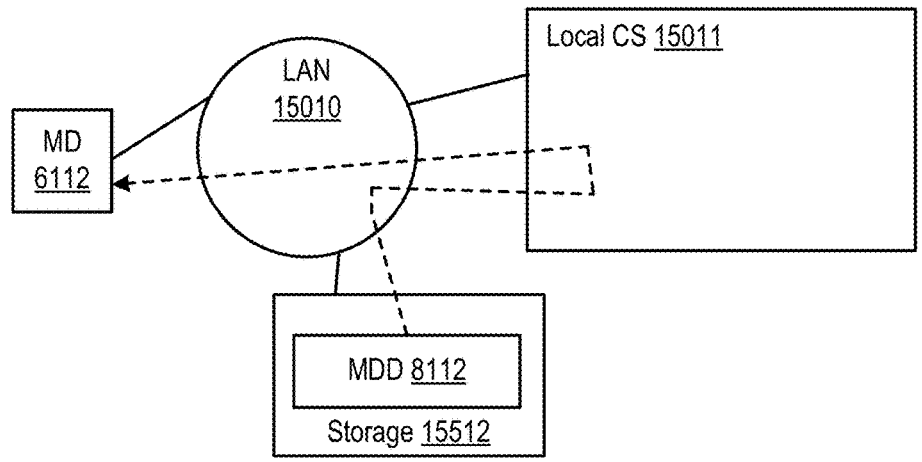

Turning now to FIGS. 18-20, exemplary local network systems that support recovery and/or restoration of data and configurations of physical mobile devices are illustrated, according to one or more embodiments. As shown in FIG. 18, MDD 8110 can be restored to MD 6110. As illustrated in FIG. 19, MDD 8111 can be restored to MD 6111. As shown in FIG. 20, MDD 8112 can be restored to MD 6112.

Figure 21:
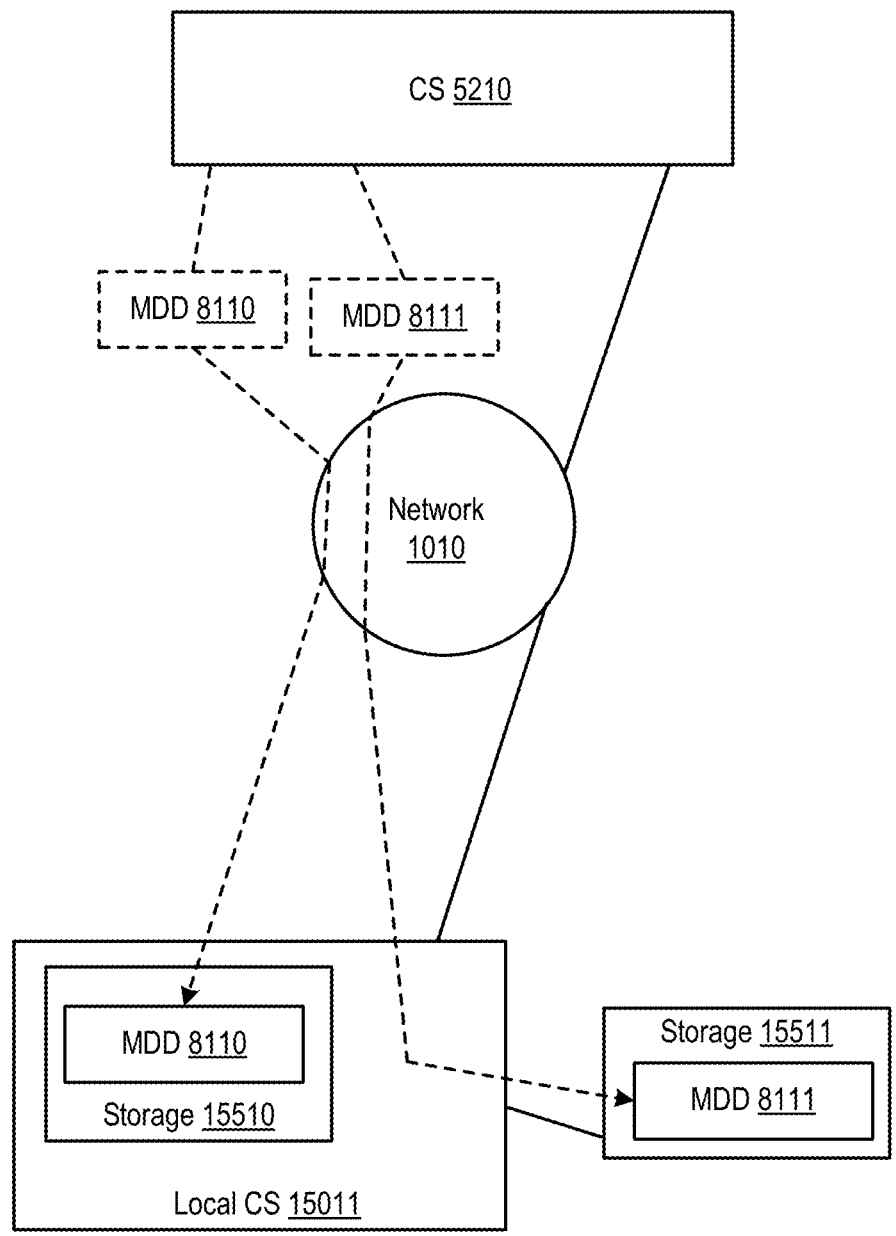
FIGS. 21 and 22 illustrate exemplary systems that support storage of data and configurations of physical mobile devices, according to one or more embodiments.

Turning now to FIG. 21, an exemplary system that supports storage of data and configurations of physical mobile devices is illustrated, according to one or more embodiments. In one or more embodiments, MDD can be transferred, via a network, from a first computer system to a second computer system. As shown, local CS 15011 can be coupled to network 1010. As illustrated, MDD 8110 can be transferred, via network 1010, from CS 5210 to local CS 15011. As shown, MDD 8111 can be transferred, via network 1010, from CS 5210 to local CS 15011.

Figure 22:
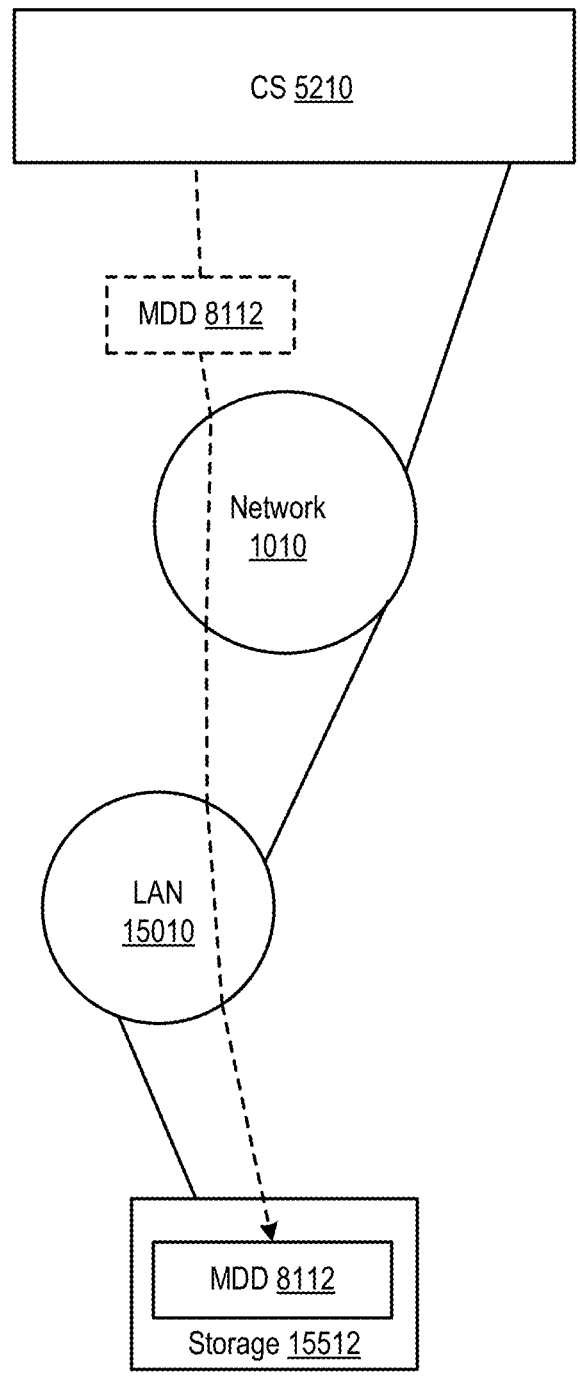

Turning now to FIG. 22, a network system that supports network storage of data and configurations of physical mobile devices is illustrated, according to one or more embodiments. As shown, LAN 15010 can be coupled to network 1010. In one or more embodiments, MDD can be transferred, via a first network, from a first computer system to storage coupled to a second network. As illustrated, MDD 8112 can be transferred, via network 1010 and LAN 15010, from CS 5210 to storage 15512.

Figure 23:
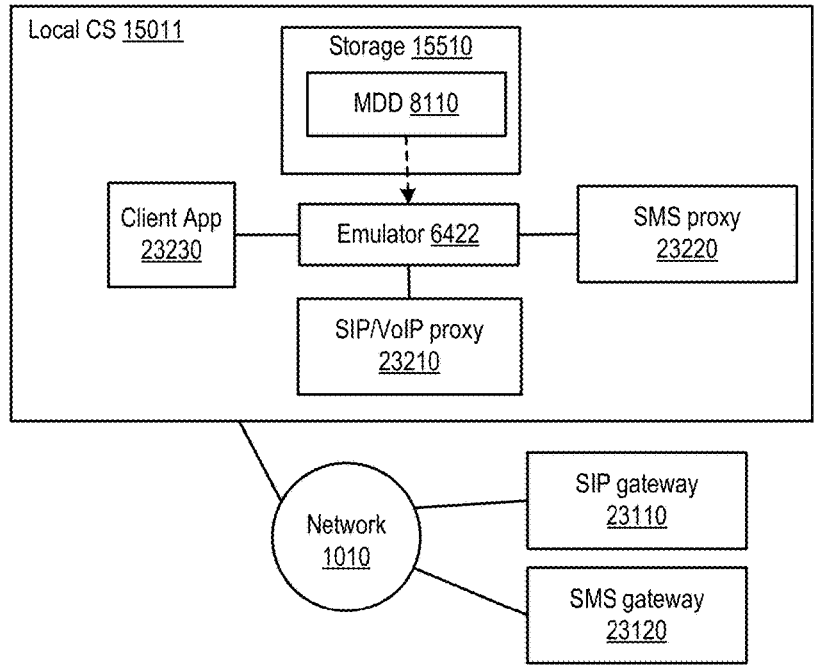
FIG. 23 illustrates an exemplary local network system that supports installation of data and configurations and utilization of an emulator, according to one or more embodiments.

Turning now to FIG. 23, an exemplary local network system that supports installation of data and configurations and utilization of an emulator is illustrated, according to one or more embodiments. As illustrated, a session initiation protocol (SIP) gateway 23110 can be coupled to network 1010. In one or more embodiments, SIP can be utilized in controlling one or more communications sessions. For example, SIP can be utilized in controlling voice and/or video calls via a network protocol (e.g., an Internet protocol). For instance, SIP can be utilized in creating, modifying two or more party communication sessions. In one or more embodiments, the communications sessions can include one or more media streams.

As shown, a SMS gateway 23120 can be coupled to network 1010. In one or more embodiments, SMS gateway 23120 can include a telecommunications device and/or facility for sending and/or receiving SMS transmissions to and/or from a telecommunications network. As illustrated, local CS 15011 can include a SIP/VoIP proxy 23210 coupled to emulator 6422. In one or more embodiments, SIP/VoIP proxy 23210 and emulator 6422 can communicate via one or more processes and/or methods described herein. In one or more embodiments, VoIP and/or IP encapsulated SMS and/or multimedia messaging service (MMS) termination can be implemented and/or provided within emulator 6422. As shown, local CS 15011 can include a SMS proxy 23220 coupled to emulator 6422. In one or more embodiments, SIP/VoIP proxy 23210 and emulator 6422 can communicate via one or more processes and/or methods described herein.

In one or more embodiments, SIP gateway 23110 and SIP/VoIP proxy 23210 can communicate via network 1010. For example, SIP gateway 23110 can route telephone calls and/or video calls to and/or from SIP/VoIP proxy 23210. In one instance, SIP/VoIP proxy 23210 can receive can emulate one or more GSM and/or CDMA signals that can carry the telephone calls and/or video calls and can provide the signals that can carry the telephone calls and/or video calls to emulator 6422. In another instance, SIP/VoIP proxy 23210 can receive one or more GSM and/or CDMA emulated signals that can carry the telephone calls and/or video calls from emulator 6422 and can provide the telephone calls and/or video calls to SIP gateway 23110.

As illustrated, local CS 15011 can include a client app 23230 coupled to emulator 6422. For example, client app 23230 and emulator 6422 can communicate via one or more processes and/or methods described herein. In one or more embodiments, local CS 15011 can be or include CCD 1111, and client app 23230 can be or include client interface 63021. For example, a user of local CS 15011 can control and/or utilize emulator as a telephone via one or more of client interface 63021, interactive media interface, and media interface 6541. In one or more embodiments, one or more interactions with emulator 6422 can be conducted via a web browser interfacing with a web server of emulator 6422.

In one or more embodiments, if an incoming call or an incoming message occurs when the web browser that would interface with the web server of emulator 6422 is not executing or is not directed to the web server of emulator 6422, an alert can be provided to the user of local CS 15011. In one example, the alert can include a display notification that can open a window displayed via a display associated with local CS 15011. In another example, the alert can include one or more sounds. In one instance, the one or more sounds can include one or more sounds of a telephone ringing. In another instance, the one or more sounds can include one or more sounds of a message arriving.

In one or more embodiments, when emulator 6422 is not running or not executing, a telephone system associated with emulator 6422 and/or a physical MD associated with emulator 6422 can function as if the physical MD is turned off, is not functioning, and/or is not in communication with a Node B, a base transceiver station, or a satellite. For example, a VoIP, a SMS, and/or a MMS termination point for emulator 6422 can be terminated.

In one or more embodiments, local CS 15011 can include or be coupled to one or more of a camera, a display, a microphone, and a speaker. In one example, the microphone and the speaker associated with local CS 15011 can be utilized in one or more telephonic communications. In another example, the camera and the display associated with local CS 15011 can be utilized in one or more video communications. In one or more embodiments, local CS 15011 can include one or more structures and/or functionalities described with reference to CD 2000, CD 7811, and/or MD 5510.

Figure 24:
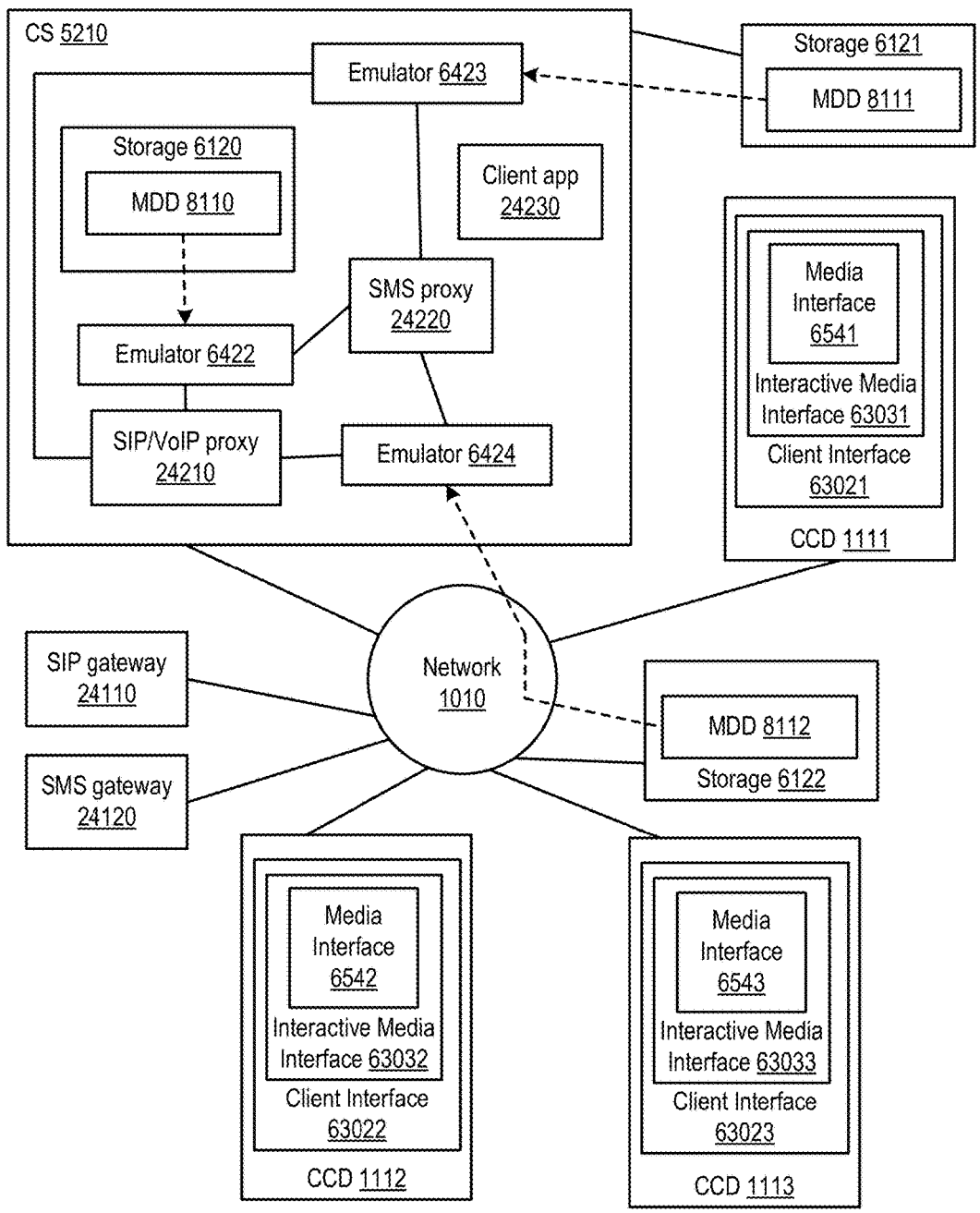
FIG. 24 illustrates an exemplary system that supports installation of data and configurations and utilization of multiple emulators, according to one or more embodiments.

Turning now to FIG. 24, an exemplary system that supports installation of data and configurations and utilization of multiple emulators is illustrated, according to one or more embodiments. As illustrated, a SIP gateway 24110 can be coupled to network 1010. In one or more embodiments, SIP gateway 24110 can include one or more same or similar structures and/or functionalities as described with reference to SIP gateway 23110. As shown, a SMS gateway 24120 can be coupled to network 1010. In one or more embodiments SMS gateway 24120 can include one or more same or similar structures and/or functionalities as described with reference to SMS gateway 23120.

As illustrated, CS 5210 can include a SIP/VoIP proxy 24210 coupled to emulators 6422-6424. In one or more embodiments, SIP/VoIP proxy 24210 and emulators 6422-6424 can communicate via one or more processes and/or methods described herein. As shown, CS 5210 can include a SMS proxy 24220 coupled to emulators 6422-6424. In one or more embodiments, SMS proxy 24220 and emulators 6422-6424 can communicate via one or more processes and/or methods described herein. In one or more embodiments, VoIP and/or IP encapsulated SMS and/or MMS termination can be implemented and/or provided within one or more emulators 6422-6424.

In one or more embodiments, SIP gateway 24110 and SIP/VoIP proxy 24210 can communicate via network 1010. For example, SIP gateway 24110 can route telephone calls and/or video calls to and/or from SIP/VoIP proxy 24210. In one instance, SIP/VoIP proxy 24210 can receive can emulate one or more signals (e.g., GSM signals, CDMA signals, etc.) that can carry the telephone calls and/or video calls and can provide signals that can carry the telephone calls and/or video calls to one or more of emulators 6422-6424. In another instance, SIP/VoIP proxy 24210 can receive one or more emulated signals (e.g., emulated GSM signals, emulated CDMA signals, etc.) that can carry the telephone calls and/or video calls from one or more emulators 6422-6424 and can provide the telephone calls and/or video calls to SIP gateway 24110.

In one or more embodiments, emulators 6422-6424 can be operated and/or controlled by respective CCDs 1111-

1113. For example, emulators 6422-6424 can be operated and/or controlled by respective client interfaces 63021-63023. For instance, each of client interfaces 63021-63023 can include a web browser that operates and/or controls a respective emulator.

In one or more embodiments, each emulator of emulators 6422-6424 can provide and/or implement authentication, authorization, and/or access control to determine that a user can interact with, utilize, and/or operate the emulator. For example, an emulator of emulators 6422-6424 can receive identification information associated with a user and/or a user account and/or can receive a password associated with the user and/or the user account to determine that the user can interact with, utilize, and/or operate the emulator. In one instance, the emulator can authenticate and/or authorize the identification information and/or the password with a database. In a second instance, the emulator can authenticate and/or authorize the identification information and/or the password with at least one of a home location register (HLR) and a visiting location register (VLR), among others. In another instance, the emulator can authenticate and/or authorize the identification information and/or the password with an authentication, authorization, and accounting (AAA) server and/or service.

In one or more embodiments, if an incoming call or an incoming message occurs when a web browser that would interface with a web server of an emulator of emulators 6422-6424 is not executing or is not directed to the web server of the emulator, an alert can be provided to a user via a CCD (e.g., a CCD of CCDs 1111-1113) utilized by the user. In one example, the alert can include a display notification that can open a window displayed via a display associated with the CCD. In another example, the alert can include one or more sounds. In one instance, the one or more sounds can include one or more sounds of a telephone ringing. In another instance, the one or more sounds can include one or more sounds of a message arriving.

In one or more embodiments, if the emulator is not running or not executing, a telephone system associated with the emulator and/or a physical MD associated with the emulator can function as if the physical MD is turned off, is not functioning, and/or is not in communication with a Node B, a base transceiver station, or a satellite. For example, a VoIP, a SMS, and/or a MMS termination point for the emulator can be terminated. In one or more embodiments, an alternate notification process, method, and/or path can be utilized if the emulator is not running or not executing. In one example, a push notification can be provided to the CDD of the user. In another example, a text message (e.g., a SMS message, an email message, etc.) indicating that an incoming telephone call, voice message, and/or other message (e.g., a text message) can be provided to another device associated with the user. For instance, a SMS message can be provided to the other device (e.g., a wireless telephone, a pager, etc.) associated with the user and/or the identification information associated with the user.

In one or more embodiments, providing the text message (e.g., a SMS message, an email message, etc.) that indicates an incoming telephone call, voice message, and/or other message (e.g., a text message) can be based on a profile and/or a configuration associated with the user. For example, the profile and/or a configuration associated with the user can include a policy that can direct providing the text message (e.g., a SMS message, an email message, etc.) that indicates an incoming telephone call, voice message, and/or other message (e.g., a text message) to the other device associated with the user and/or the identification information associated with the user.

Figure 25:
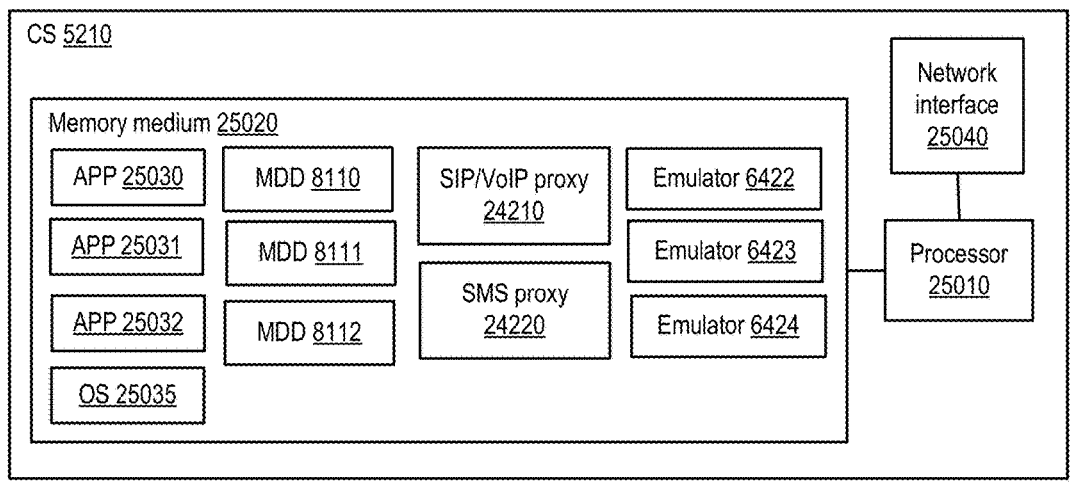
FIG. 25 illustrates an exemplary computing system, according to one or more embodiments.

Turning now to FIG. 25, an exemplary computing system is illustrated, according to one or more embodiments. As shown, CS 5210 can include a processor 25010 coupled to a memory medium 25020. In one or more embodiments, memory medium 25020 can store data and/or instructions that can be executed by processor 25010. For example, memory medium 25020 can store one or more APPs 25030-25032, an OS 25035, MDDs 8110-8112, emulators 6422-6424, SIP/VoIP proxy 24210, and/or SMS proxy 24220. For instance, one or more of APPs 25030-25032, OS 25035, emulators 6422-6424, SIP/VoIP proxy 24210, and SMS proxy 24220 can include instructions of an ISA associated with processor 25010. In one or more embodiments, one or more of the processes and/or methods described here can be implemented when processor 25010 executes one or more of APPs 25030-25032, OS 25035, emulators 6422-6424, SIP/VoIP proxy 24210, and SMS proxy 24220.

As illustrated, CS 5210 can include a network interface 25040. In one example, network interface 2040 can interface with a wired network coupling, such as a wired Ethernet, a T-1, a T-3, an OC-12, a DSL modem, a PSTN, or a cable modem, among others. In another example, network interface 25040 can interface with a wireless network coupling, such as a satellite telephone system, a cellular telephone system, WiMax, or wireless Ethernet, among others.

Figure 26:
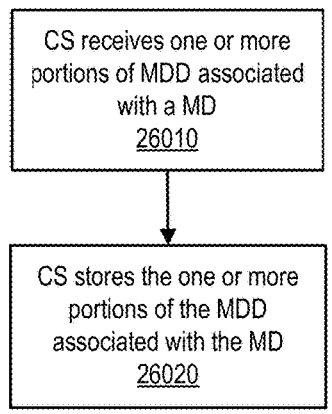
FIG. 26 provides an exemplary method of a computer system receiving and storing mobile device data, according to one or more embodiments.

Turning now to FIG. 26, an exemplary method of a computer system receiving and storing mobile device data is illustrated, according to one or more embodiments. At 26010, a computer system can receive one or more portions of MDD associated with a MD. In one example, CS 5210 can receive, via network 1010, the one or more portions of MDD associated with the MD. In a second example, local CS 15011 can receive, via LAN 15010, the one or more portions of MDD associated with the MD. In another example, local CS can receive, via LAN 15010, the one or more portions of MDD associated with the MD.

In one or more embodiments, the MDD can be associated with one of MDs 6110-6112. In one example, the one or more portions of MDD associated with the MD can be or include an incremental backup and/or synchronization. In another example, the one or more portions of MDD associated with the MD can be or include all portions of the MDD. For instance, all portions of the MDD can be or include a "full" backup of the MD.

At 26020, the computer system can store the one or more portions of the MDD. In one example, the one or more portions of the MDD can be stored in non-volatile storage. In another example, the one or more portions of the MDD can be stored in a random access memory that can provide an emulator access to the one or more portions of the MDD in a fashion that can be faster than access to the one or more portions of the MDD via non-volatile storage.

Figure 27:
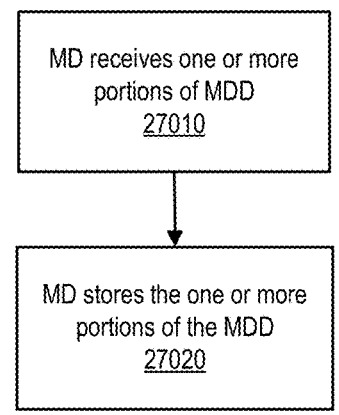
FIG. 27 provides an exemplary method of a mobile device receiving and storing mobile device data, according to one or more embodiments.

Turning now to FIG. 27, an exemplary method of a mobile device receiving and storing mobile device data is illustrated, according to one or more embodiments. In one or more embodiments, a MD can receive can receive one or more portions of MDD associated with the MD, at 27010. In one example, the MD can receive, via network 1010, the one or more portions of MDD associated with the MD. In a second example, the MD can receive, via LAN 15010, the one or more portions of MDD associated with the MD.

In one or more embodiments, the one or more portions of MDD associated with the MD can be or include one or more incremental synchronizations and/or backups. In one or more embodiments, the one or more portions of MDD associated with the MD can be or include one or more changes of the MDD, after the MDD has been utilized by an emulator. In one example, a user can utilize the MDD via the MD, utilize the MDD via an emulator associated with the MD, and receive the one or more changes of the MDD, after the MDD has been utilized by an emulator.

In another example, a user can utilize the MDD via the MD, an emulator associated with the MD can utilize the MDD via the user and/or another user (e.g., a sales representative, a service representing, a representative of a retail establishment, a representative of a service provider, an artificial intelligence system, a neural network system, etc.), and receive the one or more changes of the MDD, after the MDD has been utilized by the emulator via the user and/or the other user. For instance, the other user (e.g., a service representative) can assist the user to configure his or her MD via providing the MDD to an emulator and can change one or more portions of the MDD (e.g., one or more configurations of the MD associated with the MDD), and the one or more portions of the MDD can be received by the MD after the other user assists the user to configure his or her MD via the emulator.

In one or more embodiments, the MD can store the one or more portions of the MDD, at 27020. In one example, the MD can store the one or more portions of MDD that include the one or more incremental synchronizations and/or backups. In a second example, the MD can store the one or more portions of MDD that include the one or more changes of the MDD, after the MDD has been utilized by an emulator. In another example, the MD can store the one or more portions of MDD that include the one or more changes of the MDD after the MDD has been utilized by an emulator that was utilized by another user (e.g., a sales representative, a service representing, a representative of a retail establishment, a representative of a service provider, etc.) or an assistance system (e.g., an artificial intelligence system, a neural network system, etc.).

In one or more embodiments, the one or more portions of MDD can be associated with a first MD, and a second MD, different from the first MD, can receive the one or more portions of MDD associated with the first MD, at 27010. In one example, the MDD can be a base or a template for multiple MDs. For instance, MDD that can be a base or a template can be a base or a template for multiple MDs of a sales group of a company. In a second example, the second MD can be a replacement for the first MD. In another example, the second MD can augment and/or be an addition to the first MD. In one instance, the first MD can be or include a mobile wireless telephone, and the second MD can be or include a tablet computing device. In a second instance, the first MD can be or include a first mobile wireless telephone associated with a first MIN, and the second MD can be or include a second wireless telephone associated with a second MIN, different from the first MIN. In another instance, the first MD can be or include a first mobile wireless telephone, and the second MD can be or include an emulation of the first mobile wireless telephone.

In one or more embodiments, the second MD can store the one or more portions of the MDD, at 27020. For example, the second MD can store the one or more portions of MDD associated with the first MD.

Figure 28:
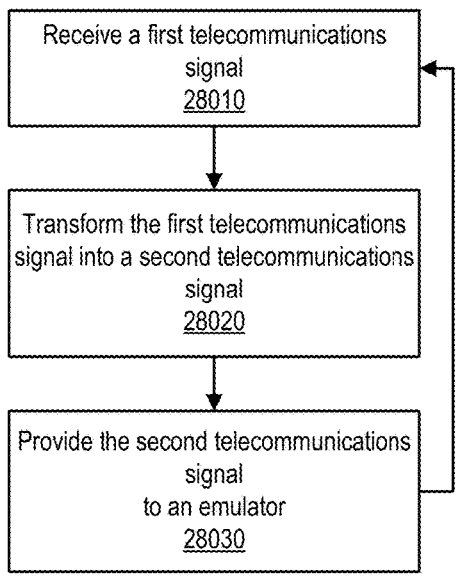
FIG. 28 provides an exemplary method of transforming telecommunications signals, according to one or more embodiments.

Turning now to FIG. 28, an exemplary method of transforming telecommunications signals is illustrated, according to one or more embodiments. At 28010, a first telecommunications signal can be received. In one example, the first telecommunications signal can be received from SIP gateway 24110. In a second example, the first telecommunications signal can be received from SMS gateway 24120.

In a third example, the first telecommunications signal can include a SIP telecommunications signal. For instance, SIP/VoIP proxy 24210 can receive the SIP telecommunications signal. In a fourth example, the first telecommunication signal can include a VoIP telecommunications signal. For instance, SIP/VoIP proxy 24210 can receive the VoIP telecommunications signal. In another example, the first telecommunication signal can include a SMS or MMS telecommunications signal. For instance, SMS proxy 24220 can receive the SMS or MMS telecommunications signal.

At 28020, the first telecommunication signal can be transformed into a second telecommunications signal. In one example, the first telecommunications signal can be transformed into a CDMA telecommunications signal. In one instance, SIP/VoIP proxy 24210 can transform the first telecommunications signal into the CDMA telecommunications signal. In another instance, SMS proxy 24220 can transform the first telecommunications signal into the CDMA telecommunications signal. In another example, the first telecommunications signal can be transformed into a GSM telecommunications signal. In one instance, SIP/VoIP proxy 24210 can transform the first telecommunications signal into the GSM telecommunications signal. In another instance, SMS proxy 24220 can transform the first telecommunications signal into the GSM telecommunications signal.

At 28030, the second communications signal can be provided to an emulator. In one example, SIP/VoIP proxy 24210 can provide the second telecommunications to the emulator (e.g., an emulator of emulators 6422-6424). In another example, SMS proxy 24220 can provide the second telecommunications to the emulator (e.g., an emulator of emulators 6422-6424).

In one or more embodiments, the method illustrated in FIG. 28 can be repeated to transform additional telecommunications signals and provide the transformed telecommunications signals to one or more emulators. In one or more embodiments, the second telecommunications signals can be routed to different emulators based on different network identifications associated with the first telecommunications signals. For example, the different network identifications associated with the first telecommunications signals can include different IP (Internet protocol) addresses (e.g., different IP version 4 addresses, different IP version 6 addresses, etc.), different MAC (media access control) addresses, different electronic serial numbers (ESNs), different mobile information numbers (MINs), and different mobile directory numbers (MDNs), among others.

Figure 29:
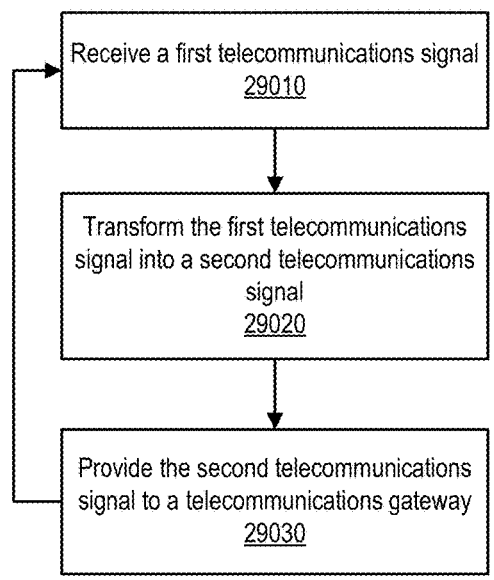
FIG. 29 provides another exemplary method of transforming telecommunications signals, according to one or more embodiments.

Turning now to FIG. 29, an exemplary method of transforming telecommunications signals is illustrated, according to one or more embodiments. At 29010, a first telecommunication signal can be received. In one or more embodiments, the telecommunication signal can be received from an emulator (e.g., an emulator of emulators 6422-6424. In one example, the first telecommunications signal can include a CDMA telecommunications signal. In one instance, SIP/VoIP proxy 24210 can receive the CDMA telecommunications signal. In another instance, SIP/VoIP proxy 24210 can receive the CDMA telecommunications signal. In another example, the first telecommunication signal can include a GSM telecommunications signal. In one instance, SIP/VoIP proxy 24210 can receive the GSM telecommunications signal. In another instance, SMS proxy 24220 can receive the GSM telecommunications signal.

At 29020, the first telecommunications signal can be transformed into a second telecommunications signal. In one example, the first telecommunications signal can be transformed into a SIP telecommunications signal. For instance, SIP/VoIP proxy 24210 can transform the first telecommunications signal into the SIP telecommunications signal. In a second example, the first telecommunications signal can be transformed into a VoIP telecommunications signal. For instance, SIP/VoIP proxy 24210 can transform the first telecommunications signal into the VoIP telecommunications signal. In a third example, the first telecommunications signal can be transformed into a SMS telecommunications signal. For instance, SMS proxy 24220 can transform the first telecommunications signal into the SMS telecommunications signal. In another example, the first telecommunications signal can be transformed into a MMS telecommunications signal. For instance, SMS proxy 24220 can transform the first telecommunications signal into the MMS telecommunications signal.

At 29030, the second telecommunications signal can be provided to a telecommunications gateway. In one example, SIP/VoIP proxy 24210 can provide the second telecommunications signal to SIP gateway 24110. In another example, SMS proxy 24220 can provide the second telecommunications signal to SMS gateway 24120.

In one or more embodiments, the method illustrated in FIG. 29 can be repeated to transform additional telecommunications signals and provide the transformed telecommunications signals to one or more telecommunications gateways. In one or more embodiments, the second telecommunications signals can be routed to different telecommunications gateways and/or endpoints based on different network identifications associated with the first telecommunications signals. For example, the different network identifications associated with the first telecommunications signals can include different IP addresses (e.g., different IP version 4 addresses, different IP version 6 addresses, etc.), different MAC addresses, different ESNs, different MINs, and different MDNs, among others.

In one or more embodiments, the methods illustrated in FIGS. 28 and 29 can be utilized with local CS 15011, as well as CS 5210. For example, SIP/VoIP proxy 23210 of local CS 15011 can be utilized in place of SIP/VoIP proxy 24210 of CS 5210, and SMS proxy 23220 of local CS 15011 can be utilized in place of SIP/VoIP proxy 24220 of CS 5210.

Figure 30:
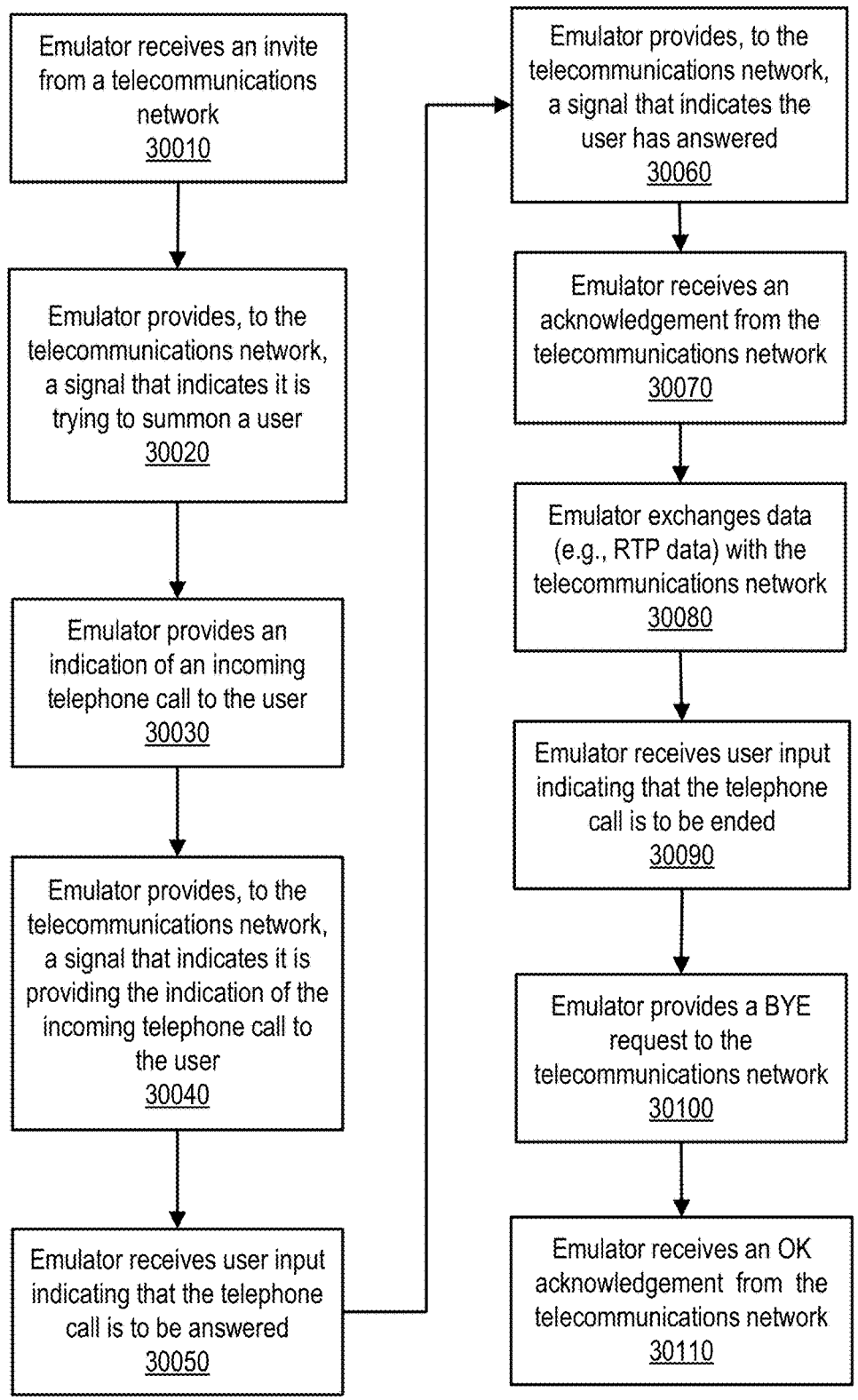
FIG. 30 provides an exemplary method of utilizing an emulator, according to one or more embodiments.

Turning now to FIG. 30, an exemplary method of utilizing an emulator is illustrated, according to one or more embodiments. At 30010, an emulator can receive an invite from a telecommunications network. In one or more embodiments, the invite can indicate that a telephone is calling the emulator.

In one or more embodiments, receiving the invite can include receiving the signal that indicates the invite. For example, receiving, via SIP, the signal that indicates the invite can include receiving the invite via one or more of a SIP gateway and a SIP proxy. In one instance, emulator 6422 can receive the signal that indicates the invite via SIP gateway 23110 and via SIP/VoIP proxy 23210, illustrated in FIG. 23. In another instance, emulator 6423 can receive the signal that indicates the invite via SIP gateway 24110 and via SIP/VoIP proxy 24210, illustrated in FIG. 24.

At 30020, the emulator can provide a signal to the telecommunications network that indicates it is trying to summon a user (e.g., a called party). At 30030, the emulator can provide an indication of an incoming telephone call to the user. In one example, emulator 6422 can provide the indication of the incoming telephone call to the user via client app 23230. In another example, emulator 6423 can provide the indication of the incoming telephone call to the user via client interface 63022. In one or more embodiments, client interface 63022 can be or include a web browser.

At 30040, the emulator can provide, to the telecommunications network, a signal that indicates that it is providing the indication of the incoming telephone call to the user. For example, the signal that indicates that the emulator is providing the indication of the incoming telephone call to the user can be provided to the telecommunications network via SIP. In one instance, emulator 6422 can provide the signal that indicates that emulator 6422 is providing the indication of the incoming telephone call to the user can be provided to the telecommunications network via SIP gateway 23110 and via SIP/VoIP proxy 23210, illustrated in FIG. 23. In another instance, emulator 6423 can provide the signal that indicates that emulator 6423 is providing the indication of the incoming telephone call to the user can be provided to the telecommunications network via SIP gateway 24410 and via SIP/VoIP proxy 24210, illustrated in FIG. 24.

At 30050, the emulator can receive user input that indicates that the telephone call is to be answered. In one example, emulator 6422 can receive the user input that indicates that the telephone call is to be answered via client app 23230, illustrated in FIG. 23. In another example, emulator 6423 can receive the user input that indicates that the telephone call is to be answered via client interface 63022, illustrated in FIG. 6E.

At 30060, the emulator can provide, to the telecommunications network, a signal that indicates the user has answered the call. For example, the signal that indicates the user has answered the call can be provided to the telecommunications network via SIP. In one instance, emulator 6422 can provide the signal that indicates the user has answered the call can be provided to the telecommunications network via SIP gateway 23110 and via SIP/VoIP proxy 23210. In another instance, emulator 6423 can provide the signal that indicates the user has answered the call can be provided to the telecommunications network via SIP gateway 24410 and via SIP/VoIP proxy 24210.

At 30070, the emulator can receive an acknowledgement from the telecommunications network. For example, a signal that indicates the acknowledgement can be received from the telecommunications network via SIP. In one instance, emulator 6422 can receive the signal that indicates the acknowledgement from the telecommunications network via SIP gateway 24110 and via SIP/VoIP proxy 24210. In another instance, emulator 6423 can receive the signal that indicates the acknowledgement from the telecommunications network via SIP gateway 24410 and via SIP/VoIP proxy 24210.

At 30080, the emulator can exchange data (e.g., RTP (real-time protocol) data) with the telecommunications network. In one example, emulator 6422 can exchange the data with the telecommunications network via SIP gateway 23110 and via SIP/VoIP proxy 23210. In another example, emulator 6423 can exchange the data with the telecommunications network via SIP gateway 24410 and via SIP/VoIP proxy 24210. In one or more embodiments, the RTP can include a packet format for delivering audio and/or video via an IP network.

At 30090, the emulator can receive user input that indicates that the telephone call is to be ended. In one example, emulator 6422 can receive the user input that indicates that the telephone call is to be ended via client app 23230. In another example, emulator 6423 can receive the user input that indicates that the telephone call is to be ended via client interface 63022.

At 30100, the emulator can provide a BYE request to the telecommunications network. For example, a signal that indicates the BYE request can be provided to the telecommunications network via SIP. In one instance, emulator 6422 can provide the signal that indicates the BYE request to the telecommunications network via SIP gateway 23110 and via SIP/VoIP proxy 23210. In another instance, emulator 6423 can provide the signal that indicates the BYE request to the telecommunications network via SIP gateway 24410 and via SIP/VoIP proxy 24210.

At 30110, the emulator can receive an OK acknowledgement from the telecommunications network. For example, a signal that indicates the OK acknowledgement can be received from the telecommunications network via SIP. In one instance, emulator 6422 can receive the signal that indicates the OK acknowledgement from the telecommunications network via SIP gateway 23110 and via SIP/VoIP proxy 23210. In another instance, emulator 6423 can receive the signal that indicates the OK acknowledgement from the telecommunications network via SIP gateway 24410 and via SIP/VoIP proxy 24210.

Figure 31:
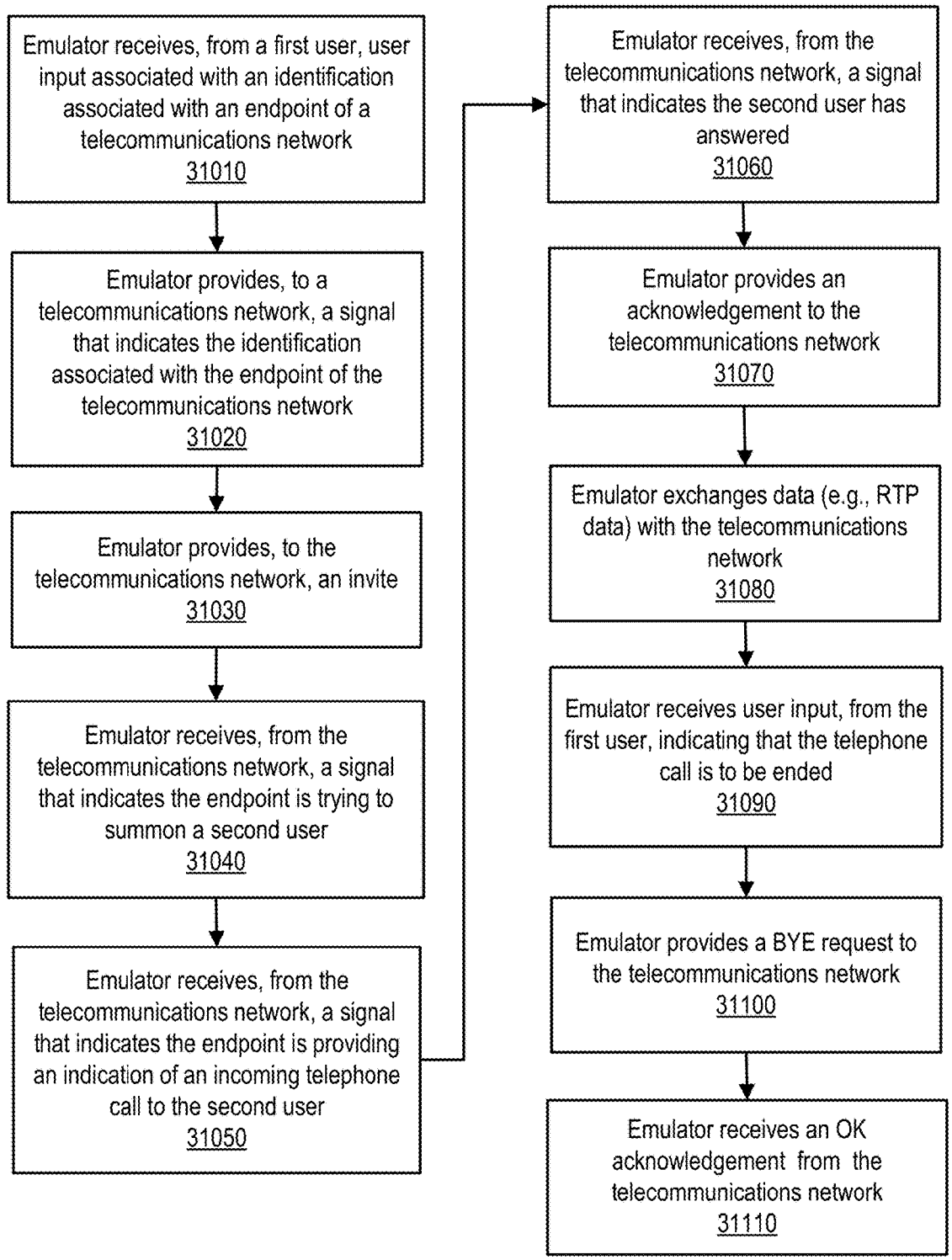
FIG. 31 provides another exemplary method of utilizing an emulator, according to one or more embodiments.

Turning now to FIG. 31, an exemplary method of utilizing an emulator is illustrated, according to one or more embodiments. At 31010, an emulator can receive, from a first user, user input associated with a network identification associated with an endpoint (e.g., a telephony device configured to be operated by a user, another emulator, a wireless telephone, a wired telephone, an auto-attendant, a conferencing system, etc.) of a telecommunications network. In one example, the user input from the first user can include a selection from a contacts list and/or database. For instance, each selectable element of the contacts list and/or database can be associated with at least one network identification associated with an endpoint of the telecommunications network. In another example, the user input from the first user can include a telephone number. In one or more embodiments, the network identification associated with the endpoint can include one or more of an IP addresses (e.g., an IP version 4 address, an IP version 6 address, etc.), a MAC address, an ESN, a MIN, and a MDN, among others.

At 31020, an emulator can provide, to a telecommunications network, a signal that indicates the network identification associated with the endpoint. In one or more embodiments, providing the signal that indicates the network identification associated with the endpoint can include providing the signal that indicates the network identification associated with the endpoint via SIP. In one example, emulator 6422 can provide the signal that indicates the network identification associated with the endpoint via SIP gateway 23110 and via SIP/VoIP proxy 23210, illustrated in FIG. 23. In another example, emulator 6423 can provide the signal that indicates the network identification associated with the endpoint via SIP gateway 24110 and via SIP/VoIP proxy 24210, illustrated in FIG. 24.

At 31030, the emulator can provide an invite to a telecommunications network. In one or more embodiments, providing the invite to the telecommunications network can include providing, to the telecommunications network, a signal that indicates the invite via SIP. In one example, emulator 6422 can provide the signal that indicates the invite via SIP gateway 23110 and via SIP/VoIP proxy 23210. In another example, emulator 6423 can receive the signal that indicates the invite via SIP gateway 24110 and via SIP/VoIP proxy 24210.

At 31040, the emulator can receive a signal from the telecommunications network that indicates the endpoint is trying to summon a second user (e.g., a called party). In one or more embodiments, receiving the signal from the telecommunications network that indicates the endpoint is trying to summon the second user can include receiving, via SIP, the signal from the telecommunications network that indicates the endpoint is trying to summon the second user. In one example, emulator 6422 can receive the signal that indicates the endpoint is trying to summon the second user via SIP gateway 23110 and via SIP/VoIP proxy 23210. In another example, emulator 6423 can receive the signal that indicates the endpoint is trying to summon the second user via SIP gateway 24110 and via SIP/VoIP proxy 24210.

At 31050, the emulator can receive, from the telecommunications network, a signal that indicates that the endpoint is providing an indication of an incoming telephone call to the second user. In one or more embodiments, receiving the signal that indicates that the endpoint is providing the indication of the incoming telephone call to the second user can include receiving the signal that indicates that the endpoint is providing the indication of the incoming telephone call to the second user via SIP. In one example, emulator 6422 can receive the signal that indicates that the endpoint is providing the indication of the incoming telephone call to the second user via SIP gateway 23110 and via SIP/VoIP proxy 23210. In another example, emulator 6423 can receive the signal that indicates that the endpoint is providing the indication of the incoming telephone call to the second user via SIP gateway 24110 and via SIP/VoIP proxy 24210.

In one or more embodiments, the emulator can indicate, to the first user, that the endpoint is providing the indication of the incoming telephone call to the second user. In one example, the emulator can indicate, to the first user, that the endpoint is providing the indication of the incoming telephone call to the second user via a message and/or a graphic. In one instance, emulator 6422 can display, to the first user, a message and/or a graphic that the endpoint is providing the indication of the incoming telephone call to the second user via client app 23230. In another instance, emulator 6423 can display, to the first user, a message and/or a graphic that the endpoint is providing the indication of the incoming telephone call to the second user via client interface 63022.

In another example, the emulator can indicate, to the first user, that the endpoint is providing the indication of the incoming telephone call to the second user via one or more sounds. In one instance, emulator 6422 can indicate, to the first user, via a speaker associated with local CS 15011. In another instance, emulator 6422 can indicate, to the first user, via a speaker associated with CCD 1112. In one or more embodiments, one or more sounds that indicate, to the first user, that the endpoint is providing the indication of the incoming telephone call to the second user can include a ring-back.

At 31060, the emulator can receive, from the telecommunications network, a signal that indicates the second user has answered. For example, the signal that indicates the second user has answered the telephone call can be received from the telecommunications network via SIP. In one instance, emulator 6422 can receive the signal that indicates the second user has answered the telephone call can be received from the telecommunications network via SIP gateway 23110 and via SIP/VoIP proxy 23210. In another instance, emulator 6423 can receive the signal that indicates the second user has answered the telephone call can be received from the telecommunications network via SIP gateway 24410 and via SIP/VoIP proxy 24210.

At 31070, the emulator can provide an acknowledgement to the telecommunications network. For example, a signal that indicates the acknowledgement can be provided to the telecommunications network via SIP. In one instance, emulator 6422 can provide the signal that indicates the acknowledgement to the telecommunications network via SIP gateway 23110 and via SIP/VoIP proxy 23210. In another instance, emulator 6423 can provide the signal that indicates the acknowledgement to the telecommunications network via SIP gateway 24410 and via SIP/VoIP proxy 24210.

At 31080, the emulator can exchange data (e.g., RTP (real-time protocol) data) with the telecommunications network. In one example, emulator 6422 can exchange the data with the telecommunications network via SIP gateway 23110 and via SIP/VoIP proxy 23210. In another example, emulator 6423 can exchange the data with the telecommunications network via SIP gateway 24410 and via SIP/VoIP proxy 24210. In one or more embodiments, the RTP can include a packet format for delivering audio and/or video via an IP network.

At 31090, the emulator can receive user input, from the first user, that indicates that the telephone call is to be ended. In one example, emulator 6422 can receive the user input, from the first user, that indicates that the telephone call is to be ended via client app 23230. In another example, emulator 6423 can receive the user input, from the first user, that indicates that the telephone call is to be ended via client interface 63022.

At 31100, the emulator can provide a BYE request to the telecommunications network. For example, a signal that indicates the BYE request can be provided to the telecommunications network via SIP. In one instance, emulator 6422 can provide the signal that indicates the BYE request to the telecommunications network via SIP gateway 23110 and via SIP/VoIP proxy 23210. In another instance, emulator 6423 can provide the signal that indicates the BYE request to the telecommunications network via SIP gateway 24410 and via SIP/VoIP proxy 24210.

At 31110, the emulator can receive an OK acknowledgement from the telecommunications network. For example, a signal that indicates the OK acknowledgement can be received from the telecommunications network via SIP. In one instance, emulator 6422 can receive the signal that indicates the OK acknowledgement from the telecommunications network via SIP gateway 23110 and via SIP/VoIP proxy 23210. In another instance, emulator 6423 can receive the signal that indicates the OK acknowledgement from the telecommunications network via SIP gateway 24410 and via SIP/VoIP proxy 24210.

Figure 32:
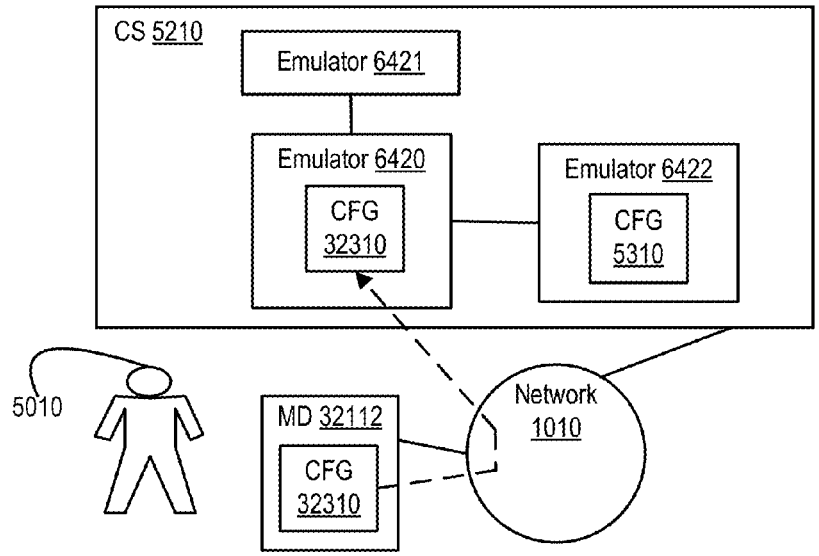
FIGS. 32 and 33 illustrate exemplary block diagrams of emulators coupled together, according to one or more embodiments.
Figure 33:
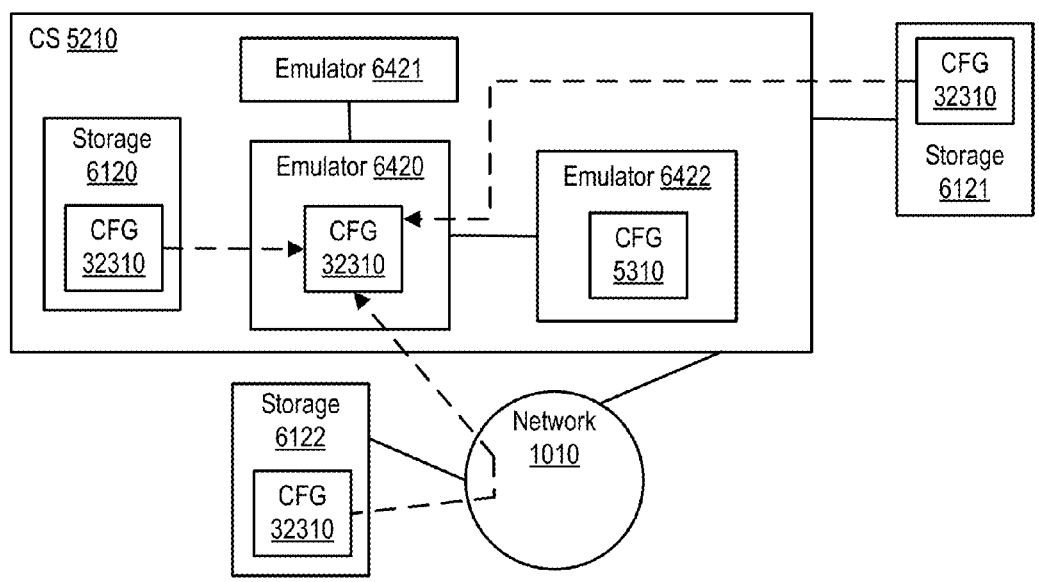

Turning now to FIGS. 32 and 33, exemplary block diagrams of emulators coupled together is illustrated, according to one or more embodiments. As shown, emulator 6420 (e.g., a first emulator) can be coupled to emulator 6421 (e.g., a second emulator), and emulator 6420 (e.g., the first emulator) can be coupled to emulator 6422 (e.g., a third emulator).

In one or more embodiments, two or more devices can work and/or function together. For example, the two or more devices can communicate via a personal area network (PAN). For instance, the PAN can include one or more of a wired network and a wireless network. In one or more embodiments, devices of the PAN can communicate via one or more of Bluetooth (e.g., via one or more of Bluetooth basic rate, Bluetooth enhanced data rate, Bluetooth low energy, etc.), ZigBEE, NFC, wireless USB, wireless Ethernet, WiFi, Z-Wave, IEEE 802.11, IEEE 802.15, IEEE 802.15.4, and a proprietary wireless protocol, among others. For example, devices of the PAN can communicate via one or more ISM (industrial, scientific and medical) bands. For instance, an ISM band can include a frequency range of 6.765-6.795 Mhz, 433.05-434.79 Mhz, 902-928 Mhz, 2.4-2.5 Ghz, 5.725-5.875 Ghz, or 24.0-24.25 Ghz, among others. In one or more embodiments, devices of the PAN can communicate via one or more of a CAN (controller area network) protocol, Flexray, SPI (serial peripheral interconnect), USB, Ethernet, IEEE 802.3, Firewire, IEEE 1394, $I^2C$ (inter-integrated circuit), Thunderbolt, and a proprietary wired protocol, among others.

In one or more embodiments, CS 5210 can emulate a PAN that couples two or more of emulators 6420-6422. For example, one or more of emulators 6420-6422 can be configured such that a first physical device, emulated by a first emulator, can work and/or function with a second physical device, emulated by a second emulator.

In one instance, illustrated in FIG. 32, a CFG 32310 of a MD 32112 can be provided to emulator 6420; emulator 6422 can be configured with CFG 5310 and coupled to emulator 6420 with CFG 32310; and one or more of CFG 5310 and CD 2000 can be configured and/or can be provided to user 5010 in accordance with one or more systems, methods, and/or processes described herein (e.g., with reference to FIGS. 5A-5H). In another instance, illustrated in FIG. 33, CFG 32310, stored via one or more of storages 6120-6122, can be provided to emulator 6420; emulator 6422 can be configured with CFG 5310 and coupled to emulator 6420 with CFG 32310; and one or more of CFG 5310 and CD 2000 can be configured and/or can be provided to user 5010 in accordance with one or more systems, methods, and/or processes described herein (e.g., with reference to FIGS. 5A-5H).

Figure 34:
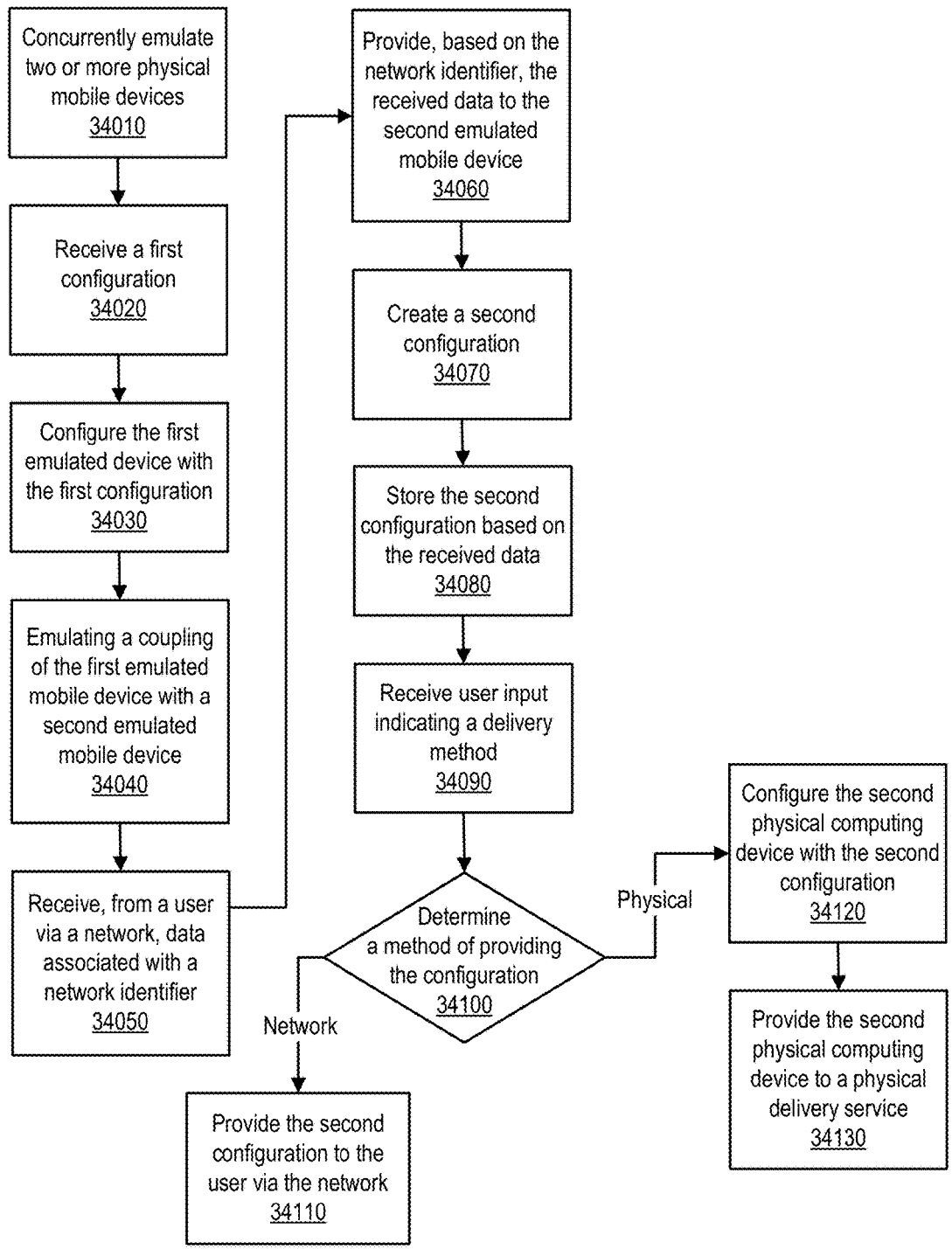
FIG. 34 provides an exemplary method of emulating two or more coupled mobile devices, according to one or more embodiments.

Turning now to FIG. 34, an exemplary method of emulating two or more coupled mobile devices is illustrated, according to one or more embodiments. At 34010, two or more physical mobile devices can be emulated. For example, two or more of emulators 6420-6425 can emulate two or more physical mobile devices. For instance, at least two of the emulated physical devices can be different physical devices.

At 34020, a first configuration can be received. For example, CS 5210 can receive the first configuration. In one instance, the first configuration can be CFG 32310, and CS 5210 can receive CFG 32310, via network 1010, from MD 32310, as illustrated in FIG. 32. In another instance, CS 5210 can receive CFG 32310 from at least one of storages 6120-6122, as illustrated in FIG. 33.

At 34030, a first emulator of the two or more emulators can be configured with the first configuration. For example, the first emulator can be emulator 6420, and emulator 6420 can be configured with CFG 32310, as illustrated in FIGS. 32 and 33. At 34040, a coupling of the first emulator and a second emulator can be emulated. For example, the second emulator can be emulator 6422, and CD 5210 can emulate a coupling of emulator 6420 with emulator 6422. In one instance, the coupling of emulator 6420 with emulator 6422 can be an emulated wired coupling. In another instance, the coupling of emulator 6420 with emulator 6422 can be an emulated wireless coupling.

At 34050, data can be received via a network. For example, CS 5210 can receive data from user 5010 via network 1010. At 34060, the received data can be provided to the second emulator. For example, the received data can be provided to emulator 6422.

At 34070 a second configuration can be created. For example, the received data can be utilized to configure the second emulated computing device and/or create a second configuration (e.g., CFG 5310). For instance, CFG 5310 can include one or more sound recordings (e.g., MP3 songs, musical pieces, voice memos, conversations, lectures, etc.), one or more contacts (e.g., contact information associated with people, places, companies, etc.), one or more bookmarks (e.g., web browser book marks), one or more ebooks, one or more social networking sites' respective information (e.g., Facebook information, Twitter information, MySpace information, Foursquare information, Last.fm information, Google+ information, etc.) associated with user 5010, and/or one or more mobile device apps (e.g., smart phone apps, tablet computer apps, music player apps, in-vehicle apps, etc.), among others, based on and/or created via the received data.

At 34080, the second configuration can be stored. In one example, the second configuration can be stored via storage 5121. In another example, the second configuration can be stored via one or more of storages 6120-6122, illustrated in FIG. 6E. At 34090, user input indicating a delivery method can be received. In one example, CS 5210 can receive the user input indicating the delivery method. In another example, merchant CD 5114 can receive the user input indicating the delivery method.

At 34100, a delivery method can be determined. In one example, CS 5210 can determine the delivery method. In another example, merchant CD 5114 can determine the delivery method. In one or more embodiments, delivery of the second configuration can include one or more of delivering the configuration via the network (e.g., network 1010) and delivering a physical computing device configured with the second configuration.

If the delivery of the second configuration (e.g., CFG 5310) includes delivering the configuration via the network (e.g., network 1010), the second configuration can be provided to the user via the network, at 34110. For example, CFG 5310 can be delivered to CCD 1112 and/or to MD 5510 via network 1010, as illustrated in FIG. 5H. If the delivery of the second configuration (e.g., CFG 5310) includes delivering the physical computing device configured with the second configuration, the physical computing device can be configured with the second configuration, at 34120, and the physical computing device (e.g., CD 2000) can be provided to a physical delivery service, at 34130. For instance, the physical delivery service can provide the physical computing device (e.g., CD 2000) as described herein.

In one or more embodiments, the term "memory medium" can mean a "memory", a "memory device", and/or "tangible computer readable storage medium". In one example, one or more of a "memory", a "memory device", and "tangible computer readable storage medium" can include volatile storage such as SRAM, DRAM, Rambus RAM, EDO RAM, random access memory, etc. In another example, one or more of a "memory", a "memory device", and "tangible computer readable storage medium" can include nonvolatile storage such as a CD-ROM, a DVD-ROM, a floppy disk, a magnetic tape, EEPROM, EPROM, flash memory, NVRAM, FRAM, a magnetic media (e.g., a hard drive), optical storage, etc. In one or more embodiments, a memory medium can include one or more volatile storages and/or one or more nonvolatile storages. In one or more embodiments, one or more of a memory medium, a memory, a memory device, and a tangible computer readable storage medium can be or include non-transient memory and/or storage.

In one or more embodiments, a computer system, a computing device, and/or a computer can be broadly characterized to include any device that includes a processor that executes instructions from a memory medium. For example, a processor (e.g., a central processing unit or CPU) can execute instructions from a memory medium that stores the instructions which can include one or more software programs in accordance with one or more of methods, processes, and/or flowcharts described herein. For instance, the processor and the memory medium, that stores the instructions which can include one or more software programs in accordance with one or more of methods, processes, and/or flowcharts described herein, can form one or more means for one or more functionalities described with references to methods, processes, and/or flowcharts described herein. In one or more embodiments, a memory medium can be and/or can include an article of manufacture, a program product, and/or a software product. For example, the memory medium can be coded and/or encoded with instructions in accordance with one or more of methods, processes, and/or flowcharts described herein to produce an article of manufacture, a program product, and/or a software product.

One or more of the method elements described herein and/or one or more portions of an implementation of a method element can be repeated, can be performed in varying orders, can be performed concurrently with one or more of the other method elements and/or one or more portions of an implementation of a method element, or can be omitted, according to one or more embodiments. In one or more embodiments, concurrently can mean simultaneously. In one or more embodiments, concurrently can mean apparently simultaneously according to some metric. For example, two tasks can be context switched such that such that they appear to be simultaneous to a human. In one instance, a first task of the two tasks can include a first method element and/or a first portion of a first method element. In a second instance, a second task of the two tasks can include a second method element and/or a first portion of a second method element. In another instance, a second task of the two tasks can include the first method element and/or a second portion of the first method element. Further, one or more of the system elements described herein can be omitted and additional system elements can be added as desired, according to one or more embodiments. Moreover, supplementary, additional, and/or duplicated method elements can be instantiated and/or performed as desired, according to one or more embodiments.

One or more modifications and/or alternatives of the embodiments described herein may be apparent to those skilled in the art in view of this description. Hence, descriptions of the embodiments, described herein, are to be taken and/or construed as illustrative and/or exemplary only and are for the purpose of teaching those skilled in the art the general manner of carrying out an invention described in the appended claims. In one or more embodiments, one or more materials and/or elements can be swapped or substituted for those illustrated and described herein. In one or more embodiments, one or more parts and/or processes can be reversed, and/or certain one or more features of the described one or more embodiments can be utilized independently, as would be apparent to one skilled in the art after having the benefit of this description.

What is claimed is:

1. A method, comprising:
   concurrently emulating a plurality of emulated mobile devices, wherein each of the plurality of emulated mobile devices corresponds to a physical mobile device, wherein at least two of the plurality of emulated mobile devices emulate two different physical mobile devices, wherein a first emulated mobile device of the plurality of emulated mobile devices that corresponds to a first physical mobile device of the two different physical mobile devices includes a first physical processor, a first physical memory, and a first physical integrated circuit, wherein a second emulated mobile device of the plurality of emulated mobile devices that corresponds to a second physical mobile device of the two different physical mobile devices includes a second physical processor, a second physical memory, and a second physical integrated circuit, and wherein at least one of the first physical processor, the first physical memory, and the first physical integrated circuit is different from a corresponding one of the second physical processor, the second physical memory, and the second physical integrated circuit;

receiving a first configuration;

configuring the first emulated mobile device with the first configuration;

emulating a coupling of the first emulated mobile device with the second emulated mobile device;

receiving, from a user via a network, data associated with a network identifier;

providing, based on the network identifier, the received data to the second emulated mobile device;

creating a second configuration based on the received data; and providing the second configuration to the user.

2. The method of claim 1, further comprising:

providing the second physical mobile device to a physical delivery service.

3. The method of claim 2, further comprising:

configuring the second physical mobile device with the second configuration.

4. The method of claim 1, wherein emulating the coupling of the first emulated mobile device with the second emulated mobile device includes emulating a wireless coupling of the first emulated mobile device with the second emulated mobile device.

5. The method of claim 1, wherein emulating the coupling of the first emulated mobile device with the second emulated mobile device includes emulating a wired coupling of the first emulated mobile device with the second emulated mobile device.

6. The method of claim 1, wherein the second configuration includes at least one of a sound recording, contact information, login information, online account information, a bookmark, an ebook, a social networking site information, an a mobile device application.

7. The method of claim 1, wherein providing the second configuration to the user includes providing the second configuration to the user via the network.

8. The method of claim 1, wherein the first physical integrated circuit includes at least one of a first global positioning system (GPS) device, a first GSM (global system for mobile communications) telephone network interface device, a first code division multiple access (CDMA) telephone network interface device, a first graphics processing unit, a first graphics processing unit, a first WiFi interface device, and a first Bluetooth device; and wherein the second physical integrated circuit includes at least one of a second GPS device, a second GSM telephone network interface device, a second CDMA telephone network interface device, a second graphics processing unit, a second graphics processing unit, a second WiFi interface device, and a second Bluetooth device.

9. The method of claim 1, wherein the second physical mobile device includes at least one of an in-vehicle computing device and a wearable device.

10. A system, comprising:

a processor;

a memory coupled to the processor;

a network interface coupled to the processor and configured to be coupled to a network;

wherein the memory includes instructions that when executed by the processor, the system:

concurrently emulates a plurality of emulated mobile devices, wherein each of the plurality of emulated mobile devices corresponds to a physical mobile device, wherein at least two of the plurality of emulated mobile devices emulate two different physical mobile devices, wherein a first emulated mobile device of the plurality of emulated mobile devices that corresponds to a first physical mobile device of the two different physical mobile devices includes a first physical processor, a first physical memory, and a first physical integrated circuit, wherein a second emulated mobile device of the plurality of emulated mobile devices that corresponds to a second physical mobile device of the two different physical mobile devices includes a second physical processor, a second physical memory, and a second physical integrated circuit, and wherein at least one of the first physical processor, the first physical memory, and the first physical integrated circuit is different from a corresponding one of the second physical processor, the second physical memory, and the second physical integrated circuit;

receives a first configuration;

configures the first emulated mobile device with the first configuration;

emulates a coupling of the first emulated mobile device with the second emulated mobile device;

receives, from a user via the network, data associated with a network identifier;

provides, based on the network identifier, the received data to the second emulated mobile device;

creates a second configuration based on the received data; and provides the second configuration to the user.

11. The system of claim 10, wherein the memory further includes instructions that when executed by the processor, the system:

marks packaging of the physical mobile device with identity information associated with the user and physical address information associated with the user.

12. The system of claim 10, wherein the memory further includes instructions that when executed by the processor, the system:

configures the second physical mobile device with the second configuration.

13. The system of claim 10, wherein when the system emulates the coupling of the first emulated mobile device with the second emulated mobile device, the system emulates a wireless coupling of the first emulated mobile device with the second emulated mobile device.

14. The system of claim 10, wherein when the system emulates the coupling of the first emulated mobile device with the second emulated mobile device, the system emulates a wired coupling of the first emulated mobile device with the second emulated mobile device.

15. The system of claim 10, wherein the second configuration includes at least one of a sound recording, contact information, login information, online account information, a bookmark, an ebook, a social networking site information, an a mobile device application.

16. The system of claim 10, wherein when the system provides the second configuration to the user, the system provides the second configuration to the user via the network.

17. The system of claim 10,
wherein the first physical integrated circuit includes at least one of a first global positioning system (GPS) device, a first GSM (global system for mobile communications) telephone network interface device, a first code division multiple access (CDMA) telephone network interface device, a first graphics processing unit, a first graphics processing unit, a first WiFi interface device, and a first Bluetooth device; and
wherein the second physical integrated circuit includes at least one of a second GPS device, a second GSM telephone network interface device, a second CDMA telephone network interface device, a second graphics processing unit, a second graphics processing unit, a second WiFi interface device, and a second Bluetooth device.

18. The system of claim 10, wherein the second physical mobile device includes at least one of an in-vehicle computing device and a wearable device.

19. A non-transient computer-readable memory device comprising instructions, that when the instructions are executed by a processor of a system, the system:
concurrently emulates a plurality of emulated mobile devices, wherein each of the plurality of emulated mobile devices corresponds to a physical mobile device, wherein at least two of the plurality of emulated mobile devices emulate two different physical mobile devices, wherein a first emulated mobile device of the plurality of emulated mobile devices that corresponds to a first physical mobile device of the two different physical mobile devices includes a first physical processor, a first physical memory, and a first physical integrated circuit, wherein a second emulated mobile device of the plurality of emulated mobile devices that corresponds to a second physical mobile device of the two different physical mobile devices includes a second physical processor, a second physical memory, and a second physical integrated circuit, and wherein at least one of the first physical processor, the first physical memory, and the first physical integrated circuit is different from a corresponding one of the second physical processor, the second physical memory, and the second physical integrated circuit;
receives a first configuration;
configures the first emulated mobile device with the first configuration;
emulates a coupling of the first emulated mobile device with the second emulated mobile device;
receives, from a user via the network, data associated with a network identifier;
provides, based on the network identifier, the received data to the second emulated mobile device;
creates a second configuration based on the received data; and
provides the second configuration to the user.

20. The non-transient computer-readable memory device of claim 19, wherein the non-transient computer-readable memory device further includes instructions that when executed by the processor, the system:
marks packaging of the physical mobile device with identity information associated with the user and physical address information associated with the user.

21. The non-transient computer-readable memory device of claim 19, wherein the non-transient computer-readable memory device further includes instructions that when executed by the processor, the system:
configures the second physical mobile device with the second configuration.

22. The non-transient computer-readable memory device of claim 19, wherein when the system emulates the coupling of the first emulated mobile device with the second emulated mobile device, the system emulates a wireless coupling of the first emulated mobile device with the second emulated mobile device.

23. The non-transient computer-readable memory device of claim 19, wherein when the system emulates the coupling of the first emulated mobile device with the second mobile device, the system emulates a wired coupling of the first emulated mobile device with the second emulated mobile device.

24. The non-transient computer-readable memory device of claim 19, wherein the second configuration includes at least one of a sound recording, contact information, login information, online account information, a bookmark, an ebook, a social networking site information, an a mobile device application.

25. The non-transient computer-readable memory device of claim 19, wherein when the system provides the second configuration to the user, the system provides the second configuration to the user via the network.

26. The non-transient computer-readable memory device of claim 19,
wherein the first physical integrated circuit includes at least one of a first global positioning system (GPS) device, a first GSM (global system for mobile communications) telephone network interface device, a first code division multiple access (CDMA) telephone network interface device, a first graphics processing unit, a first graphics processing unit, a first WiFi interface device, and a first Bluetooth device; and
wherein the second physical integrated circuit includes at least one of a second GPS device, a second GSM telephone network interface device, a second CDMA telephone network interface device, a second graphics processing unit, a second graphics processing unit, a second WiFi interface device, and a second Bluetooth device.

27. The non-transient computer-readable memory device of claim 19, wherein the second physical mobile device includes at least one of an in-vehicle computing device and a wearable device.

* * * * *